United States Patent
Ogata et al.

(10) Patent No.: US 8,462,175 B2
(45) Date of Patent: Jun. 11, 2013

(54) IMAGE PROCESSING APPARATUS, IMAGE PROCESSING METHOD, AND COMPUTER PROGRAM

(75) Inventors: Shin Ogata, Tokyo (JP); Yasuhiro Shirai, Kanagawa (JP); Toshihiro Morita, Kanagawa (JP); Susumu Morita, Saitama (JP); Taku Sugawara, Tokyo (JP)

(73) Assignee: Sony Corporation, Tokyo (JP)

( * ) Notice: Subject to any disclaimer, the term of this patent is extended or adjusted under 35 U.S.C. 154(b) by 1233 days.

(21) Appl. No.: 11/736,731

(22) Filed: Apr. 18, 2007

(65) Prior Publication Data
US 2007/0252851 A1 Nov. 1, 2007

(30) Foreign Application Priority Data

Apr. 26, 2006 (JP) ................. 2006-122137
Apr. 26, 2006 (JP) ................. 2006-122140

(51) Int. Cl.
*G09G 5/00* (2006.01)
*G09G 5/08* (2006.01)
*G06F 3/00* (2006.01)
*G06F 3/048* (2006.01)
*G06F 17/00* (2006.01)

(52) U.S. Cl.
USPC ........... 345/619; 345/157; 715/745; 715/789; 715/763; 715/243

(58) Field of Classification Search
None
See application file for complete search history.

(56) References Cited

U.S. PATENT DOCUMENTS

| 6,826,541 B1 * | 11/2004 | Johnston et al. ............ 705/36 R |
| 7,080,059 B1 * | 7/2006 | Poston et al. ............... 707/769 |
| 7,606,819 B2 * | 10/2009 | Audet et al. ................ 1/1 |
| 2004/0215657 A1 * | 10/2004 | Drucker et al. ............ 707/104.1 |

FOREIGN PATENT DOCUMENTS

| JP | 5-158651 | 6/1993 |
| JP | 11-345238 | 12/1999 |
| JP | 2000-331030 | 11/2000 |
| JP | 2001-265791 | 9/2001 |
| JP | 2001-350793 | 12/2001 |
| JP | 2002-116933 | 4/2002 |
| JP | 2005-115634 | 4/2005 |
| JP | 2005-122703 | 5/2005 |
| JP | 2006-048610 | 2/2006 |
| WO | WO 2004/095237 A2 | 11/2004 |

OTHER PUBLICATIONS

U.S. Appl. No. 11/777,614, filed Jul. 13, 2007, Shirai, et al.

* cited by examiner

*Primary Examiner* — Tize Ma
(74) *Attorney, Agent, or Firm* — Oblon, Spivak, McClelland, Maier & Neustadt, L.L.P.

(57) ABSTRACT

An information processing apparatus includes a storing unit that stores first attribute data representing first attributes, which are attributes of content as an object to be played, and second attribute data representing second attributes, which are attributes of the first attributes, in association with each other, and a first display control unit that controls related display for displaying first attributes having the second attributes identical with a selected first attribute of the first attributes as related attributes. The first display control unit controls the related display to display a second attribute of the selected first attribute and display the related attributes by dividing the related attributes for each of the second attributes identical with the selected first attribute.

17 Claims, 37 Drawing Sheets

| ARTIST GROUP ID | ARTIST ID | ORDER INFORMATION | ATTRIBUTE INFORMATION |
|---|---|---|---|
| AGID_1 | AID_1 | 1 | USER A |
| AGID_1 | AID_2 | 2 | USER B |
| AGID_1 | AID_3 | 3 | system |
| AGID_2 | AID_2 | 2 | USER A |
| AGID_2 | AID_4 | 1 | USER A |
| ... | ... | ... | ... |

| CONTENT ID | CONTENT NAME | ALBUM NAME | ARTIST NAME | GENRE NAME | CONTENT FILE NAME | REPRODUCED FLAG |
|---|---|---|---|---|---|---|
| TID_1 | Song1 | Album1 | AT1 | Pops | Song1.oma | 0 |
| TID_2 | Song2 | Album1 | AT1 | Pops | Song2.oma | 0 |
| TID_3 | Song3 | Album2 | AT2 | Rock | Song3.oma | 0 |
| ... | ... | ... | ... | ... | ... | ... |

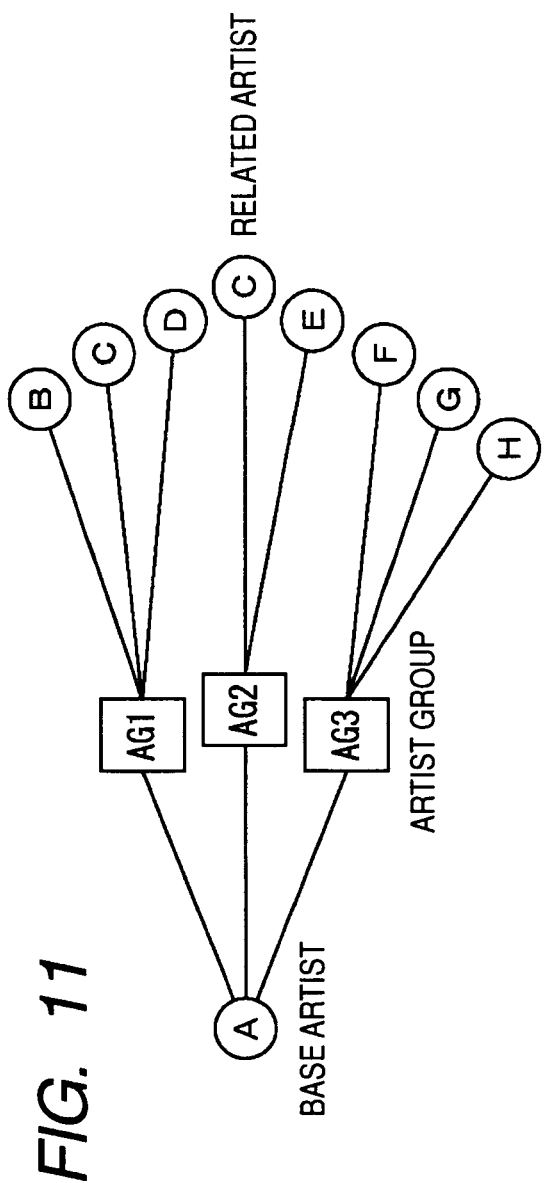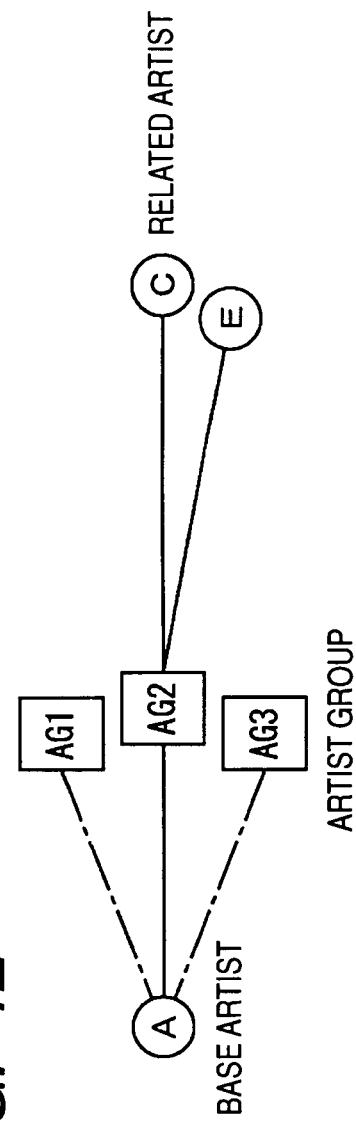

IMAGE PROCESSING APPARATUS, IMAGE PROCESSING METHOD, AND COMPUTER PROGRAM

CROSS-REFERENCES TO RELATED APPLICATIONS

The present invention contains subject matter related to Japanese Patent Application JP 2006-122137 and Japanese Patent Application JP 2006-122140, both filed in the Japanese Patent Office on Apr. 26, 2006, the entire contents of which being incorporated herein by reference.

BACKGROUND OF THE INVENTION

1. Field of the Invention

The present invention relates to an information processing apparatus, an information processing method, and a computer program, and, more particularly to an information processing apparatus, an information processing method, and a computer program that make it possible to simultaneously display artists related to an artist of content and reasons why the artists are related to each other.

2. Description of the Related Art

In recent years, a method of importing music data into a personal computer (PC) by ripping music recorded in a CD (Compact Disk) or downloading desired music from a music delivery server using a music delivery service or the like is spread. A user enjoys content such as the music data imported into the PC using the PC or a portable device (PD).

Thus, the applicant put a product on the market as one of new proposals for allowing a user to enjoy content imported into a PC or a PD. The product acquires, for example, in the PC or the PD, artist link information (i.e., classification information indicating a relation of one attribute of content, i.e., artists) concerning imported music data via a network, causes a monitor to display a relation between artists on the basis of the information, and causes the user to select content, which the user listens to next, according to tastes of the user.

As shown in FIG. 1, the product of this proposal causes the monitor to display an icon of an artist A of content being played on the left side and display icons of other artists B to E and X to Z related to the artist A on the right side of the icon of the artist A such that the icons are connected by lines. In this way, the product urges the user to select content, which the user listens to next, out of contents of the artists displayed. When one of the icons of the artists B to E and X to Z is selected by the user, content of the artist is played next.

SUMMARY OF THE INVENTION

However, in this display, it is difficult for the user to learn from which viewpoint the artist A, whose content are being reproduced, and the other artists B to E and X to Z are related.

Therefore, it is desirable to make it possible to simultaneously display artists related to an artist of content and reasons why the artists are related to each other.

According to some embodiments of the invention, artists related to an artist of content and reasons why the artists are related to each other are simultaneously displayed. This makes it possible to provide the user with a viewing environment for content that is plain in appearance and easy to use intuitively. It is also possible to provide an edition environment in which the user can more easily edit artist link information indicating a relation among artists of contents.

BRIEF DESCRIPTION OF THE DRAWINGS

In the accompanying drawings:

FIG. 11 is a diagram showing an example of display of artist link information of a base artist;

FIG. 12 is a diagram showing another example of the display of the artist link information of the base artist;

DESCRIPTION OF THE PREFERRED EMBODIMENTS

Figure 1:
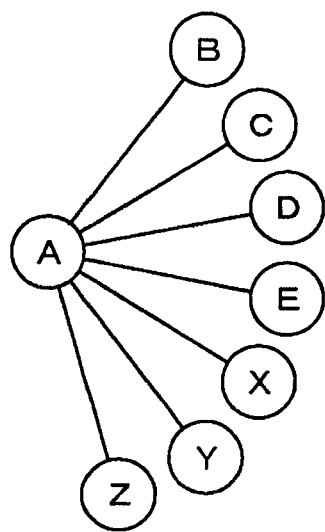
FIG. 1 is a diagram showing an example of display of artist link information in the past.

Embodiments of the invention will be hereinafter explained. An example of a correspondence relation between elements described in claims and specific examples in embodiments of the invention is described as follows. This description is a description for confirming that specific examples supporting inventions described in claims are described in the embodiments of the invention. Therefore, even if there is a specific example described in the embodiments of the invention but is not described here as an example corresponding to an element, this does not means that the specific example does not correspond to the element. Conversely, even if a specific example is described here as an example corresponding to an element, this does not means that the element does not correspond to elements other than the element.

Moreover, this description does not mean that the entire invention corresponding to specific examples described in the embodiments of the invention are described in claims. In other words, this description does not deny the presence of another feature of the invention that correspond to the specific examples described in the embodiments of the invention and are not described in claims of this application, i.e., the presence of another feature of the invention that will be divisionally applied for patent or added by amendment in future.

An information processing apparatus (e.g., a PC 1-1 in FIG. 2) according to an embodiment of the invention includes storing mean (e.g., an ALM database 71 in FIG. 4) for storing first attribute data representing first attributes (e.g., artists), which are attributes of content as an object to be played, and second attribute data representing second attributes (e.g., artist groups), which are attributes of the first attributes, in association with each other and first display control means (e.g., an artist-link-tree-display processing unit 101 in FIG. 10) for controlling related display for displaying first attributes having the second attributes identical with a selected first attribute of the first attributes as related attributes (e.g., related artists). The first display control means controls the related display to display a second attribute of the selected first attribute and display the related attributes by dividing the related attributes for each of the second attributes identical with the selected first attribute.

The information processing apparatus further includes second display control means (e.g., an artist-group-list-display processing unit 103 in FIG. 10) for controlling list display of second attributes corresponding to all second attribute data stored in the storing means. When the second attribute is pointed in the related display, it is possible to control the list display of the second attributes to display a display position of the second attribute pointed in a predetermined position in the list display of the second attributes.

An information processing method or a computer program according to another embodiment of the invention is an information processing method or a computer program for an information processing apparatus (e.g., the PC 1-1 in FIG. 2) including storing mean (e.g., the ALM database 71 in FIG. 4) for storing first attribute data representing first attributes, which are attributes of content as an object to be played, and second attribute data representing second attributes, which are attributes of the first attributes, in association with each other and first display control means (e.g., the artist-link-tree-display processing unit 101 in FIG. 10) for controlling related display for displaying first attributes having the second attributes identical with a selected first attribute of the first attributes as related attributes. The information processing method or the computer program includes a step of controlling the related display to display a second attribute of the selected first attribute and display the related attributes by dividing the related attributes for each of the second attributes identical with the selected first attribute (e.g., step S107 in FIG. 17).

The embodiments of the invention will be hereinafter explained with reference to the accompanying drawings.

Figure 2:
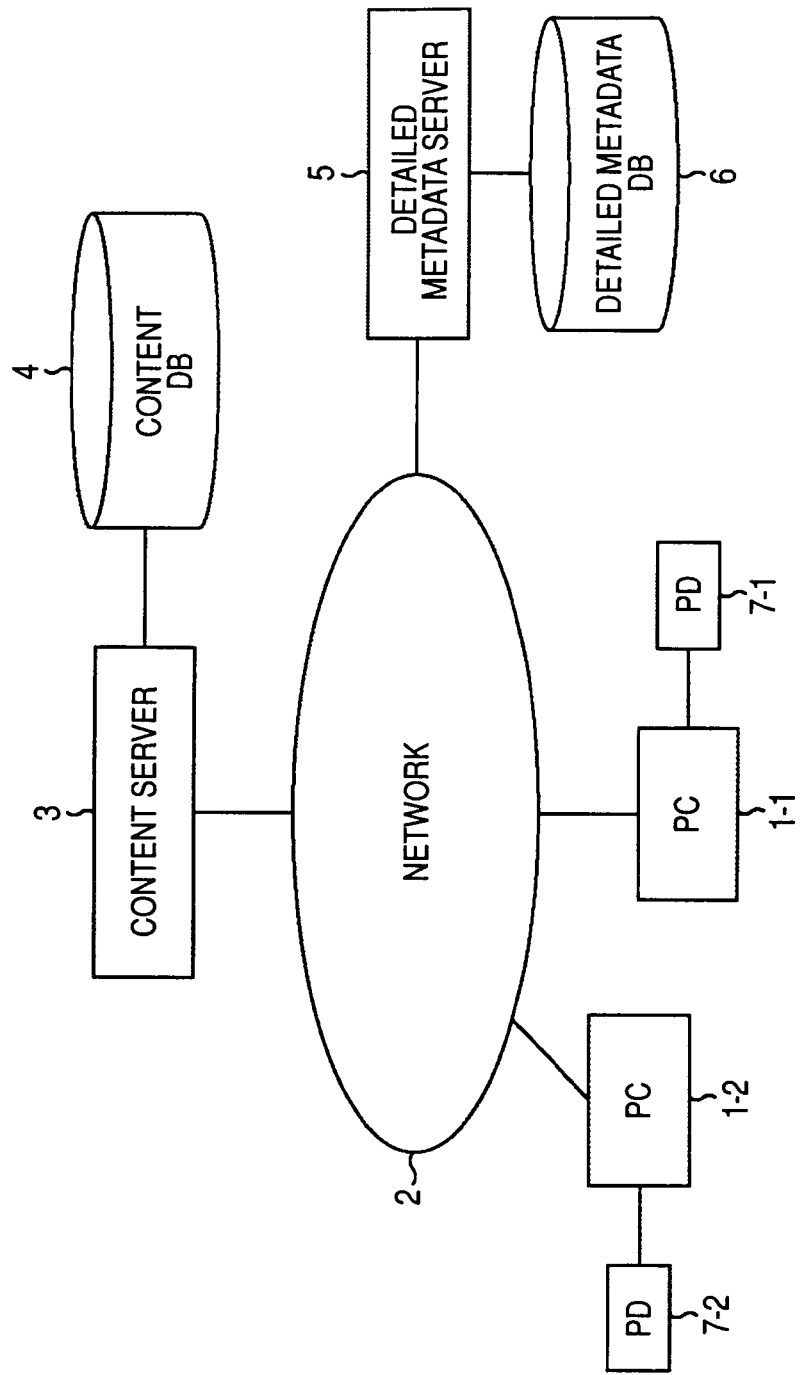
FIG. 2 is a diagram showing an example of a structure of a content providing system according to an embodiment to the invention.

FIG. 2 shows an example of a structure of a content providing system according to an embodiment of the invention.

Personal computers (PCs) 1-1 and 1-2 are connected to a network 2 represented by the Internet. In the following description, when it is unnecessary to specifically distinguish the PCs 1-1 and 1-2, the PCs 1-1 and 1-2 are simply referred to as the PC 1. Although only the two PCs 1 are described in this example, an arbitrary number of PCs are connected to the network 2.

A content server 3 that provides the PC 1 with contents such as videos and music and a detailed metadata server 5 are connected to the network 2. An arbitrary number of the content servers 3 and an arbitrary number of the detailed metadata servers 5 are connected to the network 2. In the explanation of the example in FIG. 2, content of music is provided.

The content server 3 has a content database (DB) 4 that stores data of contents such as music (hereinafter also referred to as content data) and metadata corresponding to the contents. For example, the metadata is formed by plural attributes of the contents such as album names including the contents, names of artists who play or provide the contents, genres of the contents, melodies, rhythms, and values (parameters) of ranking of the contents in the market.

The content server 3 authenticates, in response to an access from the PC 1, a user registered to provide the user with content. The content server 3 transmits content data and metadata of content requested by the user out of various contents stored in the content database 4 to the PC 1, the user of which is authenticated, via the network 2. A content providing side can also provide the user with content data of various contents that are recommended to the user for viewing.

The detailed metadata server 5 has a content detailed metadata database (DB) 6 in which detailed metadata of various contents circulated in the market are stored. The detailed metadata is formed by content IDs (Identifications) as identifiers of the contents, metadata (e.g., artist names and genres) added to the content data, category data representing categories (e.g., sub-genres) for classifying similar contents, and the like.

The sub-genre is information on, other than a genre in metadata of a content A, a genre closest to (i.e., similar to) a genre including the content A. It is possible to classify content included in a genre P in the metadata into plural sub-genres similar to the genre P. In other words, the content is classified into only one genre in the metadata but can be classified into plural sub-genres. In other words, it can be said that contents classified into a sub-genre are similar. For example, detailed metadata is formed by content IDs of the contents, artist names of the contents, sub-genre names into which similar contents are classified, and the like.

The detailed metadata server 5 transmits, in response to an access from the PC 1, detailed metadata of a content ID of the content acquired in the PC 1 among the detailed metadata stored in the detailed metadata database 6 to the PC 1 via the network 2.

The PC 1 accesses the content server 3 using client software such as a Web browser and records content data and metadata received from the content server 3 or converts content data read from a CD (Compact Disk) into a predetermined encoding system (e.g., ATRAC3plus (trademark)) and records the content data together with metadata thereof. This metadata is acquired from the CD or not-shown another metadata server.

When the PC 1 records the content data and the metadata, the PC 1 accesses the detailed metadata server 5, receives detailed metadata of content corresponding thereto, generates artist link information related to an artist of the content, and records the artist link information generated. The PC 1 edits, according to operation by the user, the recorded artist link information, creates a play list in which a playing order of contents is described, and reproduces content data recorded.

Portable devices (PDs) 7-1 and 7-2, which are portable recording and reproducing devices, are detachably connected to the PCs 1-1 and 1-2, respectively, via, for example, a USB (Universal Serial Bus) cable. When it is unnecessary to distinguish the PDs 7-1 and 7-2, the PDs 7-1 and 7-2 are referred to as the PD 7 as appropriate. The PC 1 transfers recorded content data, metadata, edited artist link information, a created play list, or the like to the PD 7 connected thereto.

The PD 7 records various content data from the PC 1, metadata thereof, edited artist link information or play list, and the like and reproduces content data using the content data, the metadata, the artist link information, the play list, and the like recorded. When a removable medium having various content files recorded therein in advance is inserted into the PD 7, the PD 7 can also reproduce content data recorded therein.

In the case of the example explained with reference to FIG. 2, the PD 7 acquires a content file from the content server 3 via the PC 1. However, it is also possible to directly acquire data from the content server 3 and the detailed metadata server 5 by directly making connection to the network 2 without the intervention of the PC 1 or by radio communication.

Figure 3:
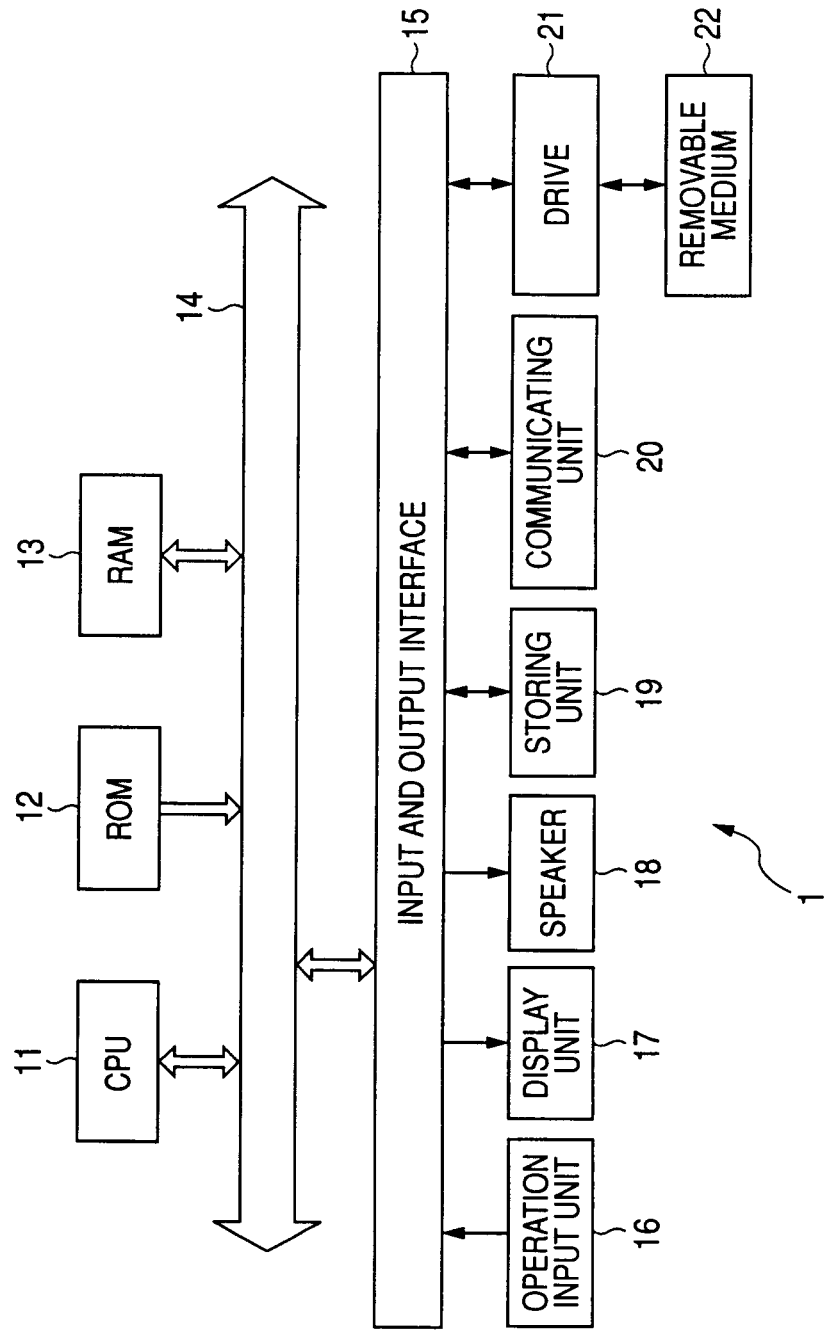
FIG. 3 is a block diagram showing an example of a hardware configuration of a PC in FIG. 2.

FIG. 3 shows an example of a hardware configuration of the PC 1.

A CPU (Central Processing Unit) 11 executes various kinds of processing in accordance with a computer program stored in a ROM (Read Only Memory) 12 or a computer program loaded to a RAM (Random Access Memory) 13 from a storing unit 18. Data and the like necessary for the CPU 11 to execute the various kinds of processing are also stored in the RAM 13 as appropriate.

The CPU 11, the ROM 12, and the RAM 13 are connected to one another via a bus 14. An input and output interface 15 is also connected to the bus 14.

An operation input unit 16 including a keyboard and a mouse, a display unit 17 as a display formed by a CRT (Cathode Ray Tube), an LCD (Liquid Crystal Display), or the like, a speaker 18, a storing unit 19 including a hard disk, and a communicating unit 20 including a modem, a terminal adapter, and a USB interface are connected to the input and output interface 15. The communicating unit 20 performs communication processing through the network 2 and a USB cable.

A drive 21 is also connected to the input and output interface 15 when necessary. A removable medium 22 such as a magnetic disk, an optical disk, a magneto-optical disk, or a semiconductor memory is inserted in the drive 21 as appropriate. A computer program read out from the removable medium is installed in the storing unit 19 when necessary.

Although not shown in the figure, the content server 3, the detailed metadata server 5, and the PD 7 are also constituted by computers that basically have the same structure as the PC 1 shown in FIG. 3. Thus, in the following explanation, the structure shown in FIG. 3 is also cited as the structures of the content server 3, the detailed metadata server 5, and the PD 7.

When the CPU 11 executes various computer programs, the computer in FIG. 3 functions as the PC 1, the content server 3, the detailed metadata server 5, and the PD 7 in FIG. 2. In this case, it is possible to record the computer programs in the ROM 12 or the storing unit 19 as a recording medium built in the computer in FIG. 3 in advance. Alternatively, it is possible to temporarily or permanently store (record) the computer programs in the removable medium 22 such as the magnetic disk, the optical disk, the magneto-optical disk, or the semiconductor memory and provide the computer programs as so-called package software.

Other than installing the computer programs in the computer in FIG. 3 from the removable medium 22 described above, it is also possible to transfer the computer programs from a download site to the computer in FIG. 3 by radio via an artificial satellite for digital satellite broadcasting or transfer the computer programs to the computer in FIG. 3 by wire via the network 2 and install the computer programs.

Figure 4:
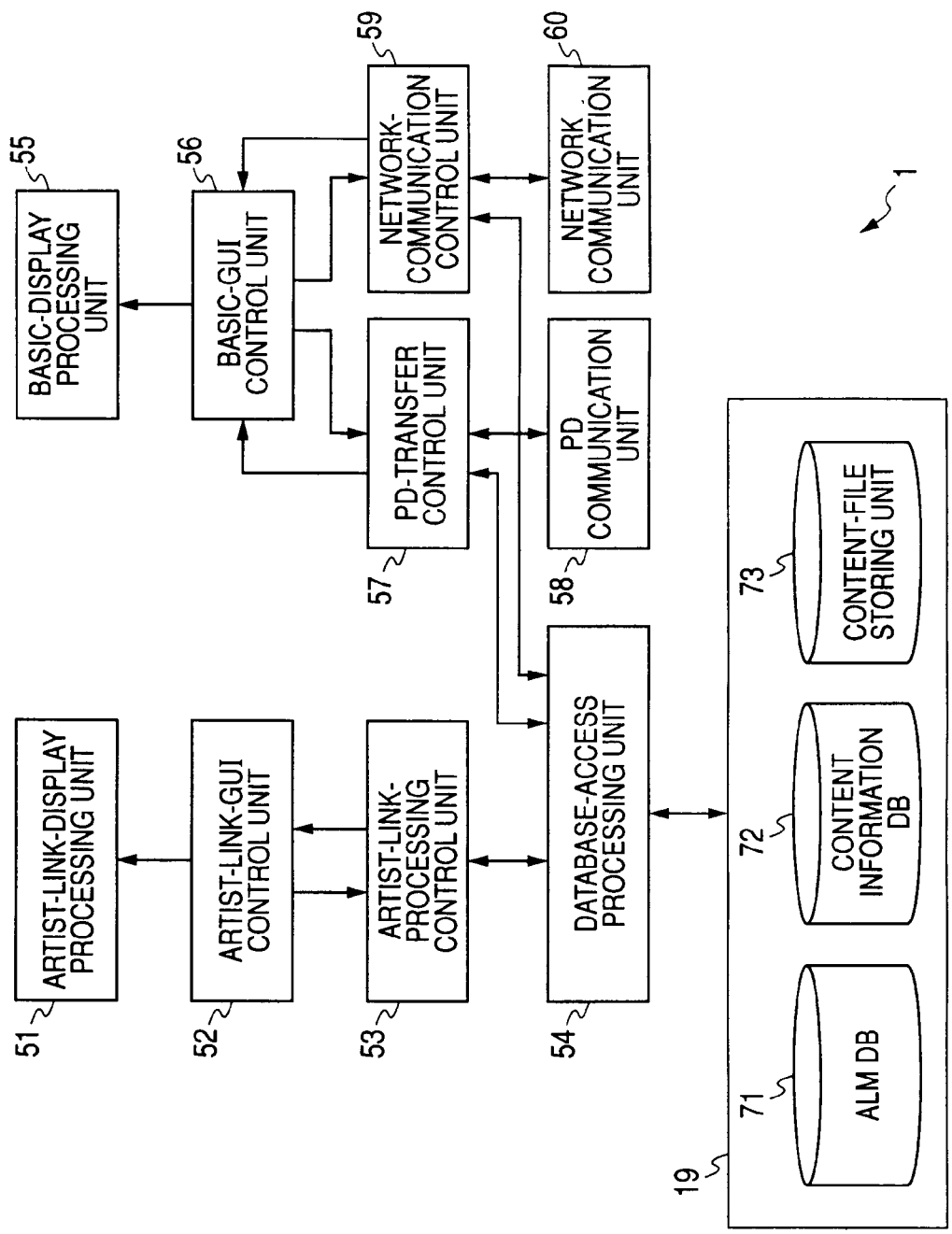
FIG. 4 is a block diagram showing an example of a functional structure of the PC in FIG. 2.

FIG. 4 is a block diagram showing an example of a functional structure of the PC 1. A functional block shown in FIG. 4 is realized by the CPU 11 of the PC 1, for example, registering content of music and executing a predetermined computer program for selecting and listening to the registered content.

The functional block shown in FIG. 4 includes an artist-link-display processing unit 51, an artist-link-GUI control unit 52, an artist-link-processing control unit 53, a database-access processing unit 54, a basic-display processing unit 55, a basic-GUI control unit 56, a PD (Portable Device)-transfer control unit 57, a network-communication control unit 59, a PD (Portable Device) communication unit 58, a network communication unit 60, and an ALM (Artist Link Map) database (DB) 71, a content information database (DB) 72, and a content-file storing unit 73 established in the storing unit 19 or the like.

Under the control by the artist-link-GUI control unit 52, the artist-link-display processing unit 51 generates, on the basis of artist link information, GUI images for an artist link map edition screen 301 (FIG. 14) for editing the artist link information and an artist link map preview screen 201 (FIG. 13) for referring to the artist link information. The artist-link-display processing unit 51 causes the display unit 17 to display the artist link map edition screen 301 and the artist link map preview screen 201 formed by the images generated.

The artist-link-GUI control unit 52 inputs operation signals corresponding to operation of the user concerning the artist link map edition screen 301 and the artist link map preview screen 201 via the operation input unit 16 to cause the artist-link-processing control unit 53 to perform processing concerning the artist link information. Further, the artist-link- GUI control unit 52 controls the artist-link-display processing unit 51 on the basis of feedback from the artist-link-processing control unit 53 to update the artist link map edition screen 301, the artist link map preview screen 201, and the like.

When detailed metadata is supplied from the database-access processing unit 54, the artist-link-processing control unit 53 generates artist link information on the basis of the detailed metadata, supplies the artist link information generated to the database-access processing unit 54, and causes the database-access processing unit 54 to register the artist link information in the ALM database 71.

As described above, the detailed metadata is formed by a content ID of content, an artist name of the content, a sub-genre name into which similar contents are classified, and the like. Thus, association of the artist name and the sub-genre of the content is acquired from the detailed metadata. Thus, the artist-link-processing control unit 53 considers that artists classified into (belonging to) the same sub-genre are related. With the sub-genre as an artist group, the artist-link-processing control unit 53 generates artist link information associating artist groups and artists such that an artist name (of the content) classified into the sub-genre is included in the artist group.

The artist link information is information associating artists of the same artist group and it is possible to edit the artist link information. Therefore, for example, when an artist A is a member of artists B (group) at present, when the artist A was a member of the artists B (group) in the past, when the artist A inherits a system of an artist C, or when the artist A presents music to an artist D, considering that the artists are related, it is possible to create a predetermined artist group and associate the artists to be included in the same artist group.

The artist-link-processing control unit 53 performs, under the control by the artist-link-GUI control unit 52, edition such as addition and deletion of artist link information managed in the ALM database 71 by the database-access processing unit 54 and returns update information of the artist link information by the edition to the artist-link-GUI control unit 52.

The database-access-processing unit 54 performs reading and writing of data stored in the ALM database 71, the content information database 72, and the content-file storing unit 73 according to instructions of the artist-link-processing control unit 53, the PD-transfer control unit 57, the network-communication control unit 59, and the like.

The basic-display processing unit 55 generates, under the control by the basic-GUI control unit 56, a GUI image of a basic function of a predetermined computer program and causes the display unit 17 to display a screen formed by the GUI image generated.

The basic-GUI control unit 56 inputs an operation signal corresponding to operation of the user concerning the GUI image of the basic function via the operation input unit 16 and supplies the operation signal to the PD-transfer control unit 57, the network-communication control unit 59, and the like. The basic-GUI control unit 56 controls the basic-display processing unit 55 on the basis of feedback from the PD-transfer control unit 57, the network-communication control unit 59, and the like to update the screens and the like formed by the GUI image of the basic function. Further, the basic-GUI control unit 56 supplies an image and the like corresponding to image data supplied from the content server 3 to the basic-display processing unit 55 via the network-communication control unit 59 and causes the monitor constituting the output unit 17 to display the image and the like.

The PD-transfer control unit 57 causes, according to an operation signal from the basic-GUI control unit 56, the data-base-access processing unit 54 to read out data instructed to be transferred (e.g., content data, metadata, edited artist link information, a play list in which a playing order of contents is described, etc.) and controls the PD communication unit 58 to transmit the data to the PD 7.

The network-communication control unit 59 controls the network communication unit 60 according to an operation signal or the like from the basics-GUI control unit 56 to access the content server 3 and the detailed metadata server 5. The network-communication control unit 59 supplies screen data supplied from the content server 3 to the basic-GUI control unit 56 and supplies content data and metadata acquired from the content server 3 and detailed metadata acquired from the detailed metadata server 5 to the database-access processing unit 54.

The PD communication unit 58 transmits data supplied from the PD-transfer control unit 57 to the PD 7 via the communicating unit 20 and a not-shown USB cable. The network communication unit 60 accesses the content server 3 and the detailed metadata server 5 via the communicating unit 20 and the network 2. The network communication unit 60 supplies screen data, content data, and metadata acquired from the content server 3 and detailed metadata acquired from the detailed metadata server 5 to the network-communication control unit 59.

Artist link information of various artists is stored in the ALM database 71. The artist link information stored in the ALM database 71 is generated by the artist-link-processing control unit 53 in association with artists of contents on the basis of the detailed metadata acquired from the detailed metadata server 5. Edition such as addition and deletion of the artist link information is performed according to operation by the user.

Information on contents (content information) is stored in the content information database 72. The content information database 72 stores information such as content names, content file names, histories of numbers of plays, and transfer histories to the PD in association with content IDs. Play list information (information including a play list name and content IDs belonging to the play list) created on the basis of operation of the user is also stored in the content information database 72. It is also possible to store sub-genre names of the detailed metadata in the content information database 72 as one of metadata in association with the content IDs.

Content data is stored in the content-file storing unit 73 as a content file managed in the content information database 72.

Figure 5:
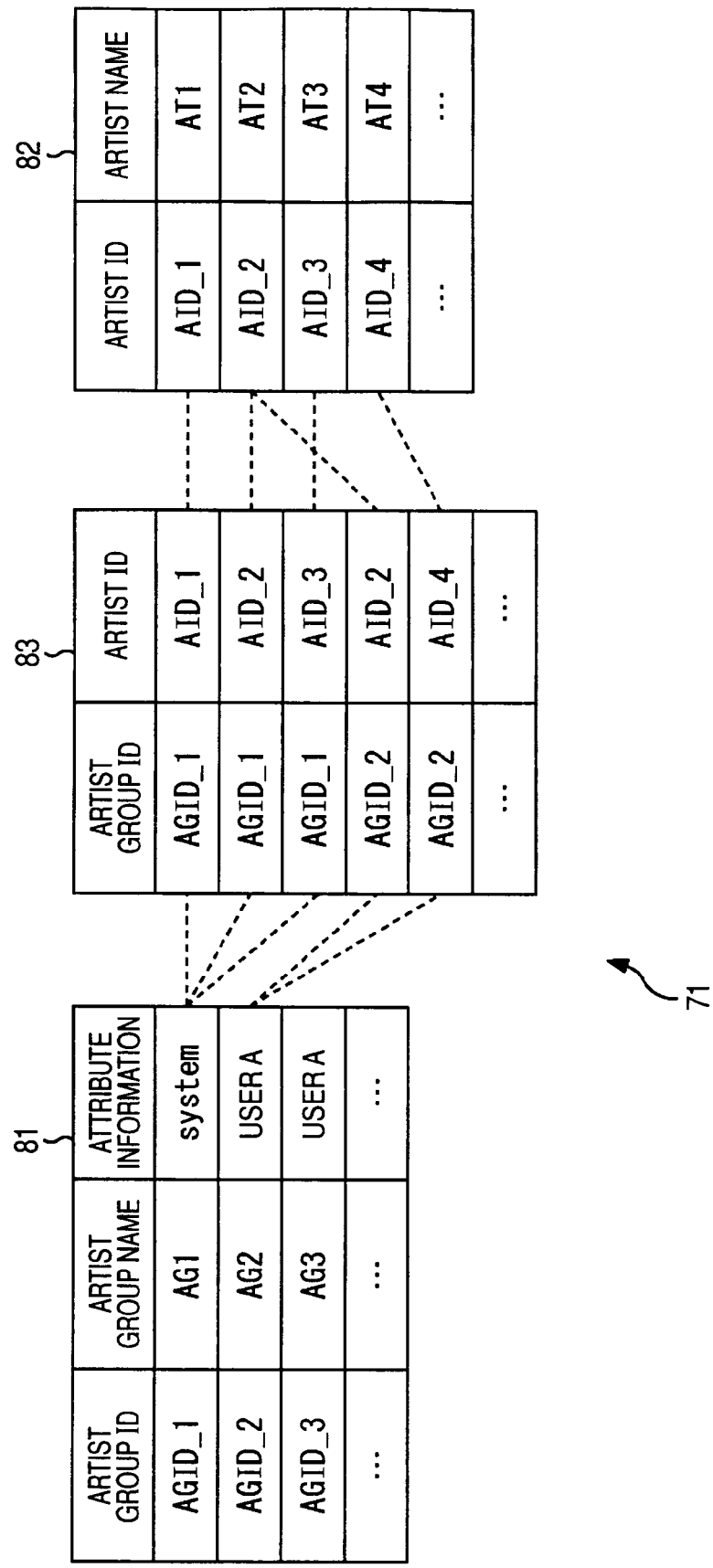
FIG. 5 is a diagram showing an example of a structure of an ALM database in FIG. 4.

FIG. 5 shows an example of a detailed structure of the ALM database 71.

In the example in FIG. 5, the ALM database 71 includes an artist group (AG) list table 81, an artist list table 82, and an artist link correspondence table 83.

The artist group list table 81 includes an artist group ID (Identification), an artist group name, and attribute information. The artist group name is a name representing a category into which artists related to each other are classified. The artist group name can be freely changed or added anew by the user. However, when the artist group name is created on the basis of detailed metadata, a sub-genre name is directly registered as an artist group name.

The attribute information indicates who created this artist group. For example, "user A" indicates that the artist group is created by a user of the PC 1. "System" indicates that the artist group is created by the artist-link-processing control unit 53 on the basis of the detailed metadata. This attribute information is used, for example, when an artist group created by the user is given higher priority than an artist group created by the system.

In the artist group list table 81 in FIG. 5, an artist group ID and attribute information of an artist group name "AG1" are "AGID_1" and "system", respectively, an artist group ID and attribute information of an artist group name "AG2" are "AGID_2" and "user A", respectively, and an artist group ID and attribute information of an artist group name "AG3" are "AGID_3" and "user A", respectively. In other words, in the artist group list table 81, the artist group IDs and the artist group names are stored in association with each other. The artist group "AG1" is created by the artist-link-processing control unit 53 and the artist groups "AG2" and "AG3" are created by the user of the PC 1.

The artist list table 82 includes an artist ID (Identification) and an artist name. In the artist list table 82 in FIG. 5, an artist ID of an artist name "AT1" is "AID_1", an artist ID of an artist name "AT2" is "AID_2", and an artist ID of an artist name "AT3" is "AID_3". In this way, the artist IDs and the artist names are stored in association with each other.

The artist link correspondence table 83 includes an artist group ID and an artist ID. In the artist link correspondence table 83 in FIG. 5, an artist ID "AID_1", an artist ID "AID_2", and an artist ID "AID_3" are included in an artist group ID "AGID_1" and an artist ID "AID_2" and an artist ID "AID_4" are included in an artist group ID "AGID_2". In this way, the artist group IDs and the artist IDs are stored in association with each other.

In other words, in the artist link correspondence table 83, one artist group ID can include plural artist IDs and plural artist group IDs can include an identical artist ID.

As described above, by referring to the artist link information including the artist group list table 81, the artist list table 82, and the artist link correspondence table 83, it is seen that the artist AT1 with the artist ID "AID_1", the artist AT2 with the artist ID "AID_2", and the artist AT3 with the artist ID "AID_3" are included in the artist group AG1 with the artist group ID "AGID_1". It is also seen that the artist AT2 with the artist ID "AID_2" and the artist AT4 with the artist ID "AID_4" are included in the artist group AG2 with the artist group ID "AGID_2".

In other words, in this artist link information, the artist AT1 with the artist ID "AID_1", the artist AT2 with the artist ID "AID_2", and the artist AT3 with the artist ID "AID_3" are associated with one another and the artist AT2 with the artist ID "AID_2" and the artist AT4 with the artist ID "AID_4" are associated with each other.

The artists registered in this ALM database 71 include artists whose contents are not registered in the content information database 72.

Figure 6:
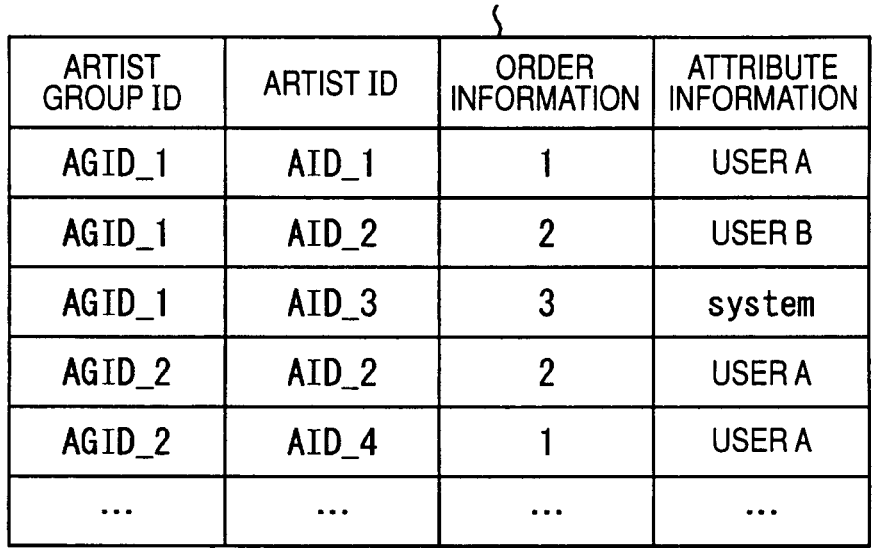
FIG. 6 is a diagram showing an example of a structure of an artist link correspondence table in FIG. 5.

FIG. 6 shows an example of a more detailed structure of the artist link correspondence table 83. In the example in FIG. 6, the artist link correspondence table 83 has order information and attribute information other than the artist group ID and the artist ID shown in FIG. 5.

The order information is, for example, orders of priority that are referred to when artist link information is transferred to the PD 7, which has limitation of a data storage capacity compared with the PC 1, and when artists included in an artist group are arranged and displayed on the display unit 17. It is possible to change the order information according to operation by the user. For example, information on only artists having higher twenty orders of priority among the artists included in the artist group is transferred to the PD 7.

The attribute information of the artist link correspondence table 83 indicates who has added artists to the artist group. As described above, "user A" indicates that the artist group is created by the user of the PC 1, "system" represents the artist group is created by the artist-link-processing control unit 53 on the basis of the detailed metadata, and "user B" indicates that the artist group is created by the user of another PC 1. This attribute information is referred to as an initial value of the order information.

Since a desire of the user is give higher priority than the detailed metadata, in the initial value of the order information, the artist groups created by the users are set to have higher orders of priority in a relation of, for example, user A (user himself/herself)>user B (friend)>system.

In the artist link correspondence table 83 in FIG. 6, order information "1" and attribute information "user A" are stored in association with the artist AT1 with the artist ID "AID_1" included in the artist group AG1 with the artist group ID "AGID_1". Order information "2" and attribute information "user B" are stored in association with the artist AT2 with the artist ID "AID_2" included in the artist group AG1 with the artist group ID "AGID_1". Order information "3" and attribute information "system" are stored in association with the artist AT3 with the artist ID "AID_3" included in the artist group AG1 with the artist group ID "AGID_1".

It is seen that, among artists included in the artist group AG1 with the artist group ID "AGID_1", an order of priority of the artist AT1 with the artist ID "AID_1" is set to be the highest and an order of priority of the artist AT3 with the artist ID "AID_3" is set to be the lowest. Moreover, it is seen that artist link information indicating that the artist AT1 is included in the artist group AG1 is created by the user A, artist link information indicating that the artist AT2 is included in the artist group AG1 is created by the user B, and artist link information indicating that the artist AT3 is included in the artist group AG1 is created by the system.

The case of the artist group AG1 will be specifically explained with reference to the attribute information of the artist group correspondence table 81 in FIG. 4 as well. For example, after the artist group AG1 and the artist link information indicating that the artist AT3 is included in the artist group AG1 are created by the artist-link-processing control unit 53 on the basis of the detailed metadata, the artist link information indicating that the artist AT1 is included in the artist group AG1 is added according to edition by the user of the PC 1. Moreover, as described in detail later, the artist link information indicating that the artist AT2 is included in the artist group AG1 is added by importing a file in which artist link information of the user of another PC 1 is described and merging the information.

In the artist link correspondence table 83, order information "2" and attribute information "user A" are stored in association with the artist AT2 with the artist ID "AID_2" included in the artist group AG2 with the artist group ID "AGID_2". Order information "1" and attribute information "user A" are stored in association with the artist AT4 with the artist ID "AID_4" included in the artist group AG2 with the artist group ID "AGID_2".

It is seen that, among artists included in the artist group AG2 with the artist group ID "AGID_2", an order of priority of the artist AT4 with the artist ID "AID_4" is set to be the highest and an order of priority of the artist AT2 with the artist ID "AID_2" is set to be the lowest. Moreover, it is seen that artist link information indicating that the artist AT2 is included in the artist group AG2 is created by the user A and artist link information indicating that the artist AT4 is included in the artist group AG2 is also created by the user A.

Figure 7:
FIG. 7 is a diagram showing an example of a structure of a content information database in FIG. 4.

FIG. 7 shows an example of a content information table stored in the content information database 72.

The content information table includes information on attributes of content (music) such as a content ID for identifying the content, a content name, a name of an album including the content, an artist name of an artist who is a player or a provider of the content, a genre name of a genre to which the content belongs, a content file name of the content, and a flag indicating that the content has been played (a played flag). This played flag is once set to 0 at the time of start of shuffle play for playing contents at random and then 1 is set to the played flag of content selected to be played. IN this way, the played flag prevents content once played from being repeatedly selected.

For example, in the content information table in FIG. 7, content information indicating that a content name, an album name, an artist name, a genre name, a content file name, and a played flag of content with a content ID "TID_1" are "Song 1", "Album 1", "artist AT1", "Pops", "Song1.oma", and "0", respectively, is stored.

Content information indicating that a content name, an album name, an artist name, a genre name, a content file name, and a played flag of content with a content ID "TID_2" are "Song 2", "Album 1", "artist AT1", "Pops", "Song2.oma", and "0", respectively, is stored. Content information indicating that a content name, an album name, an artist name, a genre name, a content file name, and a played flag of content with a content ID "TID_3" are "Song 3", "Album 2", "artist AT2", "Rock", "Song3.oma", and "0", respectively, is stored.

Although not shown in the example in FIG. 7, as described above, in the content information database 72, information such as speed, a melody, a rhythm, an age (year, month, and date of sale), ranking information, a history of the number of times of play, a history of transfer to a PD, and a play list such as a play list name of content is also stored. As the raking information, there are a sales ranking of the content in the market, a viewing and listening ranking of users who use the content server 3, and the like.

When the content is content of video, for example, a program name, a title name of a movie, an age (year of release), and the like are also included in the content information database 72. Moreover, it is also possible to record an evaluation value of rating (evaluation) of the content, which is created on the basis of operation of the operation input unit 16 by the user, in the content information database 72 as content metadata. The evaluation value may be created, for example, before or after the user listens to or views the content.

Figure 8:
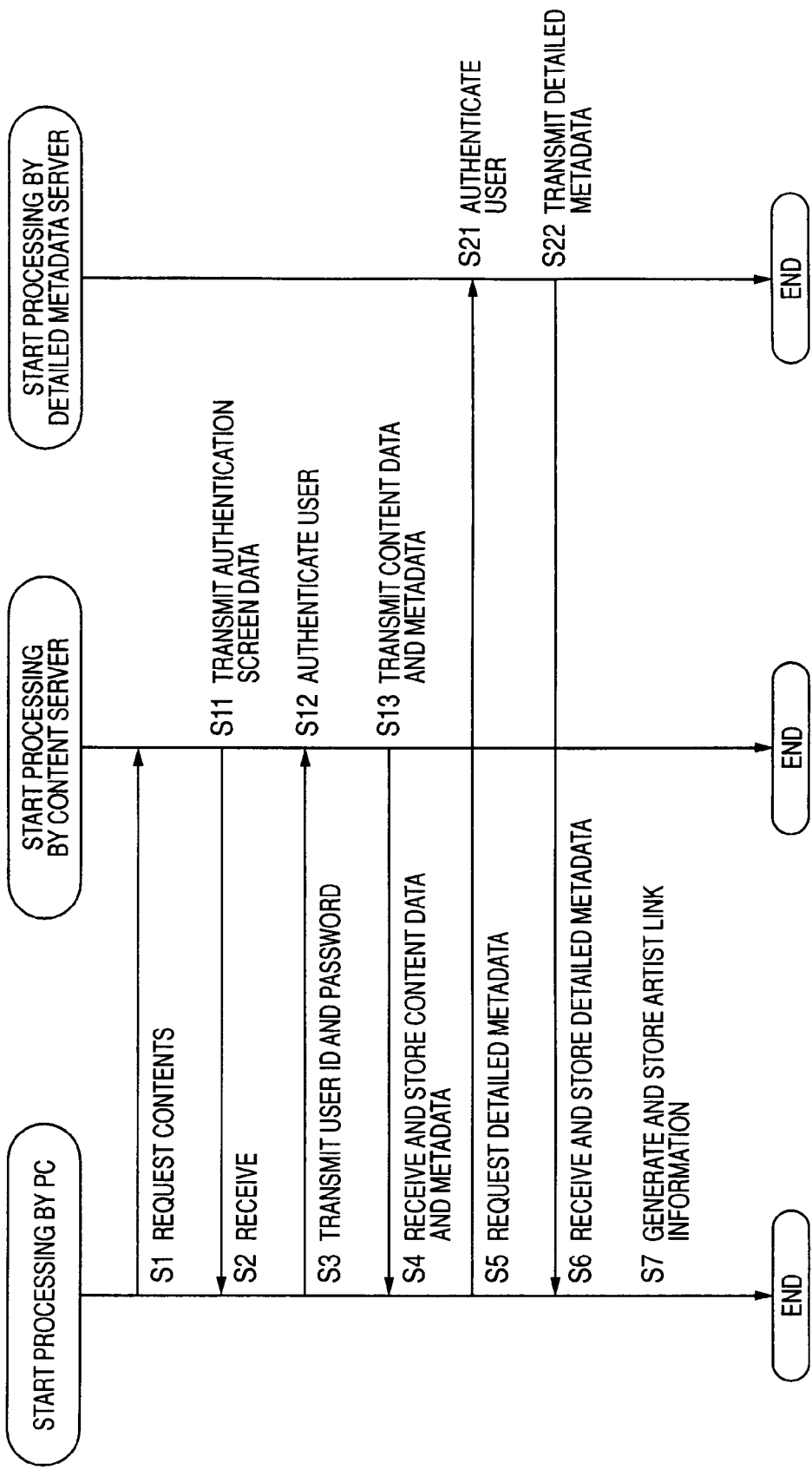
FIG. 8 is a flowchart for explaining an example of processing by a content providing system in FIG. 1.

An example of processing in which the PC 1 acquires content data from the content server 3, acquires detailed metadata from the detailed metadata server 5, and generates artist link information in the content providing system in FIG. 1 will be explained with reference to a flowchart in FIG. 8.

For example, a list of contents and the like are displayed on the display unit 17. The user requests access to the content server 3 by pointing desired content using the mouse constituting the operation input unit 16 of the PC 1.

The basic-GUI control unit 56 of the PC 1 inputs a signal corresponding to the operation of the user via the operation input unit 16 and supplies the signal to the network-communication control unit 59. In step S1, the network-communication control unit 59 controls the network communication unit 60 according to the operation signal from the basic-GUI control unit 56 to access the content server 3 and request the content desired by the user. The network communication unit 60 accesses the content server 3 via the communicating unit 20 and the network 2 and requests the content desired by the user.

When the communicating unit 20 of the content server 3 receives the access from the PC 1, in step S11, the communicating unit 20 transmits, under the control by the CPU 11, authentication screen data for requesting a user ID (identification) and a password registered in advance via the network 2 in order to use the content providing system.

In step S2, the network communication unit 60 of the PC 1 receives the authentication screen data from the content server 3 via the communicating unit 20 and the network 2 and supplies the authentication screen received to the basic-GUI control unit 56 via the network-communication control unit 59. The basic-GUI control unit 56 controls the basic-display processing unit 55 to display an authentication screen corresponding to the authentication screen data from the network-communication control unit 59 on the display unit 17. The user inputs a user ID and a password using the mouse or the like constituting the operation input unit 16 according to the authentication screen displayed on the display unit 17.

The basic-GUI control unit 56 inputs the user ID and the password via the operation input unit 16 according to the operation by the user and supplies the user ID and the password inputted to the network-communication control unit 59. In step S3, the network-communication control unit 59 controls the network communication unit 60 to transmit the user ID and the password from the basic-GUI control unit 56 to the content server 3. The network communication unit 60 transmits the user ID and the password to the content server 3 via the communicating unit 20 and the network 2.

The communicating unit 20 of the content server 3 receives the user ID and the password from the PC 1 and supplies the user ID and the password to the CPU 11. In step S12, the CPU 11 authenticates the user of the PC 1 on the basis of the user ID and the password received by the communicating unit 20 and the processing proceeds to step S13. The CPU 11 reads out content data and metadata of the content desired by the user among the various contents stored in the content database 4 and controls the communicating unit 20 to transmit, via the network 2, the content data and the metadata read out.

In step S4, the network communication unit 60 of the PC 1 receives the content data and the metadata from the content server 3 via the communicating unit 20 and the network 2, supplies the content data and the metadata received to the database-access processing unit 54 via the network-communication control unit 59, and causes the content-file storing unit 73 and the content information database 72 to store the content data and the metadata, respectively. The database-access processing unit 54 causes the content-file storing unit 73 to store the content data as a file and registers a content ID, a content file name stored, the metadata, and the like in the content information database 72 as content information. Information on the content registered in the content information database 72 is displayed on a screen as, for example, my library.

In step S5, the network-communication control unit 59 controls the network communication unit 60 to access the detailed metadata server 5 and request the detailed metadata of the content acquired from the content server 3. The network communication unit 60 accesses detailed metadata server 5 via the communicating unit 20 and the network 2, transmits the content ID of the content stored in the PC 1, and request detailed metadata thereof.

When the communicating unit 20 of the detailed metadata server 5 receives the access from the PC 1, in step S21, the CPU 11 authenticates the user. When the user uses this detailed metadata server 5 for the first time, user registration is performed. Therefore, when the user of the PC 1 is a registered user, the CPU 11 authenticates the user of the PC 1 and the processing proceeds to step S22. The CPU 11 reads out detailed metadata of the content desired by the user among the detailed metadata of the various contents stored in the detailed metadata database 6 and controls the communicating unit 20 to transmit, via the network 2, the detailed metadata read out. When the user is not a registered user, processing for requesting the user of the PC 1 to register the user is performed.

In step S6, the network communication unit 60 of the PC 1 receives the detailed metadata from the detailed metadata server 5 via the communicating unit 20 and the network 2 and supplies the detailed metadata received to the network-communication control unit 59. The network-communication control unit 59 controls the database-access processing unit 54 to store the detailed metadata in the content information database 72 in association with the content and supply the detailed metadata to the artist-link-processing control unit 53.

In step S7, the artist-link-processing control unit 53 generates artist link information on the basis of the detailed metadata from the detailed metadata server 5 and controls the database-access processing unit 54 to store the artist link information generated in the ALM database 71.

For example, the detailed metadata includes a content ID, genre information, sub-genre information, and an artist name of the content. The detailed metadata is not limited to the genre and may be metadata for classifying more in detail "Tempo" indicating other metadata (speed (Bpm) of the content), "Major" indicating whether a melody of the content is major or minor, "Rhythm Ratio (a ratio of a rhythm)" indicating whether a rhythm of the content is percussive or quiet, "HiMid (high tone)" indicating whether a tone of the content is a high tone (Hi) or a low tone (Low), "age" indicating a year when the content was released (put to sale), "Ranking" indicating listening and viewing ranking of users, and the like. The detailed metadata can also constitute analysis data obtained by analyzing the content. This analysis data means data obtained by analyzing speed (tempo) of the content, a melody (major or minor) of the entire content, a rhythm (a rate of use of the percussion) of the content, and the like.

The artist-link-processing control unit 53 sets the sub-genre as an artist group, registers the sub-genre in the artist group list table 81 in association with an artist group ID, registers an artist of the content in the artist list table 82 in association with an artist ID, and registers the respective IDs in the artist link correspondence table 83 such that the artist name of the content classified into the sub-genre is included in the artist group as the sub-genre.

When the sub-genre is already registered as an artist group, an artist of the content classified into the sub-genre is added to the registered artist group.

As described above, in the PC 1, artist link information is generated on the basis of the detailed metadata acquired from the detailed metadata server 5 and the artist link information generated is stored in the ALM database 71.

In the example explained above, when the PC 1 acquires the content data, the PC 1 acquires the detailed metadata. However, it is also possible to search through the content information database 72 during starting or every predetermined time and, if there is content without detailed metadata, acquire metadata.

Figure 9:
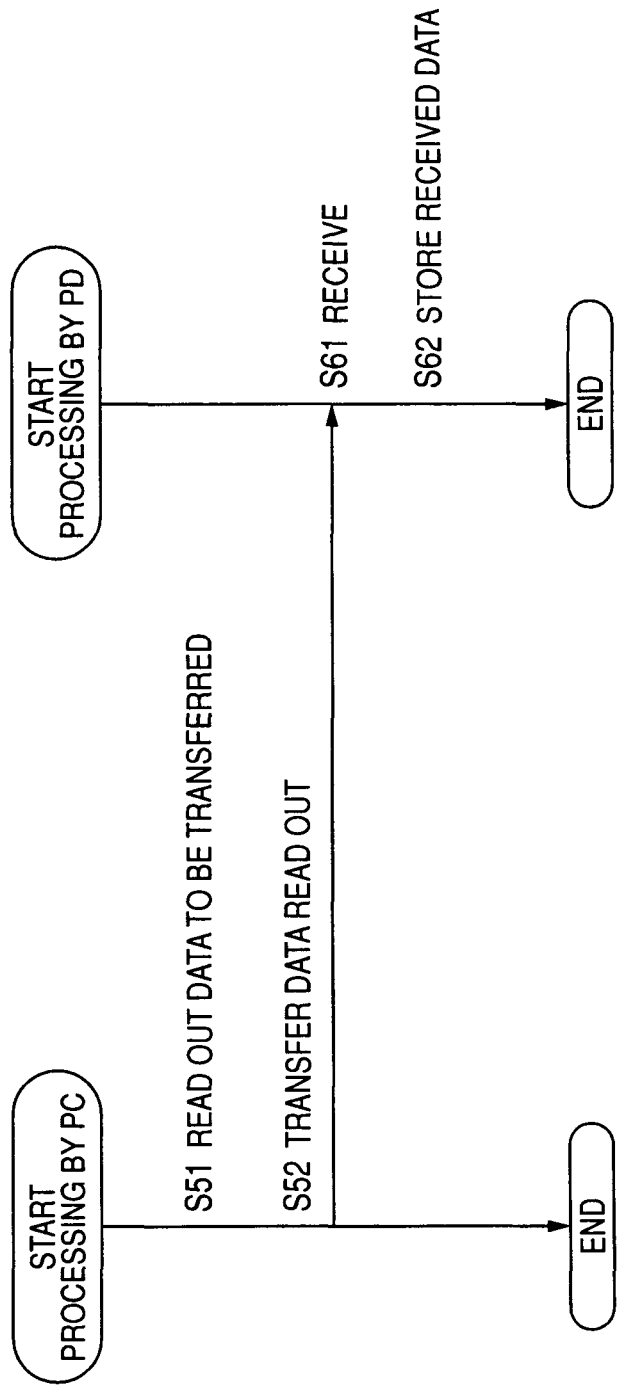
FIG. 9 is a flowchart for explaining another example of the processing by the content providing system in FIG. 1.

An example of processing for transferring data from the PC 1 to the PD 7 in the content providing system in FIG. 1 will be explained with reference to a flowchart in FIG. 9. Although not shown in the figure, in the PD 7, as in the PC 1, the artist-link-display processing unit 51 to the database-access processing unit 54 and the ALM database 71, the content information database 72, and the content-file storing unit 73 established in the storing unit 19 are constituted.

The PD 7 is connected to the PC 1 via the not-shown USB cable. For example, a transfer button for instructing transfer to the PD 7 is displayed on the display unit 17 of the PC 1. The user depresses the transfer button using the mouse or the like constituting the operation input unit 16 of the PC 1 to select content to be transferred to the PD 7.

The basic-GUI control unit 56 of the PC 1 inputs an operation signal corresponding to the operation by the user via the operation input unit 16 and supplies the operation signal to the PD-transfer control unit 57. In step S51, the PD-transfer control unit 57 controls the database-access processing unit 54 to read out data concerning content, which the user desires to transfer, from the ALM database 71, the content information database 72, and the content-file storing unit 73 according to the operation signal from the basic-GUI control unit 56.

In short, the PD-transfer control unit 57 controls the database-access processing unit 54 to read out data concerning content desired by the user. The database-access processing unit 54 reads out content information (metadata, etc.) desired by the user with reference to the content information database 72, supplies the metadata to the PD-transfer control unit 57, reads out a content file stored in the content-file storing unit 73 on the basis of a content file name in the metadata, and supplies data of the content file (content data) to the PD-transfer control unit 57.

For example, when content is transferred together with a play list, concerning transferred content data, it is seen that the content data has been transferred by, for example, referring to a PD transfer history of the content information database 72. Thus, in this case, the content data is not read out and only the play list is transferred.

The PD-transfer control unit 57 controls the database-access processing unit 54 to read out, from the ALM database 71, artist link information associated with an artist name of the content desired by the user read out from the content information database 72. The database-access processing unit 54 reads out an artist ID of the artist name of the content desired by the user and an artist group ID corresponding thereto with reference to the artist table 82 and the artist link correspondence table 83, reads out an artist group name corresponding to the artist group ID from the artist group list table 81, and supplies the artist link information read out to the PD-transfer control unit 57.

In step S52, the PD-transfer control unit 57 causes the PD communication unit 58 to transfer data (content data, metadata, and artist link information) concerning the content read out from the database-access processing unit 54. In this case, as described above, the PD-transfer control unit 57 transfers information on only the artists having higher twenty orders of priority among the artists included in the artist group on the basis of the order information in the artist link correspondence table 83. In response, the PD communication unit 58 transfers the data concerning the content, which the user desires to transfer, to the PD 7 via the communicating unit 20 and the USB cable.

In step S61, the communicating unit 20 of the PD 7 receives the data concerning the content from the PC 1 via the USB cable and supplies the data to the database-access processing unit 54. In step S62, the database-access processing unit 54 of the PD 7 stores the content data and the metadata in the content-file storing unit 73 and the content information database 72 of the PD 7, respectively, and stores the artist link information in the ALM database 71 of the PD 7.

In short, the database-access processing unit 54 causes the content-file storing unit 73 to store the content data as a file, registers the content ID, the stored content file name, the metadata, and the like in the content information database 72 as content information, and registers the artist link information from the PC 1 in the ALM database 71.

As described above, in the PD 7, as in the PC 1, the artist link information is stored in the ALM database 71. Therefore, edition processing and display control processing for artist link information in the PC 1 explained below are also performed in the PD 7.

Figure 10:
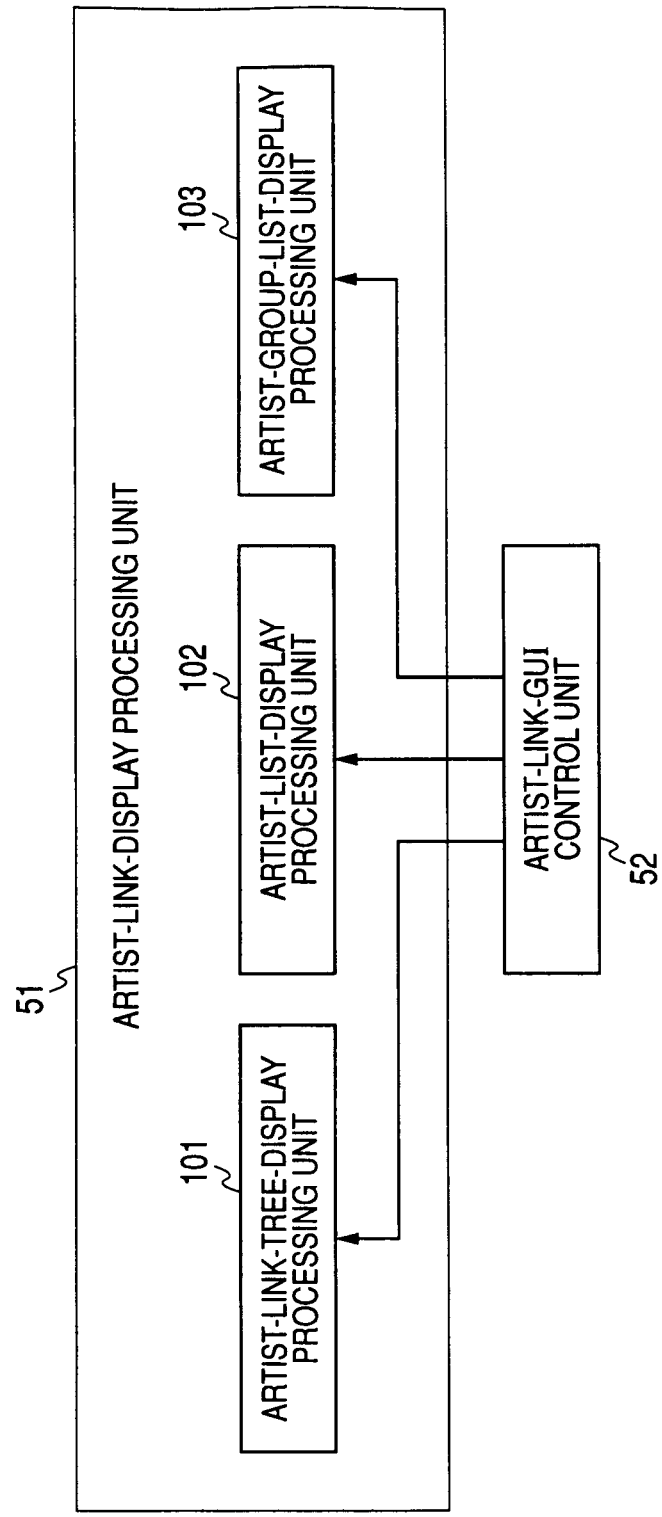
FIG. 10 is a block diagram showing an example of a structure of an artist-link-display processing unit in FIG. 4.

FIG. 10 shows an example of a detailed structure of the artist-link-display processing unit 51 in FIG. 4.

The artist-link-display processing unit 51 has three kinds of display screens concerning artist link information. The artist-link-display processing unit 51 includes an artist-link-tree-display processing unit 101, an artist-list-display processing unit 102, and an artist-group-list-display processing unit 103 that generate one kind of display screen, respectively, and cause the display unit 17 to display the display screen under the control by the artist-link-GUI control unit 52.

The artist-link-tree-display processing unit 101 generates a GUI image such as a display screen for displaying, in a tree format, artist link information of a base artist selected according to operation by the user, for example, as shown in FIG. 11 by referring to information of the ALM database 71 from the artist-link-GUI control unit 52 and causes the display unit 17 to display the display screen formed by the GUI image generated.

FIG. 11 shows an example of display of the artist link information of the base artist. In the example in FIG. 11, the artist link information of the base artist in the case in which the base artist is an artist A is displayed in the tree format.

An icon representing the artist A as the base artist is arranged on the left side in FIG. 11 and icons representing artist groups AG1 to AG3 including the base artist are arranged on the right side of the icon (in the center of FIG. 11). Lines are displayed between the icons representing the artist groups AG1 to AG3 and the icon representing the artist A to indicate the link with the artist A.

Moreover, icons representing artists (i.e., since the artists are included in the artist group AG1 in which the base artist is included, the artists are related artists related to the base artist from the viewpoint of the artist group AG1) B to D, which are included in the artist group AG1 other than the base artist, are arranged in the artist group AG1 in which the base artist is included. Icons representing related artists C and E, which are included in the artist group AG2 other than the base artist, are arranged in the artist group AG2 in which the base artist is included. Icons representing related artists F to H, which are included in the artist group AG3 other than the base artist, are arranged in the artist group AG3 in which the base artist is included.

These icons representing the related artists B to D are displayed to be connected by lines to the icon representing the artist group AG1 to show the link with the artist group AG1. The icons C and E are displayed to be connected by lines to the icon representing the artist group AG2 to indicate the link with the artist group AG2. The icons representing the related artists F to H are displayed to be connected by lines to the icon representing the artist group AG3 to indicate the link with the artist group AG3.

In this way, as the artist link information of the base artist, not only the related artists as a result of searching through the artist link information but also the artist groups including the related artists and the base artist are displayed. Thus, a relation between the related artists and the base artist (i.e., the link of the related artists and the base artist by a category of the same artist group) is clearly indicated. Consequently, the user can understand reasons why the base artist and the related artists are related.

In the example in FIG. 11, the related artists for all the artist groups in which the base artist is included are displayed. However, for example, as shown in FIG. 12, it is also possible to display only related artists of a focused artist group.

In an example in FIG. 12, for example, the artist group AG2 among the artist groups AG1 to AG3, in which the base artist A is included, is focused and only the icons of the related artists C and E in the artist group AG2 are displayed. In this case, since the artist groups AG1 and AG3 are not focused, the respective lines between the icon representing the base artist A and the icons representing the artist groups AG1 and AG3 are displayed thin (by alternate long and short dash lines).

When an artist group focused is changed according to operation by the user, another artist group AG1 or AG3 is focused and related artists of the artist group focused are displayed.

Since only the related artists of the focused artist group are displayed in this way, there is an advantage that the display is plain, in particular, when there are a large number of related artists included in the respective artist groups.

Referring back to FIG. 10, the artist-list-display processing unit 102 generates a GUI image such as a display screen, in which a list of artists stored in the artist list table 82 is displayed, by referring to the information of the artist list table 82 for the artist-link-GUI control unit 52 and causes the display unit 17 to display the display screen formed by the GUI image generated.

The artist-group-list-display processing unit 103 generates a GUI image such as a display screen, in which a list of artist groups stored in the artist group list table 83 is displayed, by referring to the information of the ALM database 71 from the artist-link-GUI control unit 52 and causes the display unit 17 to display the display screen formed by the GUI image generated.

Figure 13:
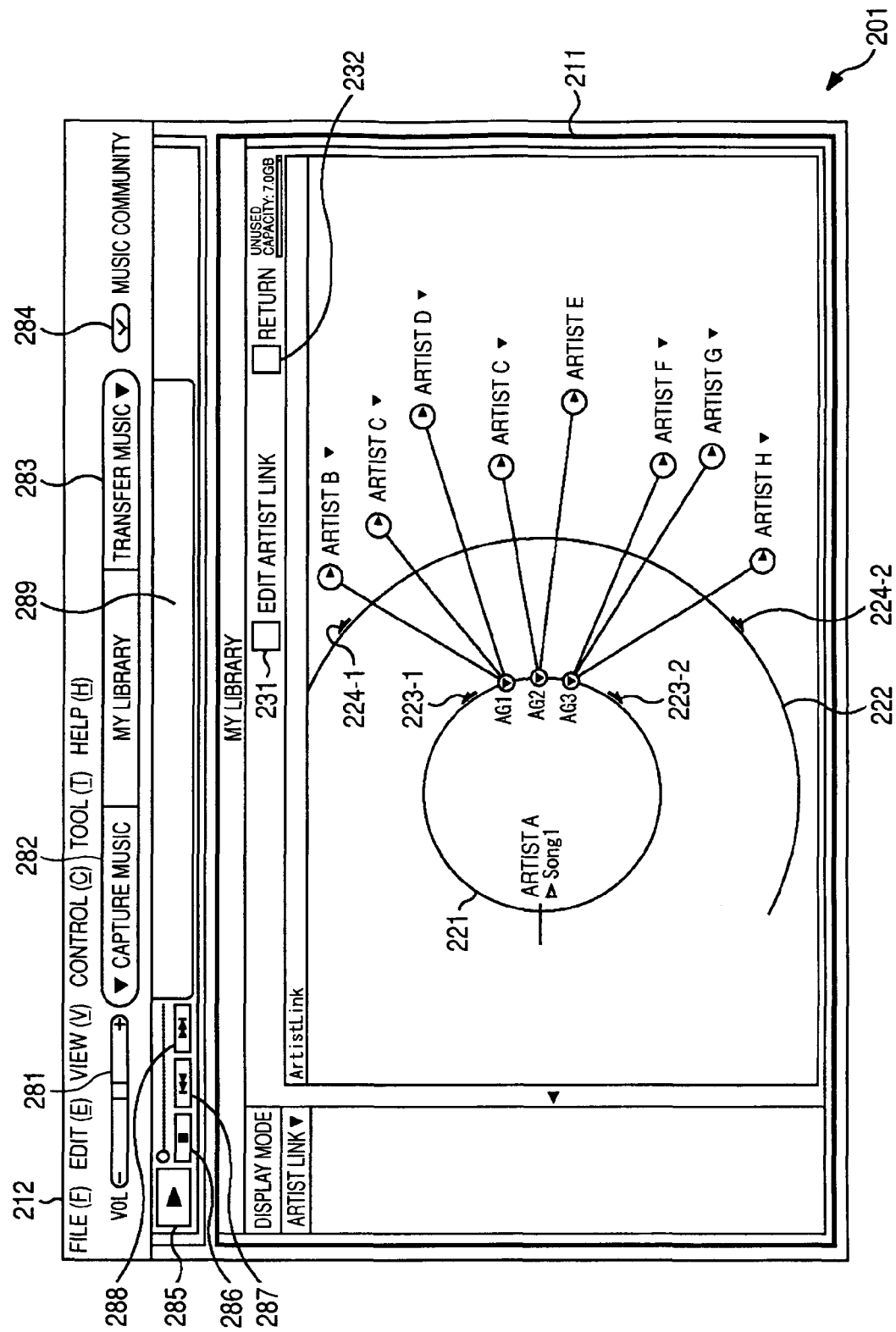
FIG. 13 is a diagram showing an example of a display screen displayed on a display unit.

FIG. 13 shows an example of the display screen displayed on the display unit 17.

A display screen 201 in FIG. 13 includes an artist link map preview screen 211 that is switched to other display screens for displaying artist link information according to operation by the user and a basic function display screen 212 that is displayed without being switched.

The artist link map preview screen 211 is a screen displayed by the artist-link-tree-display processing unit 101. On the artist link map preview screen 211, according to operation by the user, artist link information of a base artist as a base is displayed in the tree format as described with reference to FIG. 11.

Specifically, on the artist link map preview screen 211, a small circle 221 is displayed closer to the left side, a large circle 222 is displayed around the small circle 221, and, on the left side in the small circle 221, an artist name "artist A" of the base artist and a content name "Song 1" of content being played among contents of the base artist are displayed. A white triangular icon displayed on the left of the content name indicates that the content is being played.

On a right side circumference of the small circle 221, icons representing the artist groups AG1 to AG3, in which the base artist is included, are displayed in order. On the outer side than a right side circumference of the large circle 222, icons of the related artists B to H included in the respective artist groups AG1 to AG3 connected to the icons of the corresponding artist groups AG1 to AG3 via lines are displayed.

In short, in order from above, the icons of the related artists B, C, and D included in the artist group AG1 are displayed to be connected to the icon of the artist group AG1 via lines. The icons of the related artists C and E included in the artist group AG2 are displayed to be connected to the icon of the artist group AG2 via lines. The icons of the related artists F, G, and H included in the artist group AG3 are displayed to be connected to the icon of the artist group AG3 via lines.

An order of display of the icons of the related artists in each of the artist groups is based on the order information in FIG. 6. In the example in FIG. 13, the icons of the related artists are displayed such that an artist with a higher order of priority is placed higher in each of the artist groups.

A black triangular icon shown on the right side of each of the artist names of the related artists indicates that content of an artist corresponding thereto is registered in the content information database 72 and it is possible to play the content. Therefore, in the example in FIG. 13, it is seen that content of the related artist E, on the right side of which the black triangular icon is not displayed, is not registered in the content information database 72.

On the artist link map preview screen 211, when an icon of a related artist (e.g., the artist C) attached with the black triangular icon is pointed according to operation of the mouse or the like constituting the operation input unit 16 by the user, the artist C is set as a base artist, content data of the artist C is reproduced, and artist link information of the artist C set as the base artist is displayed in a tree on the basis of the ALM database 71.

The artist name of the artist C is displayed on the left side in the small circle 221. A content name of content being played among the contents of the base artist C is displayed. The icons of the artist groups AG1 and AG2, in which the base artist C is included, are displayed in order on the right side circumference of the small circle 221. On the outer side than the right side circumference of the large circle 222, the icons of the related artist A, B, and D included in the artist group AG1 connected to the icon of the artist group AG1 by lines and the icons of the related artists A and E included in the artist group AG2 connected to the icon of the artist group AG2 via lines are displayed.

On the other hand, on the artist link map preview screen 211, when an icon of a related artist (e.g., the artist E) not attached with the black triangular icon is pointed according to operation of the mouse or the like constituting the operation input unit 16 by the user, content data of the artist E is not stored in the PC 1. Thus, the network-communication control unit 59 can control the network communication unit 60 according to an operation signal from the artist-link-GUI control unit 52 to access a Web page (e.g., a URL in the content server 3 from which content as an object can be downloaded) related to the artist via the network 2.

On the small circle 221 of the artist link map preview screen 211, an arrow 223-1 arranged above the icon of the artist group AG1 and an arrow 223-2 arranged below the icon of the artist group AG3 are icons for scrolling, when there are other group artists, in which the base artist is included, other than those displayed at present, display of icons of the group artists such that icons of the other group artists are displayed. Similarly, on the large circle 222, an arrow 224-1 arranged above a line connecting the icon of the artist group AG1 and the icon of the artist B and an arrow 224-2 arranged below a line connecting the icon of the artist group AG3 and the icon of the artist H are icons for scrolling, when there are other related artists other than those displayed at present, display of icons of the other related artists such that the icons of the other related artists are displayed.

Moreover, an artist link edition button 231 for switching display to an artist link map edition screen 301 (FIG. 14) described later, which is a screen for editing artist link information, and a return button 232 for returning display to an immediately preceding screen are arranged in an upper part in the artist link map preview screen 211.

The basis function display screen 212 is a screen displayed by the basic-display processing unit 55. The basic function display screen 212 is typically displayed on the outer side of the artist link map preview screen 211, display of which is switched according to operation by the user, the artist link map edition screen 301 in FIG. 14 described later, and the like to surround those screens.

On the basic function display screen 212, a volume button 281 for adjusting volume, an import button 282 for importing (encoding and recording) content from a CD or the like, a transfer button 283 for transferring content, a play list, and the like to the PD 7, a communication button 284 for accessing an external server via the network 2 in order to perform communication with other users using content, a play operation button 285 for instructing play during stop of content and instructing pause during playing of the content, a stop button 286 for stopping play of the content, a "forward" button 287 for pointing content immediately preceding content as a play object, a "next" button 288 for pointing content immediately following the content as a play object, a presenting unit 289 in which a name of content being played, an artist name, an image, and the like are presented are constituted.

Figure 14:
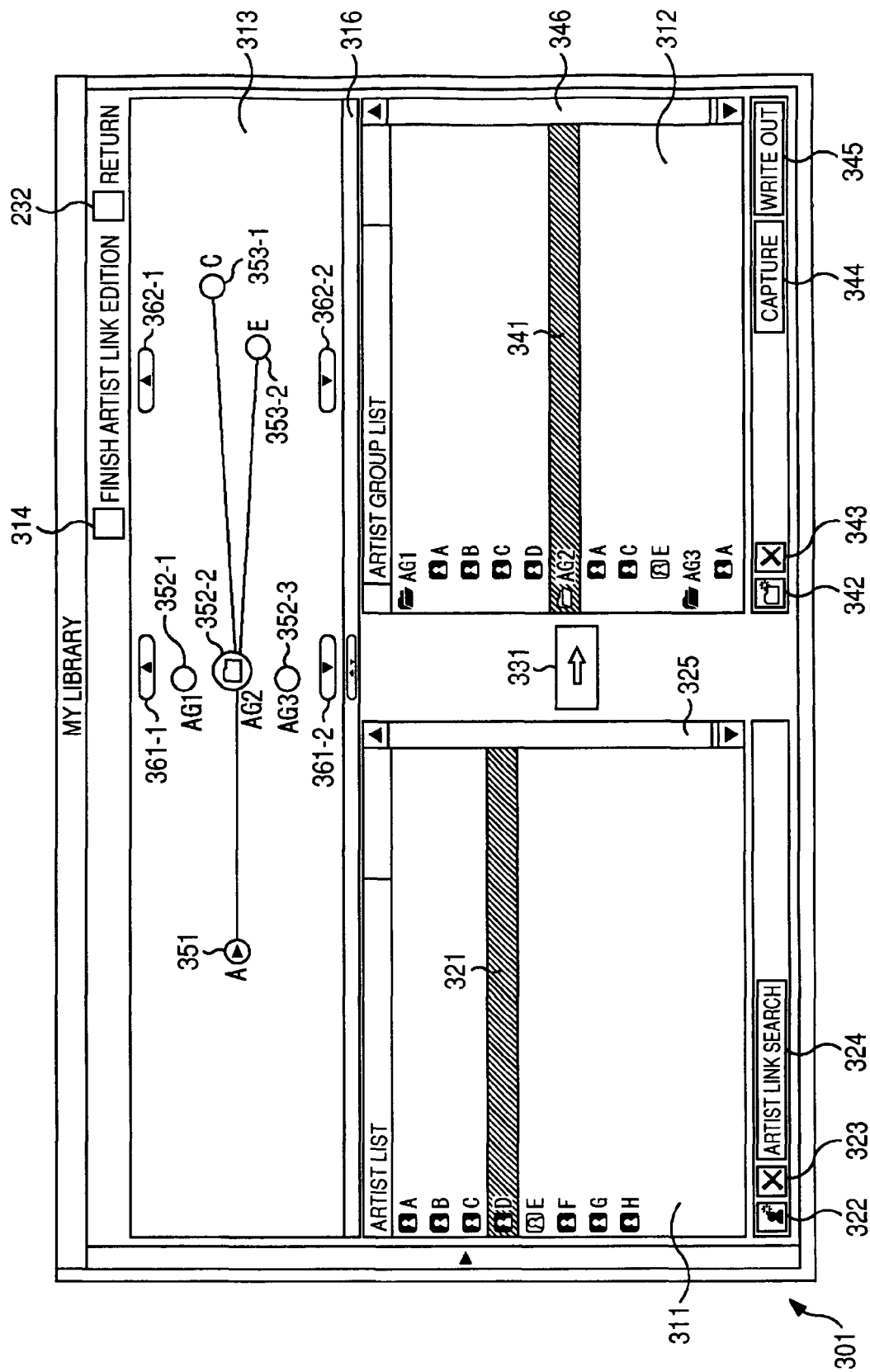
FIG. 14 is a diagram showing an example of a structure of an artist link map edition screen.

When the artist link edition button 231 is depressed according to operation of the mouse or the like constituting the operation input unit 16 by the user, in response to the depression, display of the artist link map preview screen 211 on the display screen 201 in FIG. 13 is switched to the artist link map edition screen 301 shown in FIG. 14.

FIG. 14 shows an example of display of an artist link map edition screen. In the example in FIG. 14, only the artist link map edition screen 301 in the display screen 201 is shown.

The artist link map edition screen 301 roughly includes an artist list screen 311, an artist group list screen 312, and an artist link tree screen 313. As an arrangement, the artist list screen 311 and the artist group list screen 312 are arranged side by side below the artist link tree screen 313.

In an upper part of the artist link tree screen 313, an artist edition finish button 314 for returning display from the artist link map edition screen 301 to the artist link map preview screen 201 in FIG. 13, which is a screen for performing play, a return button 232 for returning the display to an immediately preceding screen are arranged. A splitter bar 316 that is moved up and down to change a ratio of display of the artist link tree screen 313 and the artist list screen 311 and the artist group list screen 312 is arranged between the artist link tree screen 313 and the artist list screen 311 and artist group list screen 312.

The artist list screen 311 is a screen displayed by the artist-list-display processing unit 102. The artist group list screen 312 is a screen displayed by the artist-group-list-display processing unit 103. The artist link tree screen 313 is a screen displayed by the artist-link-tree-display processing unit 101. Edition of artist link information performed on the artist list screen 311 and the artist group list screen 312 is immediately reflected on display of the artist link tree screen 313. Instruction of selection by the user and edition of artist link information on the artist link tree screen 313 are also immediately reflected on display of the artist group list screen 312.

The respective screens will be hereinafter explained in detail. A list of artist names (A to H) stored in the artist list table 82 is displayed on the artist list screen 311 together with artist icons. An artist icon attached with the artist E (hereinafter also referred to as icon of the artist E) is displayed in a color different from icons of the other artists. This indicates that content of the artist E is not stored in the PC 1. A cursor 321 indicating that the artist D is selected by the user is displayed on the icon of the artist D.

In a lower part in the artist list screen 311, an artist addition button 322 for adding a new artist to the artist list table 82, an artist deletion button 323 for deleting an artist being selected by the cursor 321 from the artist list table 82, and an artist link search button 324 for displaying artist link information of the artist being selected by the cursor 321 on the artist link tree screen 313 as a base artist are arranged. A scroll bar 325 for scrolling a list of artist names displayed on the artist list screen 311 is provided on the right side of the artist list screen 311.

An artist group addition button 331 for adding an artist being selected by the cursor 321 on the artist list screen 311 to an artist group being selected on the artist group list screen 312 is arranged between the artist list screen 311 and the artist group list screen 312.

A list of the artist groups stored in the artist group list table 81 is displayed on the artist group list screen 312 together with folder icons. A folder icon attached with the artist group AG2 (hereinafter also referred to as icon of the artist group AG2) is display in a color different from colors of icons of the other artist groups. This indicates that an artist included in the artist group AG2 is set as a base artist and artist link information of the artist is displayed on the artist link tree screen 313. A cursor 341 indicating that the artist group AG2 is selected by the user is displayed on the icon of the artist group AG2.

On the artist group list screen 312, the folder icons are displayed in a closed state in default. When a folder icon in the closed state is clicked, the folder icon in an opened state is displayed, information of the artist link correspondence table 83 is referred to, and icons of artists included in an artist group corresponding to the folder icon are displayed below the folder icon opened. In the example in FIG. 14, all the folder icons of the artist groups AG1 to AG3 are opened and icons of artists included in the respective artist groups are displayed from the top in the order of the order information in the artist link correspondence table 83.

Specifically, artist icons of the artists A, B, C, and D included in the artist group AG1 are displayed below the folder of the artist group AG1, artist icons of the artists A, C, and E included in the artist group AG2 are displayed below the folder of the artist group AG2, and an artist icon of the artist A included in the artist group AG3 is displayed below the folder of the artist group AG3. Besides, the artists F, G, and H are included in the artist group AG3. However, in the example in FIG. 14, since there is no display space, the artists are not displayed on the artist group list screen 312. For example, when a scroll bar 346 or the like described later is operated by the user, the artists are displayed on the artist group list screen 312.

On the artist group list screen 312, when an order of the artists included in the respective artist groups is changed according to operation of the mouse or the like constituting the operation input unit 16 by the user, an order in the artist link tree screen 313 is also changed. As described later with reference to FIG. 15, it is possible to change the orders of priority (the order information) of the artists included in the corresponding artist group of the artist link correspondence table 83 in FIG. 5.

In a lower part in the artist group list screen 312, an artist group addition button 342 for adding a new artist group to the artist group list table 81, a deletion button 343 for deleting an artist group being selected by the cursor 341 from the artist group list table 81 or deleting an artist being selected by the cursor 341 from an artist group corresponding thereto, an import button 344 for importing artist link information written out to an XML (Extensible Markup Language) file, and a write out button 345 for writing out artist link information of at least one artist group being selected by the cursor 341 to an XML file are arranged. A scroll bar 346 for scrolling a list of artist groups displayed on the artist group list screen 312 is provided on the right side of the artist group list screen 312.

Artist link information of a base artist is displayed on the artist link tree screen 313 in the tree format as in the case of the artist link map preview screen 211 in FIG. 13.

Specifically, on the artist link tree screen 313, a base icon 351 representing a base artist is displayed on the left side, folder icons 352-1 to 352-3 representing artist groups in which the base artist is included are displayed in the center, and related icons 353-1 and 353-2 of other related artists included a focused artist group among the artist groups in which the base artist is included are displayed on the right side. Between the base icon 351 and the folder icons 352-1 to 352-3, lines representing a link by linking the icons are displayed. Lines are also displayed between the folder icon 352-2 and the related icons 353-1 to 353-2.

In the following description, when it is unnecessary to specifically distinguish the folder icons 352-1 to 352-2, the folder icons 352-1 to 352-2 are simply referred to as the folder icon 352. The related icons 353-1 to 353-2 are also simply referred to as the related icon 353 when it is unnecessary to specifically distinguish the related icons 353-1 to 353-2.

On the artist link tree screen 313, since the artist groups are displayed in this way, the user can recognize reasons why the base artist and the related artists are related (i.e., artist groups). When there are plural artist groups in which the base artist is included, a plurality of the folder icons 352 are displayed. When plural related artists are included in the artist group, a plurality of the related icons 353 are displayed.

In the example in FIG. 14, since the artist A is selected as the base artist, characters of artist A are attached to the base icon 351 and displayed, characters of artist groups AG1, AG2, and AG3, in which the artist A is included, are attached to the folder icons 352-1 to 352-3 and displayed, respectively, and characters of other artists C and E included in the focused artist group AG2 are attached to the related icons 353-1 and 353-2 and displayed.

When an icon of the artist C is selected according to operation of the mouse or the like constituting the operation input unit 16 by the user and then the artist link search 324 is depressed on the artist list display screen 311 or when the related icon 353-1 is clicked on the artist link tree screen 313, the artist C indicated by the related icon 353-1 is set as a base artist. Artist link information of the artist C as the base artist is displayed on the artist link tree screen 313 on the basis of the ALM database 71.

Specifically, on the artist link tree screen 313 displayed, characters of artist C set as the base artist are attached to the base icon 351 and displayed, characters of artist groups AG1 and AG2, in which the artist C is included, are attached to the folder icons 352-1 and 352-2 and displayed, and characters of the other artists included in a focused artist group are attached to the related icon 353 and displayed.

On this artist link tree screen 313, for example, when the artist group AG1 is focused according to operation of the operation input unit 16 by the user, on the artist group list screen 312, scroll is performed to arrange a folder icon of the artist group AG1 in a position at the top on the artist group list screen 312 and the folder icon is displayed in a color different from colors of icons of the other artist groups. On the other hand, a folder icon of the artist group AG2 not focused is displayed in a color same as colors of icons of the other artist groups.

On the artist link tree screen 313, as on the artist link map preview screen 211, when the base icon 351 or the related icon 353 is selected (e.g., double clicked) according to operation of the mouse or the like constituting the operation input unit 16 of the user, content data of an artist indicated by the icon selected is reproduced. In this case, an artist corresponding to the related icon 353 is set as a base artist and artist link information of the artist set as the base artist is displayed in a tree on the basis of the ALM database 71.

When content of an artist indicated by the icon double clicked is not stored in the PC 1, the network-communication control unit 59 can control the network communication unit 60 according to an operation signal from the artist-link-GUI control unit 52 to access a Web page (e.g., a URL in the content server 3 from which content as an object can be downloaded) related to the artist via the network 2.

Above and below the folder icon 352 on the artist link tree screen 313, scroll buttons 361-1 and 361-2 for moving display to folder icons representing the other artist groups in which the base artist is included are provided, respectively. Above and below the related artist icon 353, scroll buttons 362-1 and 362-2 for moving display to related icons representing the other related artists are arranged, respectively.

On the artist link tree screen 313, by changing orders of the related icons, for example, according to operation of the mouse or the like constituting the operation input unit 16 by the user, it is also possible to change orders of priority (order information) of artists included in an artist group corresponding thereto of the artist link correspondence table 83 in FIG. 5.

Rearrangement of order information of artists on the artist group list screen 312 will be explained with reference to FIG. 15.

Figure 15:
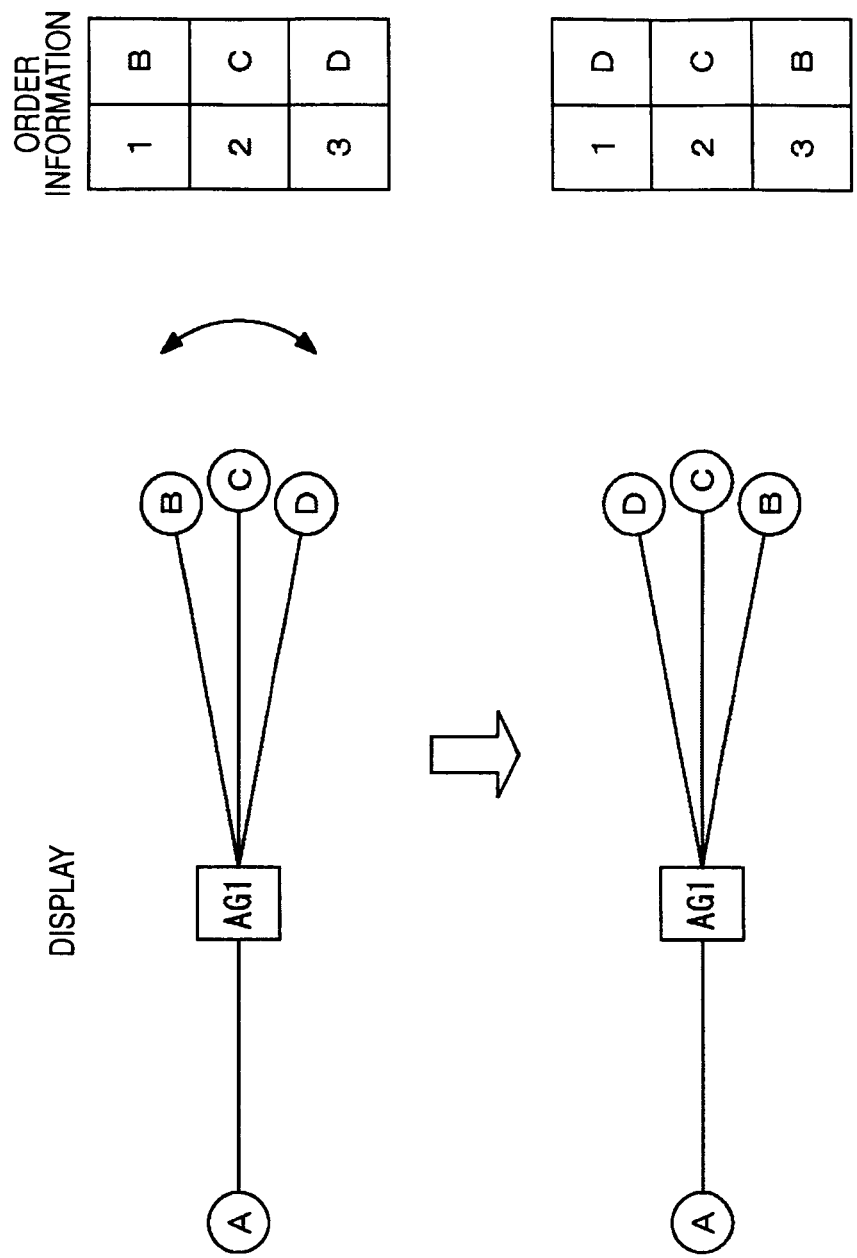
FIG. 15 is a diagram for explaining rearrangement of order information of artists.

In an example in FIG. 15, an example of display on the artist link tree screen 313 and order information concerning the artist group AG1 stored in the artist link correspondence table 83 are shown in order from the left.

Specifically, on the artist link tree screen 313, the artist A is set as a base artist and an icon representing the artist A is displayed in a position of the base artist. As artist link information of the artist A, an icon representing an artist group AG1, in which the artist A is included, and respective icons representing the other artists B, C, and D included in the artist group AG1 are displayed from above in order from one with a highest order of priority (order information) stored in the artist link correspondence table 83.

Although not shown in the figure, concerning the artist group AG1 on the artist group list screen 312, artist names are displayed together with icons from above in order from one with a highest order of priority (order information), for example, in an order of the artist A, the artist B, the artist C, and the artist D.

For example, in the artist group AG1 on the artist group list screen 312, the icon of the artist D is dragged and dropped to a position above the icon of the artist C according to operation of the mouse or the like constituting the operation input unit 16 by the user and then the icon of the artist B is dragged and dropped to a position below the icon of the artist C. In this way, edition for replacing the positions of the icon of the artist B and the icon of the artist D is performed.

Consequently, as indicated by an arrow, on the artist link tree screen 313, the edition on the artist group list screen 312 is immediately reflected as the icon of the artist D, the icon of the artist C, and the icon of the artist B. The order of the order information stored in the artist link correspondence table 83 is updated to an order of the artist D, the artist C, and the artist B from one with a highest order of priority.

The order information updated as described above is used for transfer to the PD 7 as explained below with reference to FIG. 16.

Figure 16:
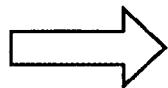
FIG. 16 is a diagram for explaining order information and a transfer order of artists.

In an example in FIG. 16, order information concerning the artist groups AG1 to AG3 stored in the artist link correspondence table 83 and a transfer order of artist link information are shown.

Specifically, the artists D, C, and B are included in the artist group AG1 and order information of the artists D, C, and B is set higher in an order of the artist D, the artist C, and the artist B. The artists C and E are included in the artist group AG2 and order information of the artists C and E is set higher in an order of the artist C and the artist E. The artists F, G, and H are included in the artist group AG3 and order information of the artists F, G, and H is set higher in an order of the artist F, the artist G, and the artist H. The order of the artists in the artist group AG1 in FIG. 16 is a result of rearrangement by the rearrangement edition in FIG. 15.

When artist link information is transferred to the PD 7 as described above with reference to FIG. 9, since a storage capacity of the PD 7 is small and limited compared with a storage capacity of the PC 1, when the plural artist groups are present, artist link information of artists with, for example, twenty higher orders of priority are selected from the respective artist groups in order from artist link information of an artist with a highest order of priority as indicated by an arrow and transferred.

In the case of the example in FIG. 16, artist link information of the artist D with a highest order of priority in the artist group AG1 is transferred first, artist link information of the artist c with a highest order of priority in the artist group AG2 is transferred second, and artist link information of the artist F with a highest order of priority in the artist group AG3 is transferred third.

Since the artist link information of the artist C with a second highest order of priority in the artist group AG1 has already been transferred, artist link information of the artist B with a third highest order of priority is transferred fourth and artist link information of the artist E with a second highest order of priority in the artist group AG2 is transferred fifth. Artist link information of the artist G with a second highest order of priority in the artist group AG3 is transferred sixth. Lastly, artist link information of the artist G with a third highest order of priority in the artist group AG3 is transferred seventh.

As described above, it is possible to rearrange orders of priority of the artists for each of the artist groups. The artist link information is transferred to the PD 7 in an order on which a result of the edition of rearrangement is reflected. Therefore, it is possible to preferentially transfer information desired by the user to the PD 7 with a limited storage capacity.

Figure 17:
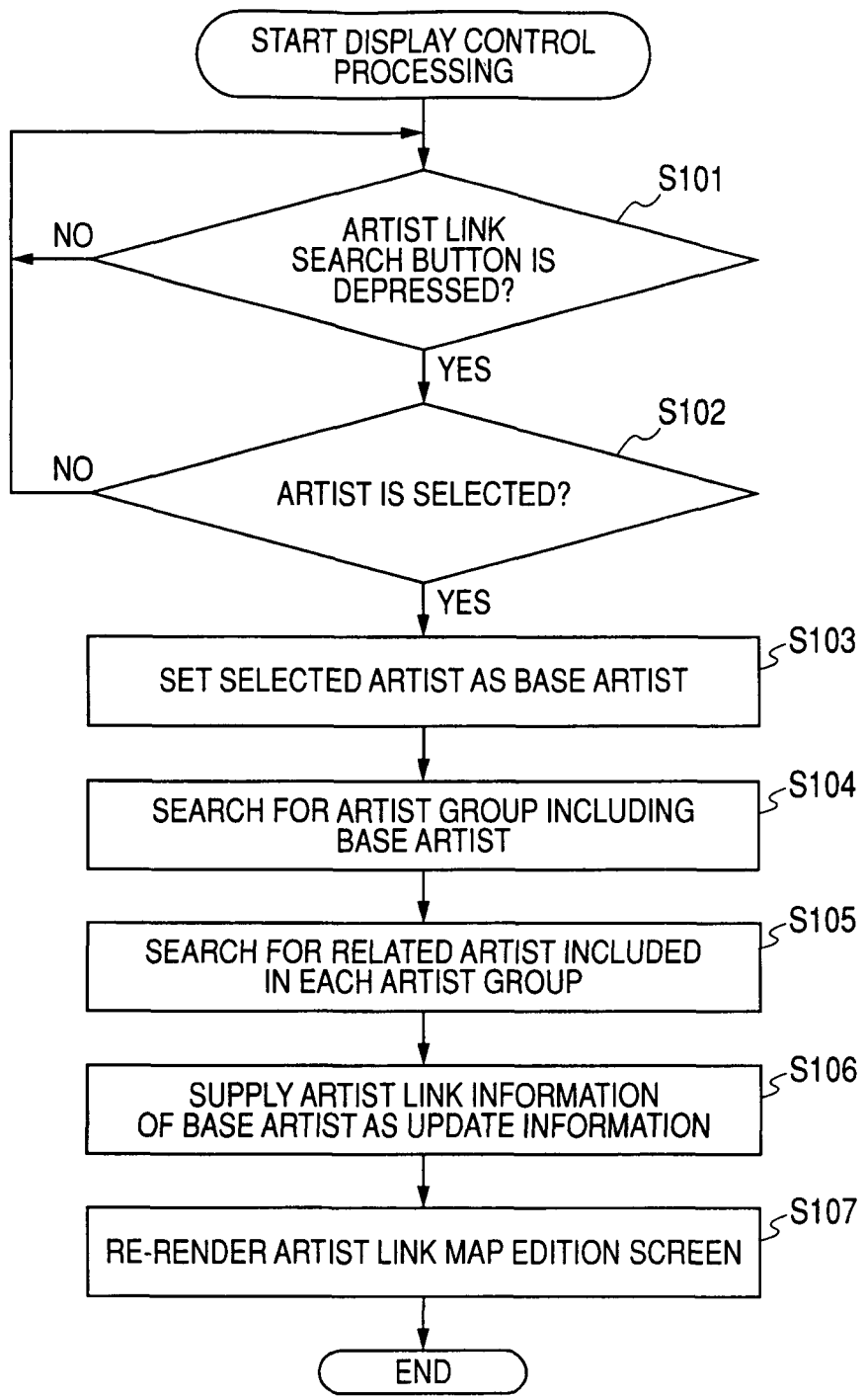
FIG. 17 is a flowchart for explaining display control processing for the artist link map edition screen in FIG. 14.

A display control processing for the artist link map edition screen 301 will be explained with reference to a flowchart in FIG. 17.

For example, when the user operates the operation input unit 16 and instructs edition of an artist link, the artist link map edition screen 301 in FIG. 14 is displayed on the display unit 17 by the artist-link-display processing unit 51 under the control by the artist-link-GUI control unit 52. For example, the user operates the operation input unit 16 to select, as indicated by the cursor 321 in FIG. 14, an icon of an artist whose artist link information is desired to be displayed, for example the artist D on the artist list screen 311 and depresses the artist link search button 324 arranged below the artist list screen 311.

In step S101, the artist-link-GUI control unit 52 stays on standby until the artist link search button 324 is depressed. An operation signal corresponding to depression of the artist link search button 324 by the user is inputted to the artist-link-GUI control unit 52 via the operation input unit 16. According to the operation signal, the artist-link-GUI control unit 52 judges that the artist link search button 324 is depressed and the processing proceeds to step S102. In step S102, the artist-link-GUI control unit 52 judges whether an artist is selected. When it is judged that an artist is not selected, the processing returns to step S101 and the artist link GUI control unit 52 repeats processing in step S101 and the subsequent steps.

For example, the icon of the artist D is selected by the cursor 321 on the artist list screen 311 in FIG. 14. When it is judged in step S102 that an artist is selected, the processing proceeds to step S103. The artist-link-GUI control unit 52 sets the artist (the artist D) selected as a base artist. The artist-link-GUI control unit 52 controls the artist-link-processing control unit 53 to search for artist groups, in which the base artist is included, from the ALM database 71 in step S104.

In step S104, the artist-link-processing control unit 53 controls the database-access processing unit 54 to search for artist groups, in which the artist D is included, from the ALM database 71. Information on the artist groups found is supplied to the artist-link-GUI control unit 52 via the artist-link-processing control unit 53.

In step S105, the artist-link-processing control unit 53 controls the database-access processing unit 54 to search for related artists included in each of the artist groups found. In other words, in step S105, the database-access processing unit 54 finds related artists included in each of the artist groups from the ALM database 71. Information on the related artists found is supplied to the artist-link-GUI control unit 52 via the artist-link-processing control unit 53.

In step S106, the artist-link-GUI control unit 52 supplies the artist link information of the base artist (i.e., information on the artist groups found in step S104 and information on the related artists found in step S105) to the artist-link-display processing unit 51 as update information.

In step S107, the artist-link-display processing unit 51 re-renders the artist link map edition screen 301 on the basis of update information. The artist-link-tree-display processing unit 101 re-renders the artist link tree screen 313 and the artist-list-display processing unit 102 and the artist-group-list-display processing unit 103 re-render the artist list screen 311 and the artist group list screen 312, respectively, when necessary.

Figure 18:
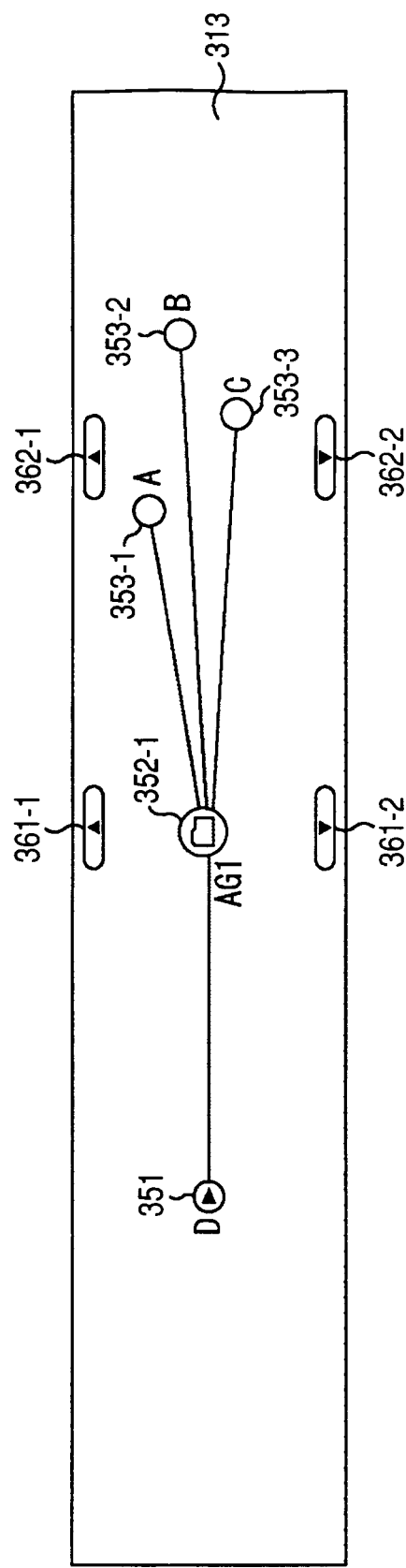
FIG. 18 is a diagram showing an example of display of an artist link tree screen.

Consequently, the artist link tree screen 313 of the artist link map edition screen 301 re-rendered by the artist-link-tree-display processing unit 101 is updated and displayed as shown in FIG. 18.

On the artist link tree screen 313 in FIG. 18, artist link information of the artist D as a base artist is displayed. Specifically, characters of artist D set as the base artist are attached to the base icon 351 and displayed, characters of artist group AG1, in which the artist D is included, are attached to the folder icon 352-1 and displayed, and characters of other artists A, B, and C included in a focused artist group are attached to the related icons 353-1 to 353-3, respectively, and displayed.

In this case, although not shown in the figure, on the artist group list screen 312 re-rendered by the artist-group-list-display processing unit 103, the folder icon of the artist group AG2 displayed white on the artist group list screen 312 in FIG. 14 is displayed in black in the same manner as the other folder icons. The folder icon of the artist group AG1 focused on the artist link tree screen 313 in FIG. 18 is displayed in a color (white) different from the color of the other folder icons.

As described above, a result of edition on the artist list screen 311 of the artist link map edition screen 301 is immediately reflected on display of the artist link tree screen 313 and the artist group list screen 312. Therefore, since the user can easily perform edition work, burden of the edition work on the user is reduced. Consequently, the user can readily perform edition without any hesitation.

Figure 19:
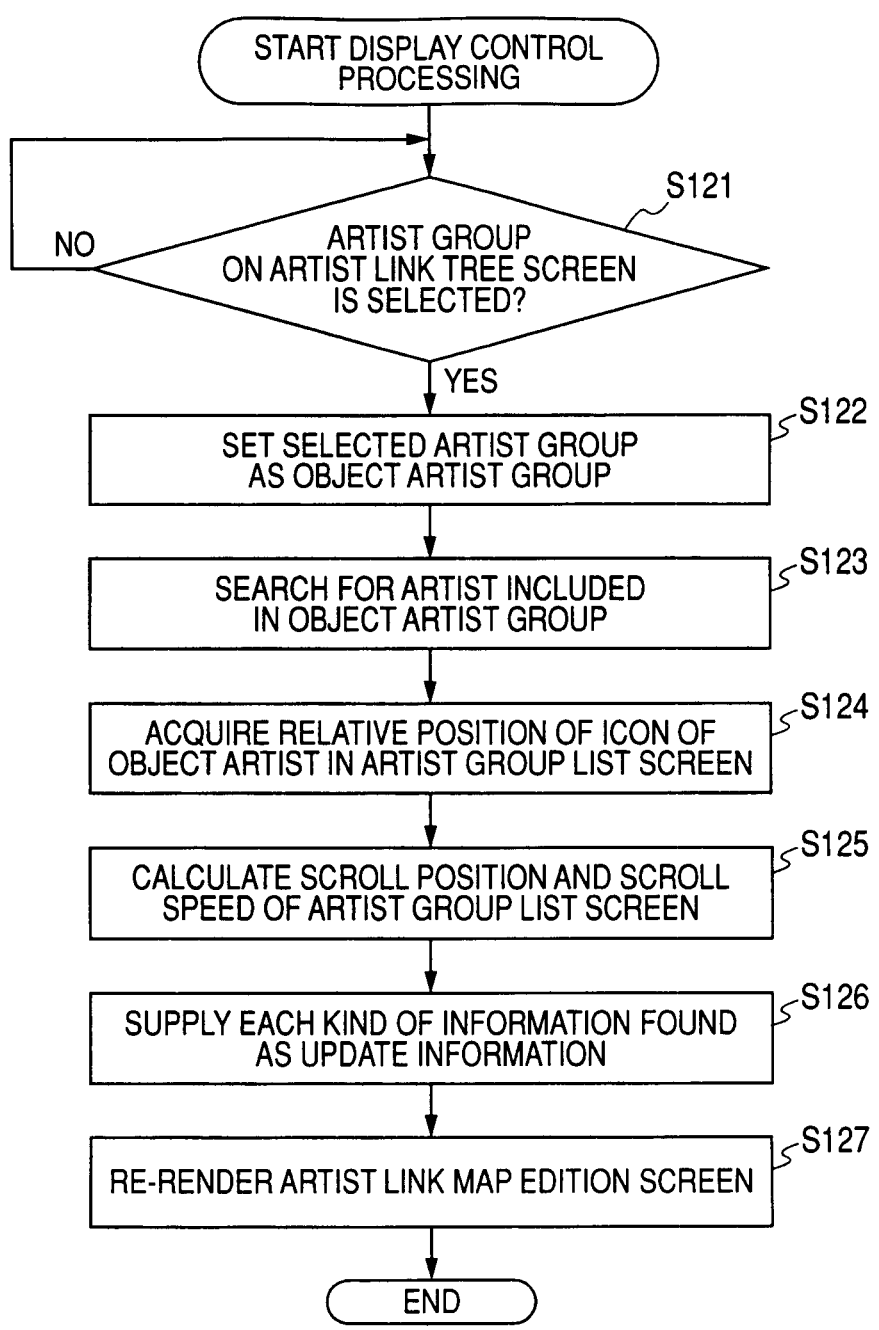
FIG. 19 is a flowchart for explaining another example of the display control processing for the artist link map edition screen in FIG. 14.

Another example of the display control processing for the artist link map edition screen 301 will be explained with reference to a flowchart in FIG. 19.

For example, when the user operates the operation input unit 16 and instructs edition of artist links, the artist link map edition screen 301 in FIG. 14 is displayed on the display unit 17 by the artist-link-display processing unit 51 under the control by the artist-link-GUI control unit 52. In the example in FIG. 14, on the artist link tree screen 313, the artist group AG2 is focused and the related artists of the artist group AG2 are displayed. However, for convenience of explanation, it is assumed that the artist group AG1 is focused and related artists of the artist group AG1 are displayed.

On the artist link tree screen 313, the user selects an artist group, which the user desires to focus in order to perform edition, for example, the artist group AG2 by operating the operation input unit 16.

In step S121, the artist-link-GUI control unit 52 stays on standby until an artist group on the artist link tree screen 313 is selected. An operation signal corresponding to the selection of the artist link group AG2 by the user is inputted to the artist-link-GUI control unit 52 via the operation input unit 16. According to the input of the operation signal, the artist-link-GUI control unit 52 judges that an artist group on the artist link tree screen is selected. The processing proceeds to step S122.

In step S122, the artist-link-GUI control unit 52 sets the selected artist group AG2 as an object artist group. In step S123, the artist-link-GUI control unit 52 controls the artist-link-processing control unit 53 to search for an artist included in the object artist group.

Specifically, the artist-link-processing control unit 53 controls the database-access processing unit 54 to find an artist included in the artist group AG2 from the ALM database 71 in step S123. Information on the artist found is supplied to the artist-link-GUI control unit 52 via the artist-link-processing control unit 53.

In step S124, the artist-link-GUI control unit 52 acquires a relative position of an icon of the object artist on the artist group list screen 312 from the artist-group-list-display processing unit 103.

In step S125, the artist-link-GUI control unit 52 calculates, from the relative position acquired of the icon of the object artist, a scroll position and scroll speed of the artist group list screen 312 such that a position of the icon of the object artist is displayed in a top position on the artist group list screen 312.

In step S126, the artist-link-GUI control unit 52 supplies the respective kinds of information acquired (i.e., the information on the artist acquired in step S123 and the scroll position and the scroll speed calculated in step S125) to the artist-link-display processing unit 51 as update information.

In step S127, the artist-link-display processing unit 51 re-renders the artist link map edition screen 301 on the basis of the update information. Specifically, the artist-link-display processing unit 101 re-renders the artist link tree screen 313 on the basis of the information on the artist acquired in step S123. The artist-group-list-display processing unit 103 re-renders the artist group list screen 312 on the basis of the information on the artist acquired in step S123 and the scroll position and the scroll speed calculated in step S125.

Figure 20:
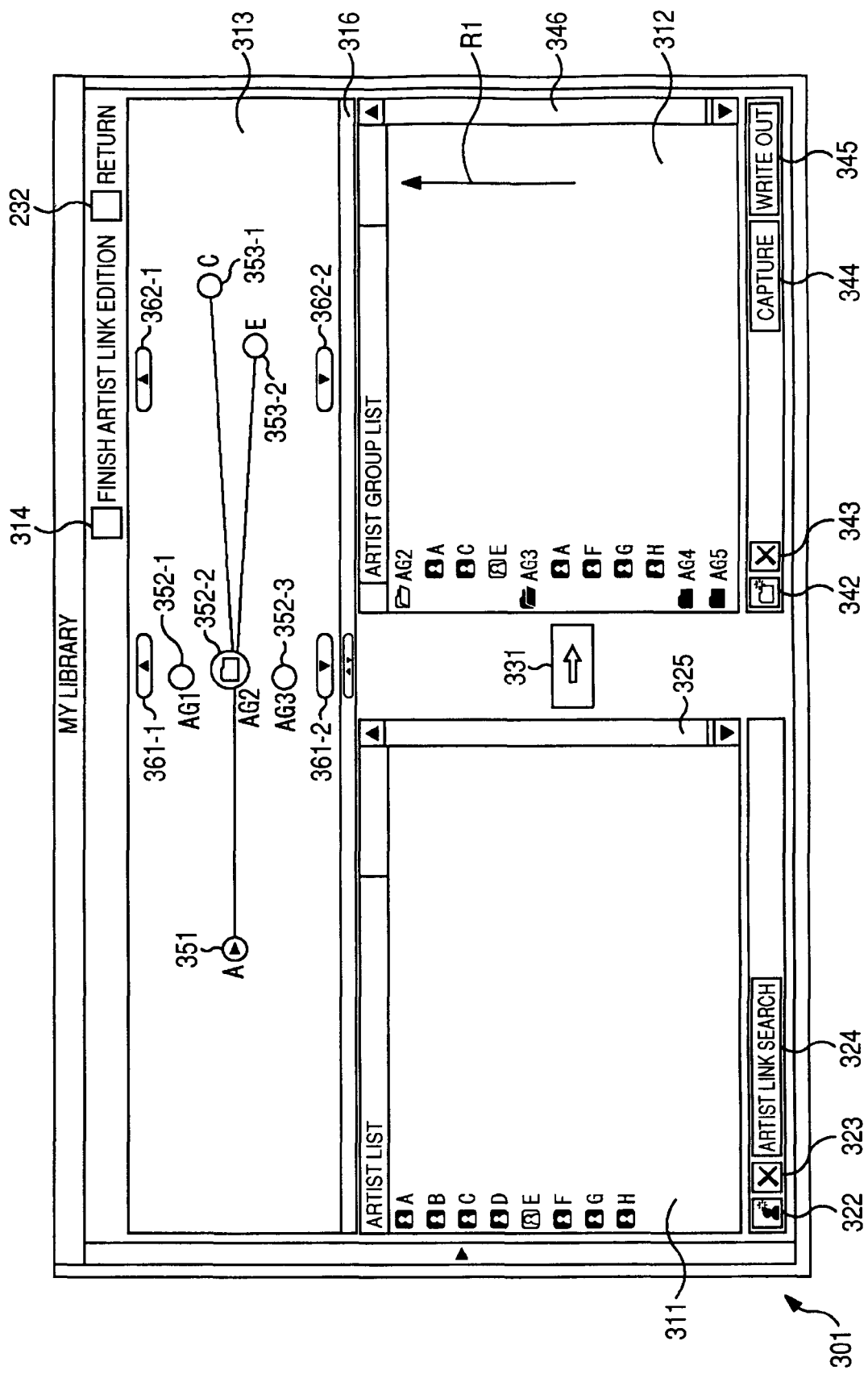
FIG. 20 is a diagram showing an example of display of the artist link map edition screen in FIG. 14.

Consequently, as shown in FIG. 20, the artist link map edition screen 301 including the artist link tree screen 313 re-rendered by the artist-link-tree-display processing unit 101 and the artist group list screen 312 re-rendered by the artist-group-list-display processing unit 103 is displayed.

On the artist link tree screen 313 in FIG. 20, among the artist groups in which the artist A as the base artist is included, the related icons 353-1 and 353-2 attached with characters of related artists C and E included in the artist group AG2 selected (focused) are displayed on the basis of the information on the artist acquired in step S123.

On the artist group list screen 312 in FIG. 20, as indicated by an arrow R1, as a result of the scroll performed on the basis of the scroll position and the scroll speed calculated in step S125, the artist group AG2 selected and the icons of the related artists included in the artist group AG2 are moved from a position substantially in the center in FIG. 14 to be displayed in a top position.

As described above, since a selection instruction on the artist link tree screen 313 is reflected on the artist group list screen 312, it is possible to immediately check information of artist groups, which the user desires to edit, and convenience in edition for the user is improved.

The movement of positions of artist groups on the artist group list screen 312 is not limited to the scroll display described above with reference to FIG. 20. For example, as shown in FIG. 21, it is also possible to realize the movement of positions of artist groups by changing a display order as shown in FIG. 21.

Figure 21:
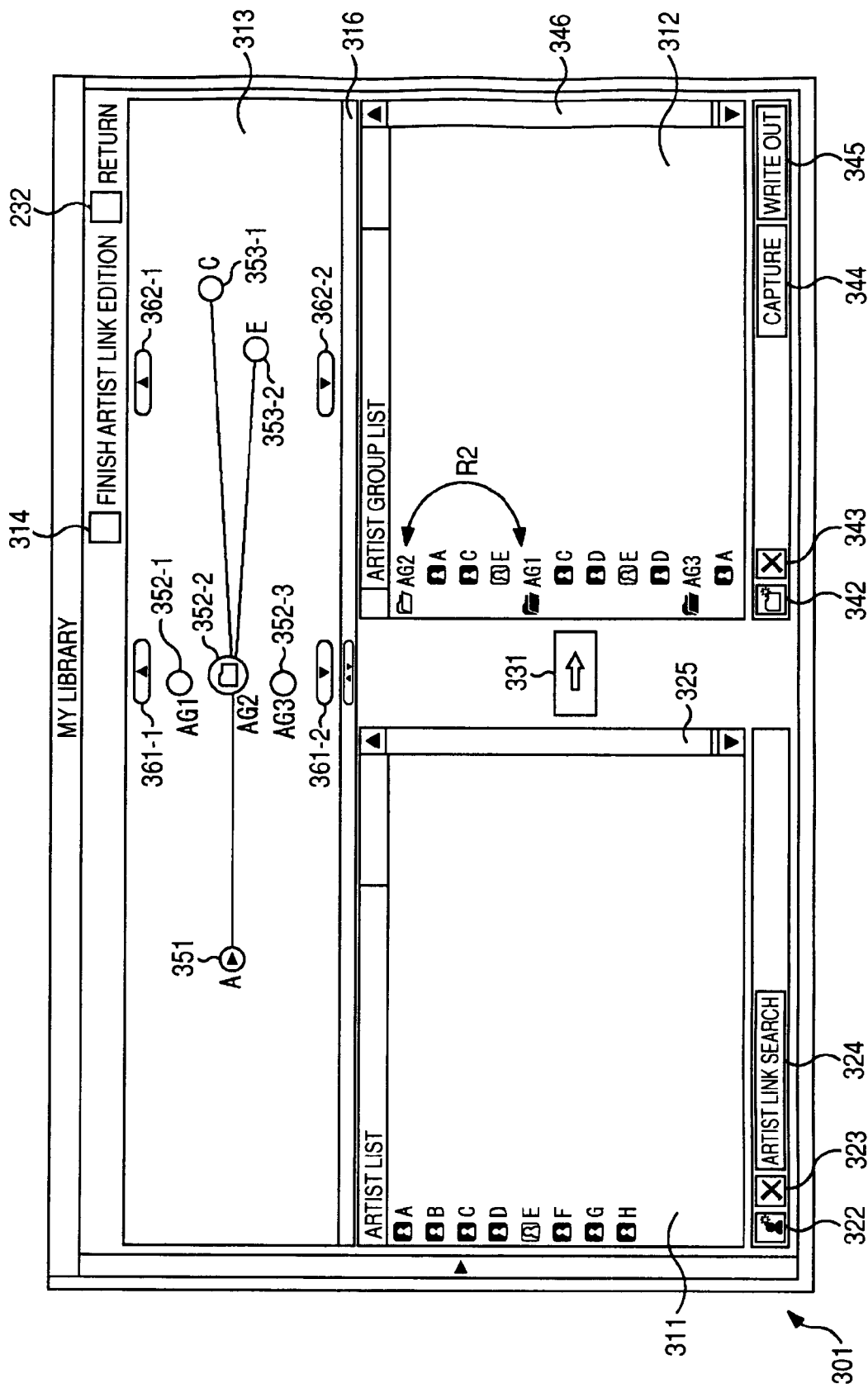
FIG. 21 is a diagram showing another example of the display of the artist link map edition screen in FIG. 14.

In FIG. 21, since the artist group AG2 is selected on the artist link tree screen 313, as indicated by an arrow R2, a display position of the artist group AG2 on the artist group list screen 312 is replaced with a position of the artist group AG1 displayed at the top position on the artist group list screen 312. Therefore, information on the artist group AG2 is displayed in the top position on the artist group list screen 312 and the artist group AG1, which has been focused on the artist link tree screen 313 and displayed in the top position, is displayed below the artist group AG2 on the artist group list screen 312.

It is possible to easily realize this display by changing a sort key designated when a record set of artist groups is opened.

As described above, on the artist link tree screen 313, it is possible to display information on an artist group, which is focused (selected) and related artists of which are displayed, at the top of the artist group list screen 312. Consequently, when edition is performed, it is possible to save time and labor of the user who scrolls the display of the artist group list screen 312 and searches for an artist group. A position where the artist group is displayed may be a predetermined position other than the top position as long as it is easy to perform edition and the position is visually recognized.

Processing for editing artist link information in the PC 1, which the user performs referring to the artist link map edition screen 301, will be explained with reference to flowcharts in FIGS. 22 to 24.

When the user operates the operation input unit 16 and instructs artist link edition, the artist link map edition screen 301 in FIG. 14 is displayed on the display unit 17 by the artist-link-GUI control unit 52. For example, the user operates the operation input unit 16 to, as indicated by the cursor 321 in FIG. 14, select the icon of the artist D to be added on the artist list screen 311 and select the icon of the artist group AG2, in which the user desires to add the artist D, on the artist group list screen 312. After that, the user depresses the artist group addition button 331.

In step S141, the artist-link-GUI control unit 52 judges whether addition of an artist to an artist group is instructed. When an operation signal corresponding to the depression of the artist group addition button 331 is inputted from the operation input unit 16, in step S141, the artist-link-GUI control unit 52 judges that addition of an artist to an artist group is instructed. The processing proceeds to step S142.

In step S142, the artist-link-GUI control unit 52 controls the artist-link-processing control unit 53 to perform edition of the artist link correspondence table 83. Specifically, the artist-link-processing control unit 53 controls the database-access processing unit 54 to add information on an artist being selected to an artist group being selected in the artist link correspondence table 83. In this case, in the artist link correspondence table 83, the artist ID of the artist D is additionally registered in association with the artist group ID of the artist group AG2. This update information of the artist correspondence link table 83 is supplied to the artist-link-GUI control unit 52.

In step S143, the artist-link-GUI control unit 52 supplies the update information of the artist correspondence link table 83 from the artist-link-processing control unit 53 to the artist-link-display processing unit 51.

In step S144, the artist-link-display processing unit 51 re-renders the artist link map edition screen 301 on the basis of the update information of the artist link correspondence table 83. Specifically, the artist-list-display processing unit 102 re-renders the artist list screen 311, the artist-group-list-display processing unit 103 re-renders the artist group list screen 312, and the artist-link-tree-display processing unit 101 re-renders the artist link tree screen 313.

Figure 25:
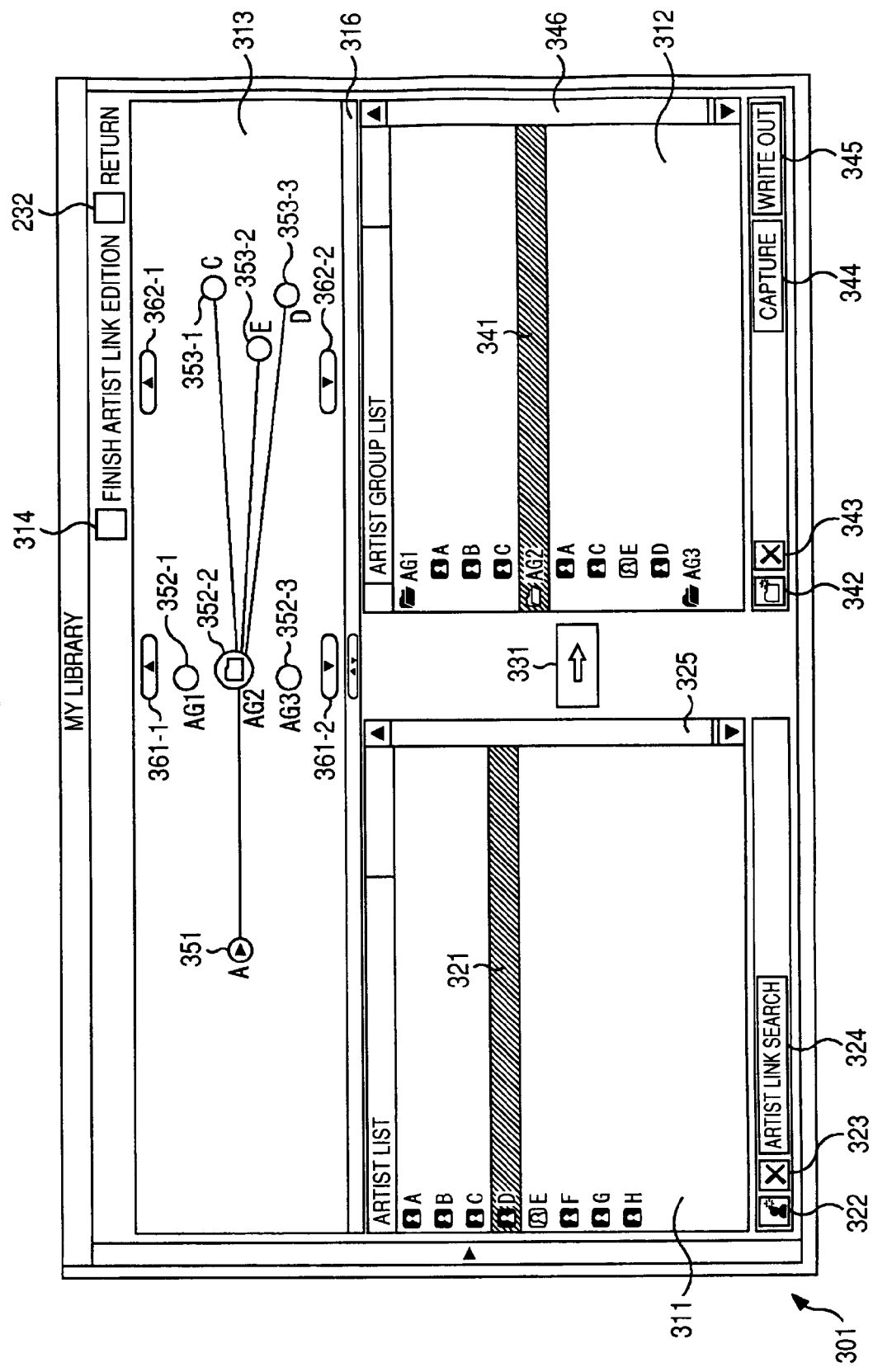
FIG. 25 is a diagram showing still another example of the display of the artist link map edition screen in FIG. 14.

Consequently, as shown in FIG. 25, on the artist group list screen 312 re-rendered by the artist-group-list-display processing unit 103, below the folder of the artist group AG 2, the artist icon of the artist D is added to the artist icons of the artists A, C, and E and displayed.

In the artist link tree screen 313 re-rendered by the artist-link-tree-display processing unit 101, the related icon 353-3 of the artist D is added to the related icons 353-1 and 353-2 attached with the characters of artists C and E, which are other artists included in the artist group AG2, and connected to the folder icon 352-2 attached with the artist group AG2, in which the artist A as the base artist is included, via lines.

In this example, lowest order information in the artist group is set in the added artist. However, it is also possible to set a highest order or a medium order in the added artist.

As described above, the edition of the artist link information performed on the artist list screen 313 and the artist group list screen 312 is immediately reflected on the artist link tree screen 313.

Referring back to FIG. 22, when it is judged in step S141 that addition of an artist to an artist group is not instructed, the processing proceeds to step S145.

In step S145, the artist-link-GUI control unit 52 judges whether deletion of an artist from the artist group is instructed. For example, on the artist group list screen 312 of the artist link map edition screen 301 in FIG. 25, in a state in which the cursor 341 is displayed on the icon of the artist D included in the artist group AG2 (i.e., a state in which the icon of the artist D is selected), the user operates the operation input unit 16 to depress the deletion button 343.

When an operation signal corresponding to the depression of the deletion button 343 is inputted from the operation input unit 16, in step S145, the artist-link-GUI control unit 52 judges that deletion of an artist from the artist group is instructed. The processing proceeds to step S146.

In step S146, the artist-link-GUI control unit 52 controls the artist-link-processing control unit 53 to perform edition of the artist link correspondence table 83. Specifically, the artist-link-processing control unit 53 controls the database-access processing unit 54 to delete information on an artist being selected from an artist group being selected in the artist link correspondence table 83. In this case, in the artist link correspondence table 83, information in which the artist group ID of the artist group AG2 and the artist ID of the artist D are associated with each other is deleted. This update information of the artist correspondence link table 83 is supplied to the artist-link-GUI control unit 52.

In step S147, the artist-link-GUI control unit 52 supplies the update information of the artist correspondence link table 83 from the artist-link-processing control unit 53 to the artist-link-display processing unit 51.

In step S148, the artist-link-display processing unit 51 re-renders the artist link map edition screen 301 on the basis of the update information of the artist link correspondence table 83. Specifically, the artist-list-display processing unit 102 re-renders the artist list screen 311, the artist-group-list-display processing unit 103 re-renders the artist group list screen 312, and the artist-link-tree-display processing unit 101 re-renders the artist link tree screen 313.

Consequently, on the display unit 17, as shown in FIG. 14, the artist link map edition screen 301 including the artist group list screen 312 and the artist link tree screen 313, in which the artist D is released from the link of the artist group AG2, is displayed.

When it is judged in step S141 that addition of an artist to an artist group is instructed and it is judged in step S145 that deletion of an artist from the artist group is instructed, the re-rendering of the artist link edition screen 301 performed in step S144 is performed simultaneously with the re-rendering of the artist link edition screen 301 in step S148.

Figure 23:
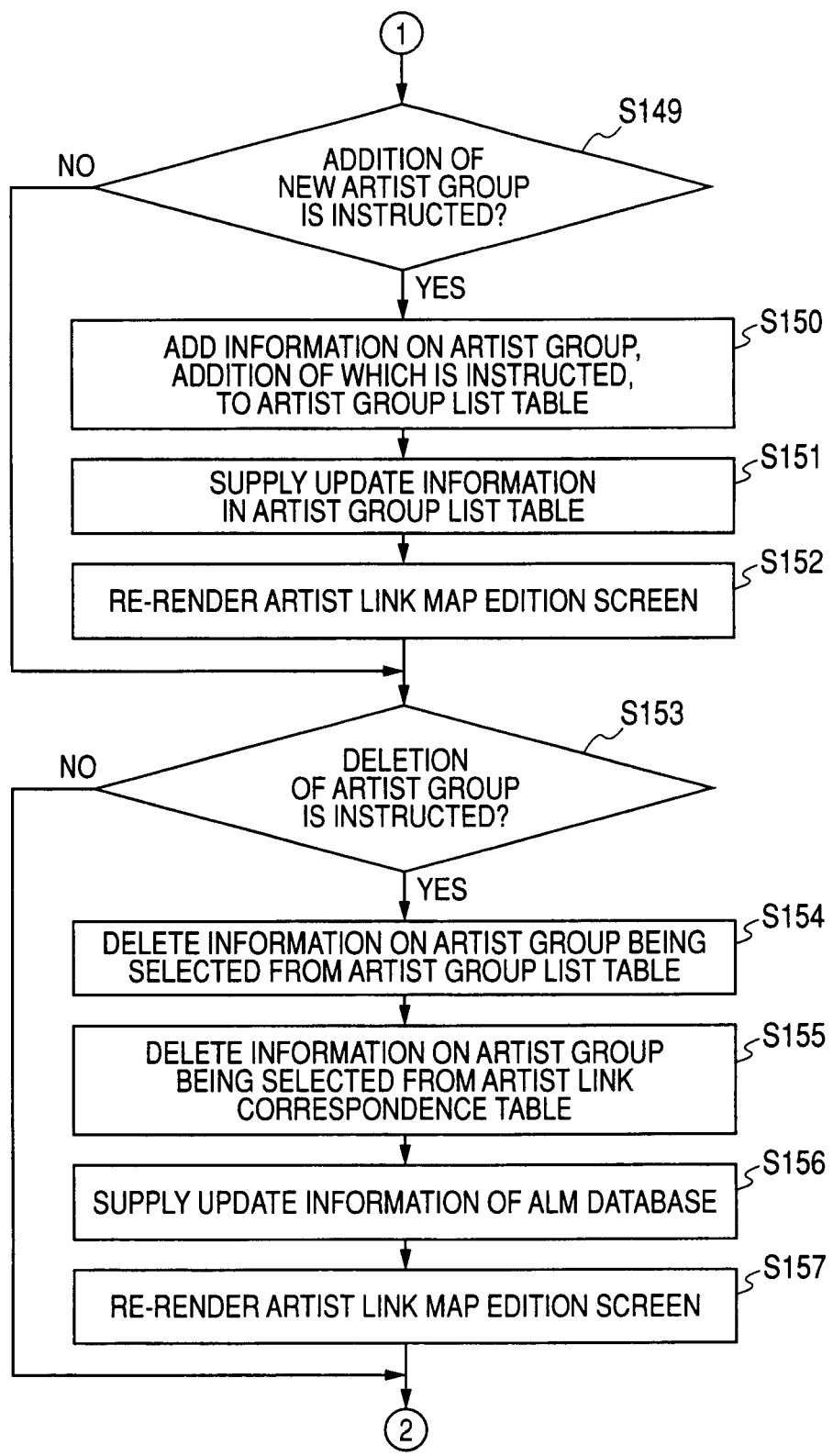
FIG. 23 is a flowchart for explaining the artist link information edition processing.

When it is judged in step S145 that deletion of an artist from the artist group is not instructed, the processing proceeds to step S149 in FIG. 23. In step S149, the artist-link-GUI control unit 52 judges whether addition of a new artist group is instructed. For example, when the artist group addition button 342 is depressed on the artist group list screen 312 of the artist link map edition screen 301 in FIG. 14, an artist group, a name of which is not set yet, is displayed by the artist-group-list-display processing unit 103 under the control by the artist-link-GUI control unit 52.

The user inputs an artist group name (e.g., AG4) with the keyboard or the like constituting the operation input unit 16. The user can input a desired group name. For example, when the user desires to form a group of sets of artists produced by the same music producer, the user inputs an artist group name "... project". When the user desires to form a group of ballet music, the user inputs an artist group name "ballet". Since it is possible to form a new artist group with a desired group name, it is possible to indicate with a reason how artists included in the artist group have a relation with one another.

When an operation signal corresponding to addition of the new artist group (the artist group AG4) is inputted from the operation input unit 16, in step S149, the artist-link-GUI control unit 52 judges that addition of a new artist group is instructed. The processing proceeds to step S150.

In step S150, the artist-link-GUI control unit 52 controls the artist-link-processing control unit 53 to perform edition of the artist group list table 82. Specifically, the artist-link-processing control unit 53 controls the database-access processing unit 54 to add information of the artist group, which is instructed to be added, to the artist group list table 82. For example, in this case, in the artist group list table 82 in FIG. 5, the name (AG4) and an artist ID (e.g., AGID_4) of the artist group AG4 are added. In the present case, since an artist is not added to the artist group AG4, edition of the artist link correspondence table 83 is not performed. This update information of the artist group list table 82 is supplied to the artist-link-GUI control unit 52.

In step S151, the artist-link-GUI control unit 52 supplies the update information of the artist group list table 82 from the artist-link-processing control unit 53 to the artist-link-display processing unit 51.

In step S152, the artist-link-display processing unit 51 re-renders the artist link map edition screen 301 on the basis of the update information of the artist group list table 82. Specifically, the artist-list-display processing unit 102 re-renders the artist list screen 311, the artist-group-list-display processing unit 103 re-renders the artist group list screen 312, and the artist-link-tree-display processing unit 101 re-renders the artist link tree screen 313.

Consequently, on the display unit 17, the artist group list screen 312 in which an icon of the artist group AG4 is added to the icons of the artist groups AG1 to AG3 in FIG. 14 is displayed.

When it is judged in step S149 that addition of a new artist group is not instructed, the processing proceeds to step S153. In step S153, the artist-link-GUI control unit 52 judges whether deletion of an artist group is instructed. For example, on the artist group list screen 312 of the artist link map edition screen 301 in FIG. 14, in a state in which the cursor 341 is displayed on the icon of the artist group AG3 (i.e., a state in which the icon of the artist group AG3 is selected), the user operates the operation input unit 16 to depress the deletion button 343.

When an operation signal corresponding to the depression of the deletion button 343 is inputted from the operation input unit 16, in step S153, the artist-link-GUI control unit 52 judges that deletion of an artist group is instructed. The processing proceeds to step s154.

In step S154, the artist-link-GUI control unit 52 controls the artist-link-processing control unit 53 to perform edition of the artist group list table 82. Specifically, the artist-link-processing control unit 53 controls the database-access processing unit 54 to delete information on an artist group being selected from the artist group list table 82. For example, in this case, the name (AG3) and the artist group ID (AGID_3) of the artist group AG3 are deleted from the artist group list table 82 in FIG. 5.

In step S155, the artist-link-GUI control unit 52 controls the artist-link-processing control unit 53 to perform edition of the artist link correspondence table 83. Specifically, the artist-link-processing control unit 53 controls the database-access processing unit 54 to delete information of an artist group being selected from the artist link correspondence table 83. For example, in this case, all kinds of information corresponding to the artist group ID (AGID_3) of the artist group AG3 are deleted from the artist link correspondence table 83 in FIG. 5. These kinds of update information of the ALM database 71 are supplied to the artist-link-GUI control unit 52.

In step S156, the artist-link-GUI control unit 52 supplies the update information of the ALM database 71 from the artist-link-processing control unit 53 to the artist-link-display processing unit 51.

In step S157, the artist-link-display processing unit 51 re-renders the artist link map edition screen 301 on the basis of the update information of the ALM database 71. Specifically, the artist-list-display processing unit 102 re-renders the artist list screen 311, the artist-group-list-display processing unit 103 re-renders the artist group list screen 312, and the artist-link-tree-display processing unit 101 re-renders the artist link tree screen 313.

Consequently, on the display unit 17, the artist link map edition screen 301 including the artist group list screen 312 and the artist link tree screen 313 in which the icon of the artist group AG3 among the icons of the artist groups AG1 to AG3 in FIG. 14 is deleted is displayed.

When it is judged in step S149 that addition of a new artist group is instructed and it is judged in step S153 that deletion of an artist group is instructed, the re-rendering of the artist link edition screen 301 performed in step S152 is performed simultaneously with the re-rendering of the artist link edition screen 301 in step S157.

Figure 24:
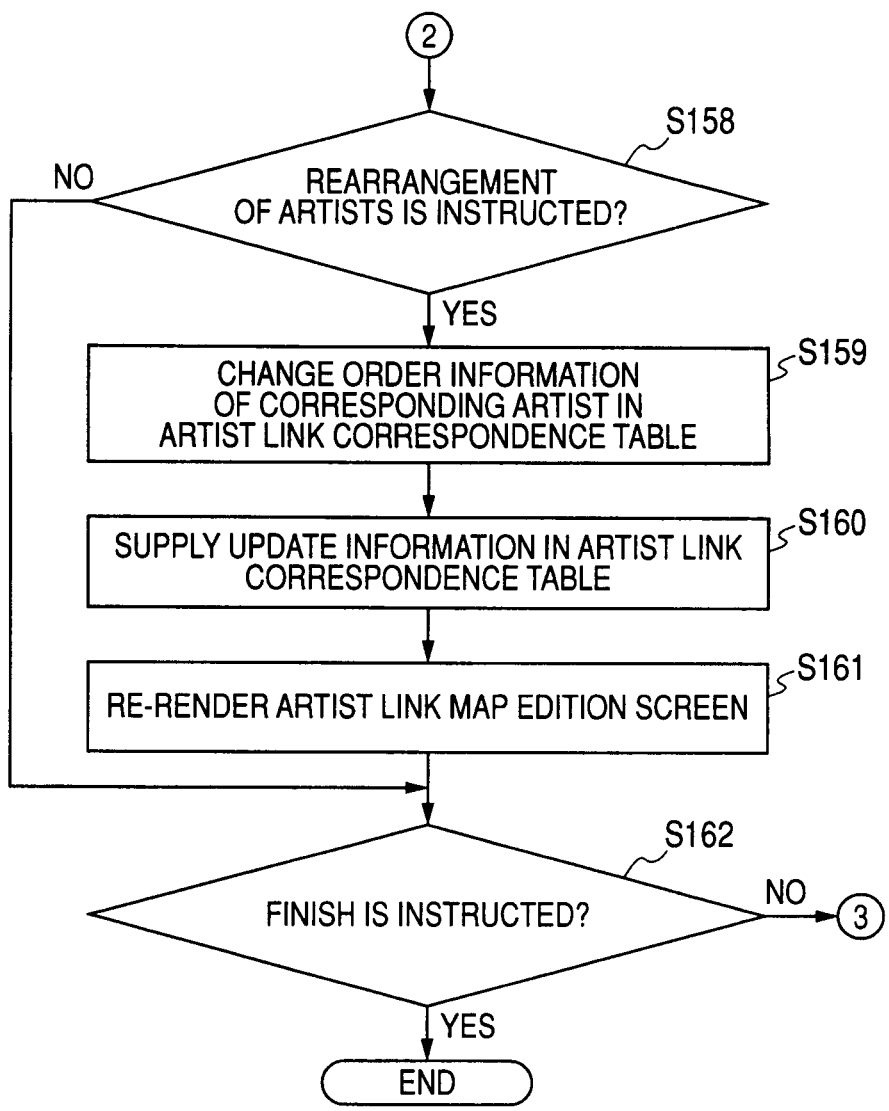
FIG. 24 is a flowchart for explaining the artist link information edition processing.

When it is judged in step S153 that deletion of an artist group is not instructed, the processing proceeds to step S158 in FIG. 24. In step S158, the artist-link-GUI control unit 52 judges whether rearrangement of artists is instructed. For example, on the artist group list screen 312 of the artist link map edition screen 301 in FIG. 14, the user operates the operation input unit 16 to drag the artist icon of the artist E included in the artist group AG2 and drop the artist icon in a position between the artist icon of the artist A and the artist icon of the artist C.

When an operation signal corresponding to the drop of the artist icon in the artist group list screen 312 is inputted from the operation input unit 16, in step S158, the artist-link-GUI control unit 52 judges that rearrangement of artists is instructed. The processing proceeds to step S159.

In step S159, the artist-link-GUI control unit 52 controls the artist-link-processing control unit 53 to perform edition of the artist link correspondence table 83. Specifically, the artist-link-processing control unit 53 controls the database-access processing unit 54 to change order information of corresponding artists of a corresponding artist group of the artist link correspondence table 83. For example, in the artist group AG2, the second highest order information of the artist C is changed to third highest order information and the third highest order information of the artist E is changed to second highest order information. This update information of the artist link correspondence table 83 is supplied to the artist-link-GUI control unit 52.

In step S160, the artist-link-GUI control unit 52 supplies the update information of the artist correspondence link table 83 from the artist-link-processing control unit 53 to the artist-link-display processing unit 51.

In step S161, the artist-link-display processing unit 51 re-renders the artist link map edition screen 301 on the basis of the update information of the artist link correspondence table 83. Specifically, the artist-list-display processing unit 102 re-renders the artist list screen 311, the artist-group-list-display processing unit 103 re-renders the artist group list screen 312, and the artist-link-tree-display processing unit 101 re-renders the artist link tree screen 313.

Figure 26:
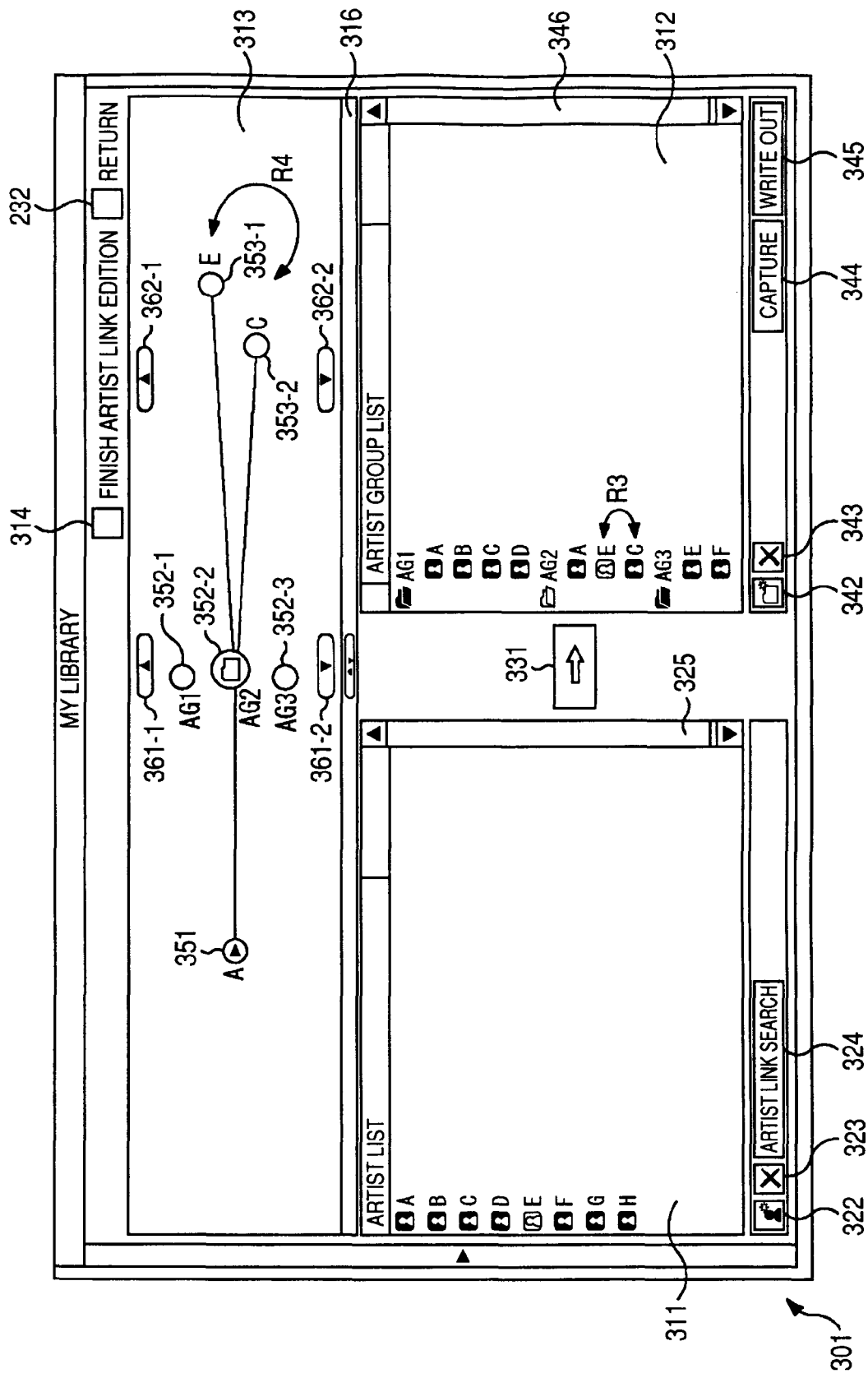
FIG. 26 is a diagram showing another example of the display of the artist link map edition screen in FIG. 14.

Consequently, the artist link map edition screen 301 shown in FIG. 26 is displayed on the display unit 17.

In FIG. 26, the artist link map edition screen 301 including the artist list screen 311 re-rendered by the artist-list-display processing unit 102, the artist group list screen 312 re-rendered by the artist-group-list-display processing unit 103, and the artist link tree screen 313 re-rendered by the artist-link-tree-display processing unit 101 is shown.

Below the folder of the artist group AG2 on the artist group list screen 312, as indicated by an arrow R3, compared with the example in FIG. 14, orders of the artist icons of the artists C and E are changed. Moreover, as indicated by an arrow R4, orders of artist names attached to the related icons 353-1 and 353-2 connected to the icon 352-2 corresponding to the artist group AG2 on the artist link tree screen 313 are changed to orders of the artists E and C.

Referring back to FIG. 16, when it is judged in step S158 that rearrangement of artists is not instructed, the processing proceeds to step S162.

In step S162, the artist-link-GUI control unit 52 judges whether finish of the artist link edition is instructed. For example, the user operates the operation input unit 16 to press the artist link edition finish button 314 arranged in an upper part of the artist link tree screen 313 on the artist link map edition screen 301 in FIG. 14.

In response to the depression of the artist link finish button 314 with the operation input unit 16, in step S162, the artist-link-GUI control unit 52 judges that finish of the artist link edition is instructed and finishes the display of the artist link map edition screen 301. Consequently, the edition of artist link information is finished.

Figure 22:
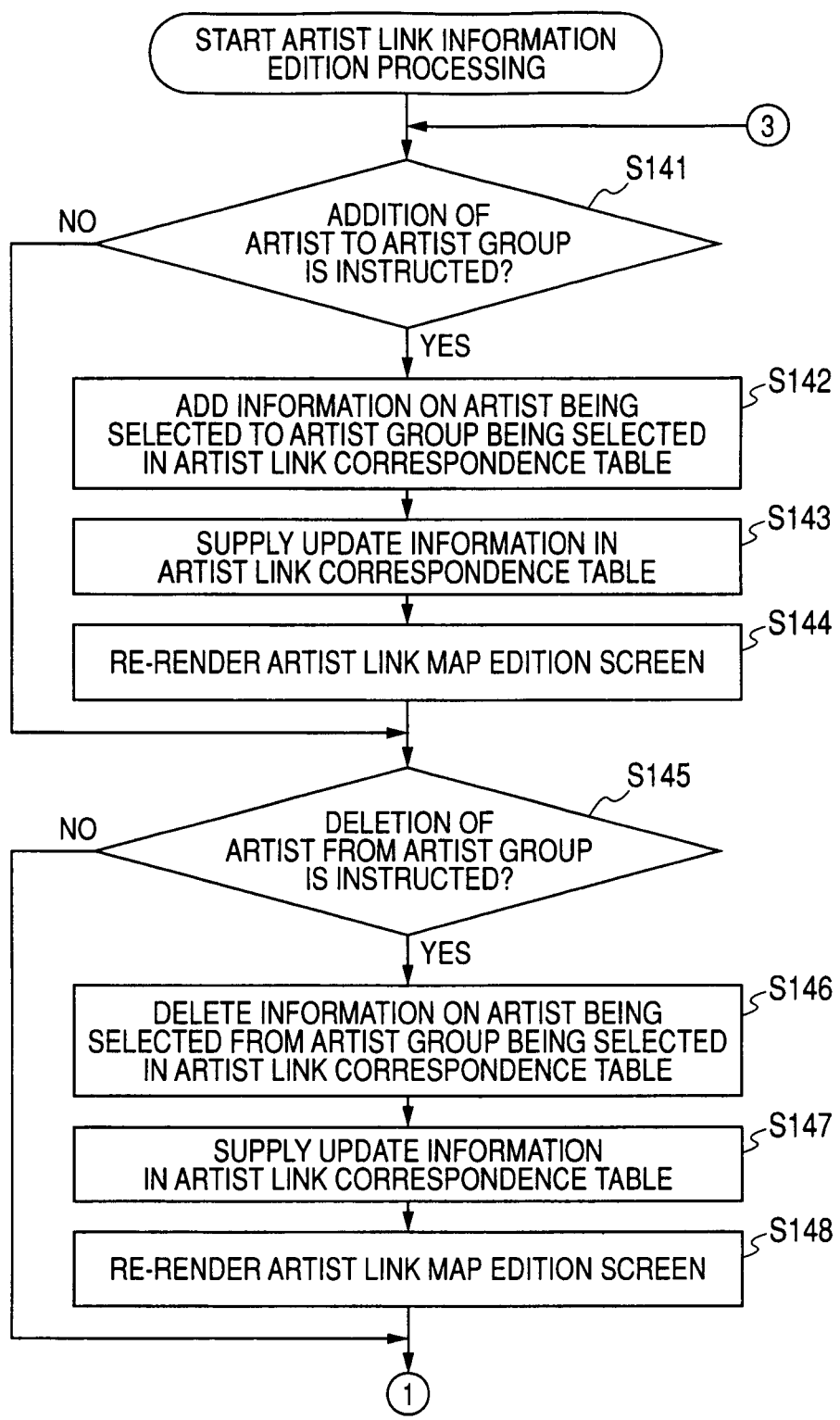
FIG. 22 is a flowchart for explaining artist link information edition processing.

When it is judged in step S162 that finish of the artist link edition is not instructed, the processing returns to step S141 in FIG. 22 and the processing in step S141 and the subsequent steps is repeated.

In the above explanation, addition of an artist to and deletion of an artist from an artist group, addition and deletion of an artist group, change of orders of priority of artists in an artist group in the artist link correspondence table 83, and the like are explained as representative processing. However, it is also possible to perform other kinds of edition such as addition of an artist to and deletion of an artist from the artist list file 81 or write-out and importing of artist link information. Results of the edition are also immediately reflected on a display screen.

As described above, since it is possible to easily edit artist link information generated on the basis of detailed metadata according to operation by the user and the edition is immediately reflected on a display screen, the user can easily perform edition operation and it is possible to generate artist link information more effective for the user.

In artist link information generated on the basis of detailed metadata, even when it is difficult to cope with the case in which artists assumed to be related (liked) are not related, or conversely, a relation is wrong, it is possible to easily edit the relation. Consequently, artist link information effective for respective users is generated.

Since an artist group is displayed, the user understands reasons for a relation of artists. Thus, it is possible to improve operability of edition of artist link information, search for content, play instruction, and the like by the user.

Moreover, as described above with reference to FIG. 13, when content of an artist instructed to be selected is not stored in the PC 1, it is possible to access a Web page related to the artist. Therefore, as a result, it is possible to urge the user to purchase content, which the user does not own, and perform sales promotion of the content.

Since detailed metadata is acquired every time content is acquired, edited artist link information is updated on the basis of the detailed metadata after that. Even if there is link information deleted by the user according to edition, it is possible to add the link information on the basis of detailed metadata acquired after that. In other words, for the artist link information, both automatic update and manual update are possible.

In the example explained above, the processing for editing artist link information is performed in the PC 1. However, as described above with reference to FIG. 9, the PD 7 has the same structure as the PC 1 in performing the processing for editing artist link information and the display control processing for the artist link information. Thus, the PD 7 can basically perform the same processing. In this case, for example, the operation input unit 16 includes, as shown in FIG. 27, an artist link button 411, an option button 412, a back button 413, a cross button 414, and a determination button 415 provided on a housing 401 of the PD 7, rather than the mouse and the keyboard in the PC 1.

Figure 27:
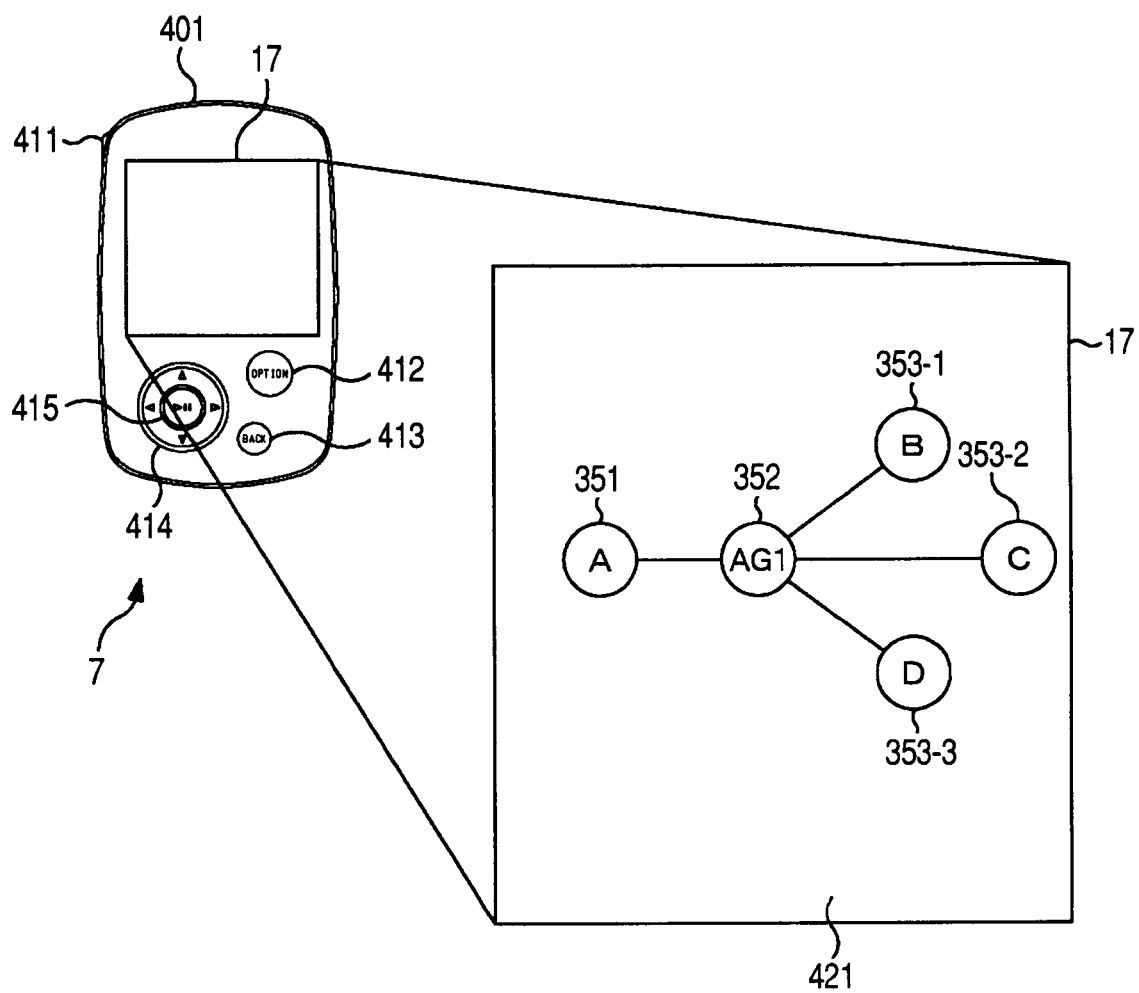
FIG. 27 is a diagram showing an example of an external structure of a PD in FIG. 2.

FIG. 27 shows an example of an external structure of the PD 7.

An artist button 411 for displaying an artist link map preview screen 421 equivalent to the artist link tree screen 313 in FIG. 14 (or the artist link map preview screen 211 in FIG. 13) in the PC 1 is provided in an upper part on the left side of the housing 401 of the PD 7.

The display unit 17 formed by an LCD is provided on the front surface of the housing 401. As shown on the right in the figure in enlargement, the artist link map preview screen 421 is displayed on the display unit 17. On the artist link map preview screen 421, as in the artist link tree screen 313 in FIG. 14, the base icon 351 representing a base artist, the folder icon 352 representing an artist group, in which the base artist is included, and the related icons 353-1 to 353-3 of other artists included in the artist group in which the base artist is included (i.e., related artists related to the base artist) are shown.

On the artist link map preview screen 421 in FIG. 27, as indicated by the character A of the base icon 351, the artist A is set as a base artist, as indicated by AG1 of the folder icon 352, the base artist is included in the artist group AG1, and, as indicated by B to D of the related icons 353-1 to 353-3, the artists B to D are also included in the artist group AG1.

On a lower right side of the display unit 17 on the front surface of the housing 401, the option button 412 and the back button 413 for returning display to a previous state are arranged vertically. For example, if the option button 412 is depressed when the artist link map preview screen 421 is displayed, a screen equivalent to the artist link map edition screen 301 in FIG. 14, on which artist link information can be edited, is displayed. Since the display unit 17 of the PD 7 does not have a large displayable area, a screen equivalent to the artist link tree screen 313 is not provided. An artist link map edition screen of the PD 7 includes at least one of a screen equivalent to the artist list screen 311 and a screen equivalent to the artist group list screen 312.

The cross button 414 is provided on a lower left side of the display unit 17 on the front surface of the housing 401 and the determination button 415 is provided in the center thereof. For example, it is possible to edit artist link information by selecting, with the cross button 414, artists and artist groups displayed on a screen equivalent to the artist list screen 311 and a screen equivalent to the artist group list screen 312 and determining the artists and the artist groups with the determination button 415 according to operation by the user.

As explained above, in the PD 7, as in the PC 1, artist groups that indicate not only related artists related to a base artist but also reasons for the relation are displayed. Consequently, the user can grasp relation between the base artist and the related artists and it is possible to improve operability of edition of the artist groups.

Another example of the screen for displaying artist link information will be explained.

Figure 28:
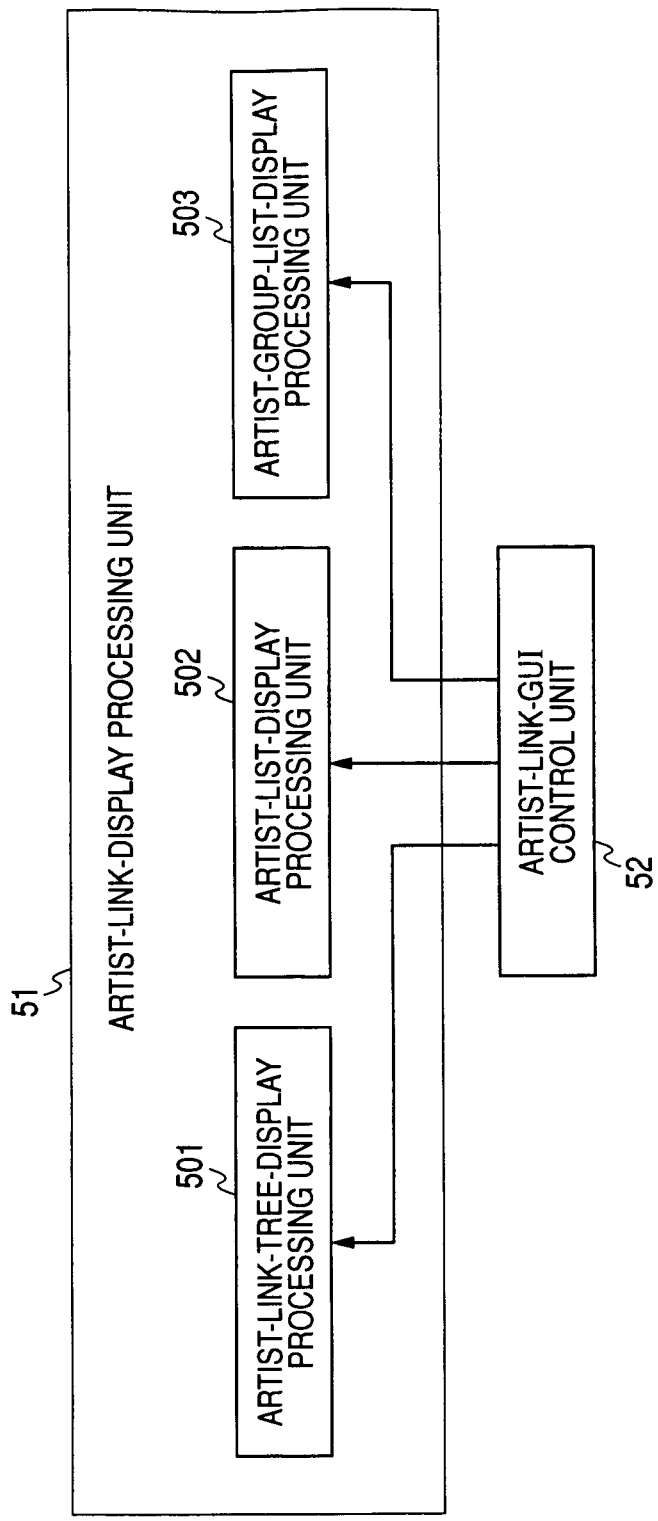
FIG. 28 is a block diagram showing another example of the structure of the artist-link-display processing unit in FIG. 4.

FIG. 28 shows another example of the structure of the artist-link-display processing unit 51 in FIG. 4. The artist-link-display processing unit 51 in FIG. 28 includes an artist-link-tree-display processing unit 501, an artist-list-display processing unit 502, and an artist-group-list-display processing unit 503.

Figure 29:
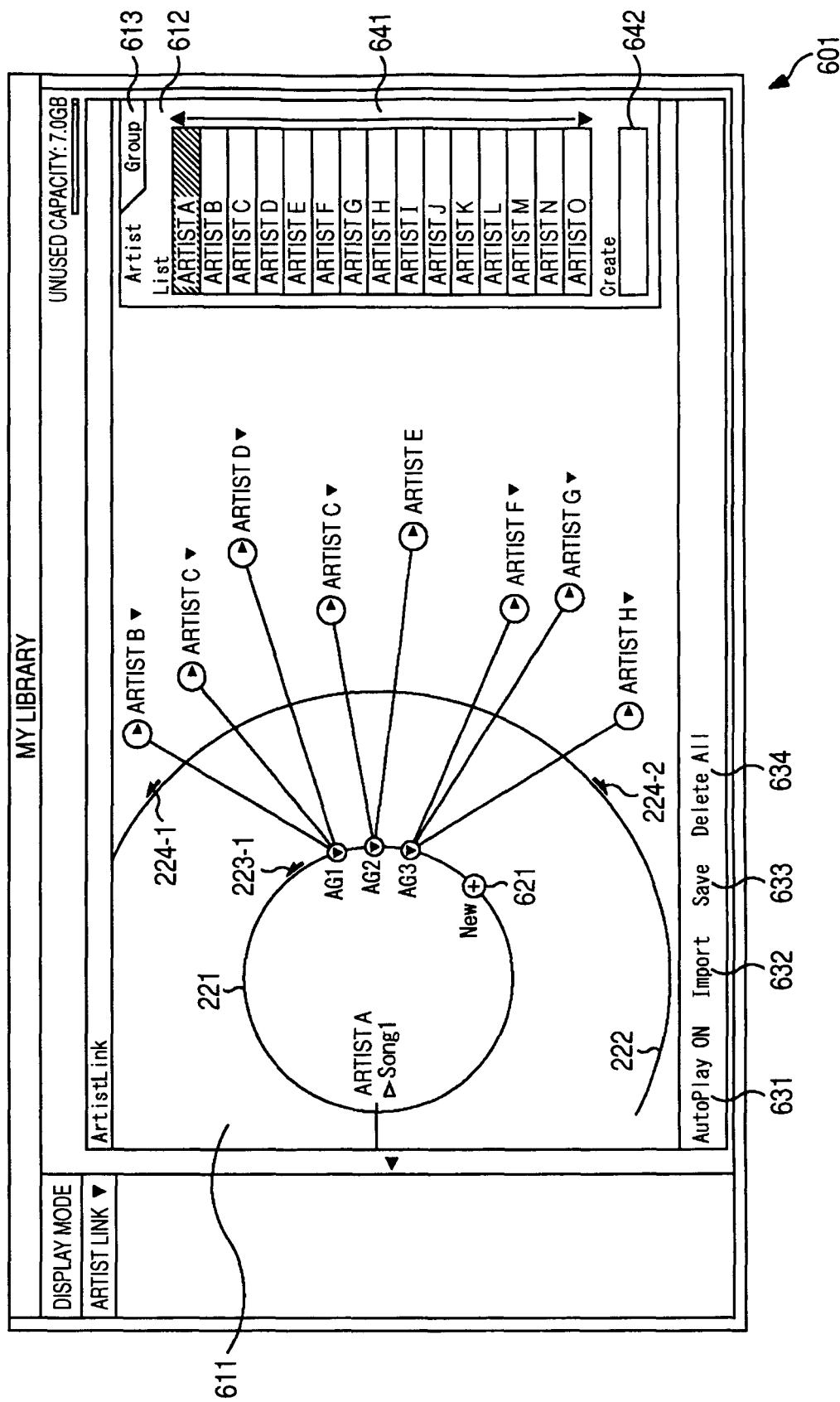
FIG. 29 is a diagram showing another example of the structure of the artist link map edition screen.

The artist-link-tree-display processing unit 501 generates a GUI image of an artist link tree screen 611 in FIG. 29, on which artist link information of a base artist selected according to operation of the user is displayed in the tree format, by referring to information in the ALM database 71 and causes the display unit 17 to display the artist link tree screen 611 including the GUI image generated.

The artist-list-display processing unit 502 generates a GUI image of an artist list screen 612 or the like in FIG. 29, on which a list of artists stored in the artist list table 82 is displayed, by referring to information in the artist list table 82 and causes the display unit 17 to display the artist list screen 612 including the GUI image generated.

The artist-group-list-display processing unit 503 generates a GUI image of an artist group list screen 613 in FIG. 29, on which a list of artist groups stored in the artist group list table 83 is displayed, by referring to information in the ALM database 71 and causes the display unit 17 to display the artist group list screen 613 including the GUI image generated.

FIG. 29 shows an example of display on the artist link map edition screen 601. This artist link map edition screen 601 is another example of the artist link map edition screen 301 in FIG. 14 that constitutes the display screen 201 in FIG. 13 together with the basic function display screen 212.

The artist link map edition screen 601 includes the artist link tree screen 611, the artist list screen 612, and the artist group list screen 613. In the example in FIG. 29, the artist group list screen 613 is arranged to be superimposed under the artist list screen 612.

The artist link tree screen 611 is the same as the artist link map preview screen 211 in FIG. 13 in that artist link information of a base artist as a base is displayed in the tree format. However, the artist link tree screen 611 is different from the artist link map preview screen 211 in FIG. 13 in that the artist link information is edited according to operation by the user. Therefore, in the artist link tree screen 611, sections corresponding to those in the artist link map preview screen 211 are denoted by the same reference numerals and signs. Explanations of the sections are omitted to avoid repetition.

On the artist link tree screen 611, an artist group addition button 621 for adding a new artist group is displayed on the right side circumference of the small circle 221 other than the icons of the artist groups AG1 to AG3 in which the base artist is included.

In a lower part of the artist link tree screen 611, a shuffle play button 631 shown as "AutoPlay ON" for shuffle-playing contents at random, a file import button 632 shown as "Import" for importing artist link information, a save button 633 shown as "Save" for saving artist link information as an XML file, and a deletion button 633 shown as "Delete All" for deleting all kinds of information.

A list of artist names (artists A to O) stored in the artist list table 82 is displayed on the artist list screen 612. On the artist list screen 612, a scroll bar 641 for scroll-displaying the artist names displayed on the artist list screen 612 and an edit box 642 for inputting a new artist are further arranged.

The artist list screen 612 is the same as the artist list screen 311 in FIG. 14 in that the list of artist names stored in the artist list table 82 is displayed. However, the artist list screen 612 is different from the artist list screen 311 in that the edit box 642 is arranged on the artist list screen 612.

On the artist group list screen 613, a list of artist groups stored in the artist group list table 81 is displayed, although not displayed because the list is arranged to be superimposed under the artist list screen 612 in the example in FIG. 29, and a scroll bar is arranged.

The artist group list screen 613 is the same as the artist group list screen 312 in FIG. 14 in that the list of artist groups stored in the artist group list table 81 is displayed. However, the artist group list screen 613 is different from the artist group list screen 312 in FIG. 14 in that it is difficult to perform edition of artist link information on the artist group list screen 613.

The artist link tree screen 611 will be explained.

When an artist name (e.g., artist A) displayed on the artist list screen 612 is dragged onto the artist link tree screen 611 and dropped in a position in the small circle 221 according to operation of the operation input unit 16 by the user, the artist A dropped is set as a base artist and artist link information of the artist A is obtained. An artist name of the base artist displayed in the small circle 221 is changed to "artist A". Further on the right side than the small circle 221, the artist link tree screen 611 is re-rendered to display the artist link information obtained for the artist A as the base artist.

Specifically, on the right side circumference of the small circle 221, icons indicating the artist groups AG1 to AG3, in which the base artist A is included, are displayed in order. On the outer side than the right side circumference of the large circle 222, icons of the related artists B, C, and D included in the artist group AG1 are displayed to be connected to the icon of the artist group AG1 via lines. Icons of the related artists C and E included in the artist group AG2 are displayed to be connected to the icon of the artist group AG2 via lines. Icons of the related artists F, G, and H included in the artist group AG3 are displayed to be connected to the icon of the artist group AG3 via lines.

The re-rendering of the artist link tree screen 611 is not only performed according to drag and drop of an artist name. When an artist name (e.g., artist A) displayed on the artist list screen 612 is depressed according to operation of the operation input unit 16 by the user, it is also possible to set the artist A selected by the depression as a base artist, obtain artist link information of the artist A, and re-render the artist link tree screen 611 according to the artist link information.

Figure 30:
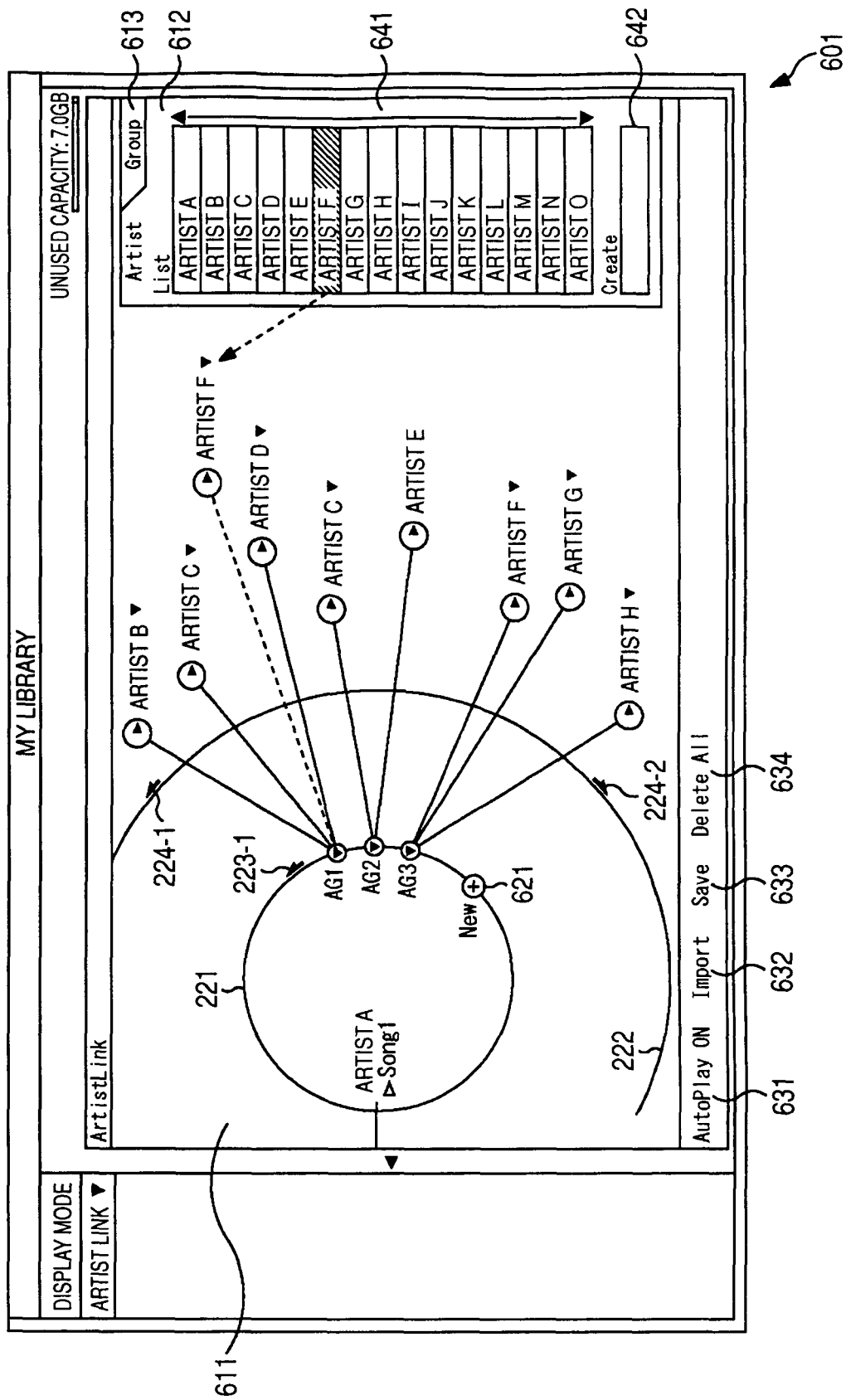
FIG. 30 is a diagram showing an example of display of the artist link map edition screen in FIG. 29.

When an artist name (e.g., artist F) displayed on the artist list screen 612 is dragged onto the artist link tree screen 611 according to operation of the operation input unit 16 by the user, as shown in FIG. 30, an icon of the artist F is displayed. Further on the outer side than the large circle 222, a position of an icon of a closest artist group viewed from a drag position is searched for. A dotted line indicating "undecided" for connecting the icon of the artist F is displayed from a position of an icon of the closest artist group found (in the case of an example in FIG. 30, artist group AG1).

When the icon of the artist F is dropped in a position where the dotted line from the position of the icon of the artist group AG1 is connected to the icon of the artist F according to operation of the operation input unit 16 by the user, the dotted line to the icon of the artist F from the position of the icon of the artist group AG1 is changed to a solid line indicating "decided" and displayed. The artist link correspondence table 83 is updated such that the artist F is included in the artist group AG1.

When the icon of the artist F is dragged to the inner side than the large circle 222, display of the icon of the artist F on the outer side disappears. When the artist name being dragged is dropped outside the small circle 221 and inside the large circle 222, the artist link correspondence table 83 is updated such that the artist is included in an artist group, a position of an icon of which is closest from a drop position. The icon of the artist F is moved to the outside of the large circle 222 close to the drop position, connected to the icon of the closest artist group by a solid line, and displayed.

On the other hand, when the artist name being dragged is dropped in the small circle 221, as described above, the artist F dropped is set as a base artist, artist link information of the artist F is obtained, and the artist link tree screen 611 is re-rendered according to the artist link information.

Figure 31:
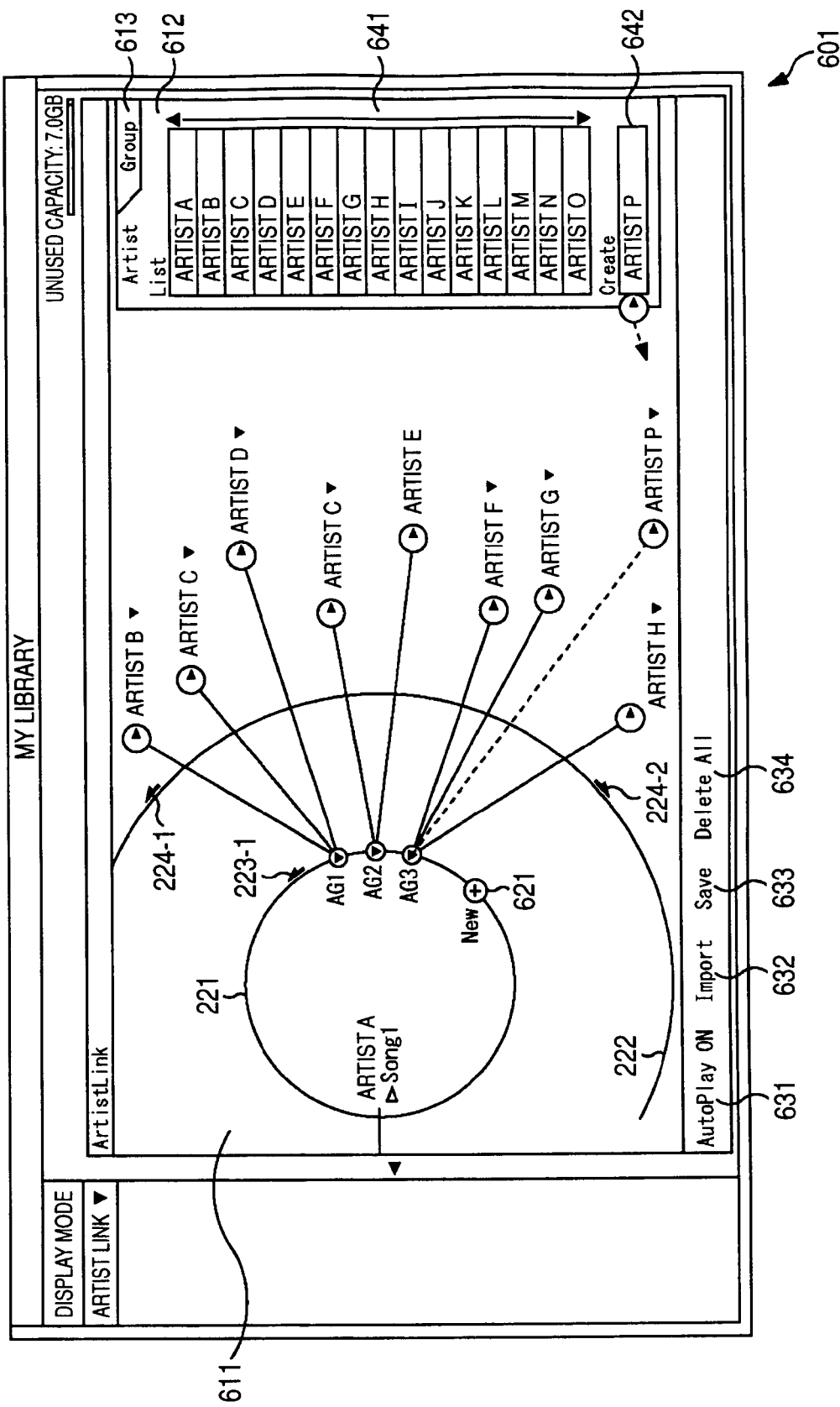
FIG. 31 is a diagram showing another example of the display of the artist link map edition screen in FIG. 29.

FIG. 31 shows an example of a case in which a new artist is added on the artist link map edition screen 601.

When a new artist is added, the user operates the keyboard or the like constituting the operation input unit 16 to input a new artist name (e.g., artist P) in the edit box 642 on the artist list screen 612. Then, information on the artist P is added to the artist list table 81 and an icon is displayed on the left of the artist P.

In the case of the new artist, as in the case described above, when the icon of the artist P is dragged onto the icon link tree screen 611 according to operation by the user, a position of an icon of a closest artist group viewed from a drag position is searched for. A dotted line indicating "undecided" for connecting the icon of the artist P is displayed from a position of an icon of the closest artist group found (in the case of an example in FIG. 31, artist group AG3).

When the icon of the artist P is dropped in a position where the dotted line from the position of the icon of the artist group AG3 is connected to the icon of the artist P according to operation of the operation input unit 16 by the user, the dotted line to the icon of the artist P from the position of the icon of the artist group AG3 is changed to a solid line indicating "decided" and displayed. The artist link correspondence table 83 is updated such that the artist P is included in the artist group AG3.

Figure 32:
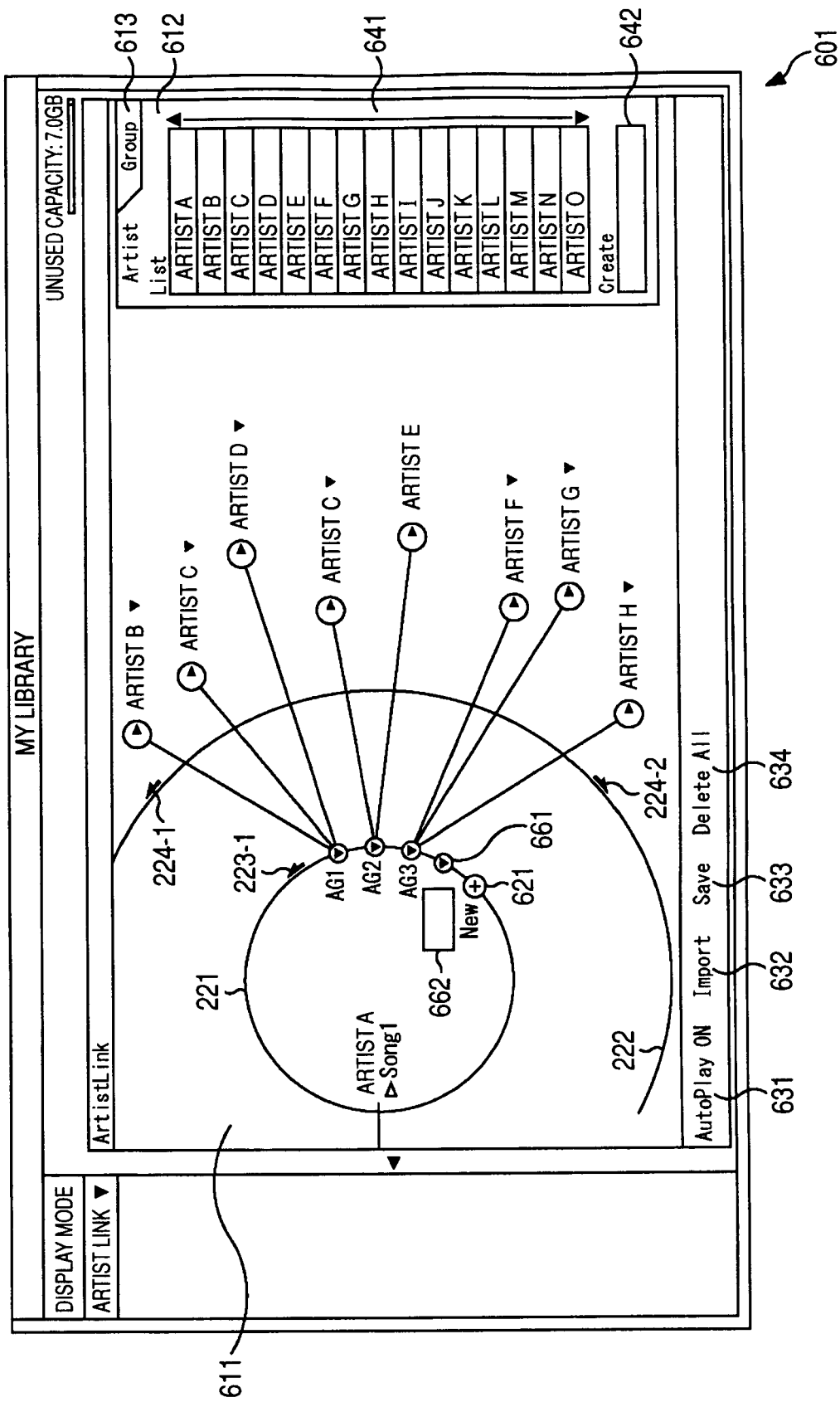
FIG. 32 is a diagram showing still another example of the display of the artist link map edition screen in FIG. 29.

FIG. 32 shows an example of a case in which a new artist group is added on the artist link map edition screen 601.

When a new artist group is added, the user operates the mouse or the like constituting the operation input unit 16 to depress the artist group addition button 621 on the small circle 221 of the artist link tree screen 611. Then, a new icon 661 is displayed on the small circle 221 and an edit box 662 for inputting a new artist group name is displayed on the left of the icon 661.

When the new artist group name is entered in the edit box 662 of the artist link tree screen 611, information on the artist group is added to the artist group list table 82. The artist group name is displayed instead of the edit box 662 on the left of the icon 661.

Figure 33:
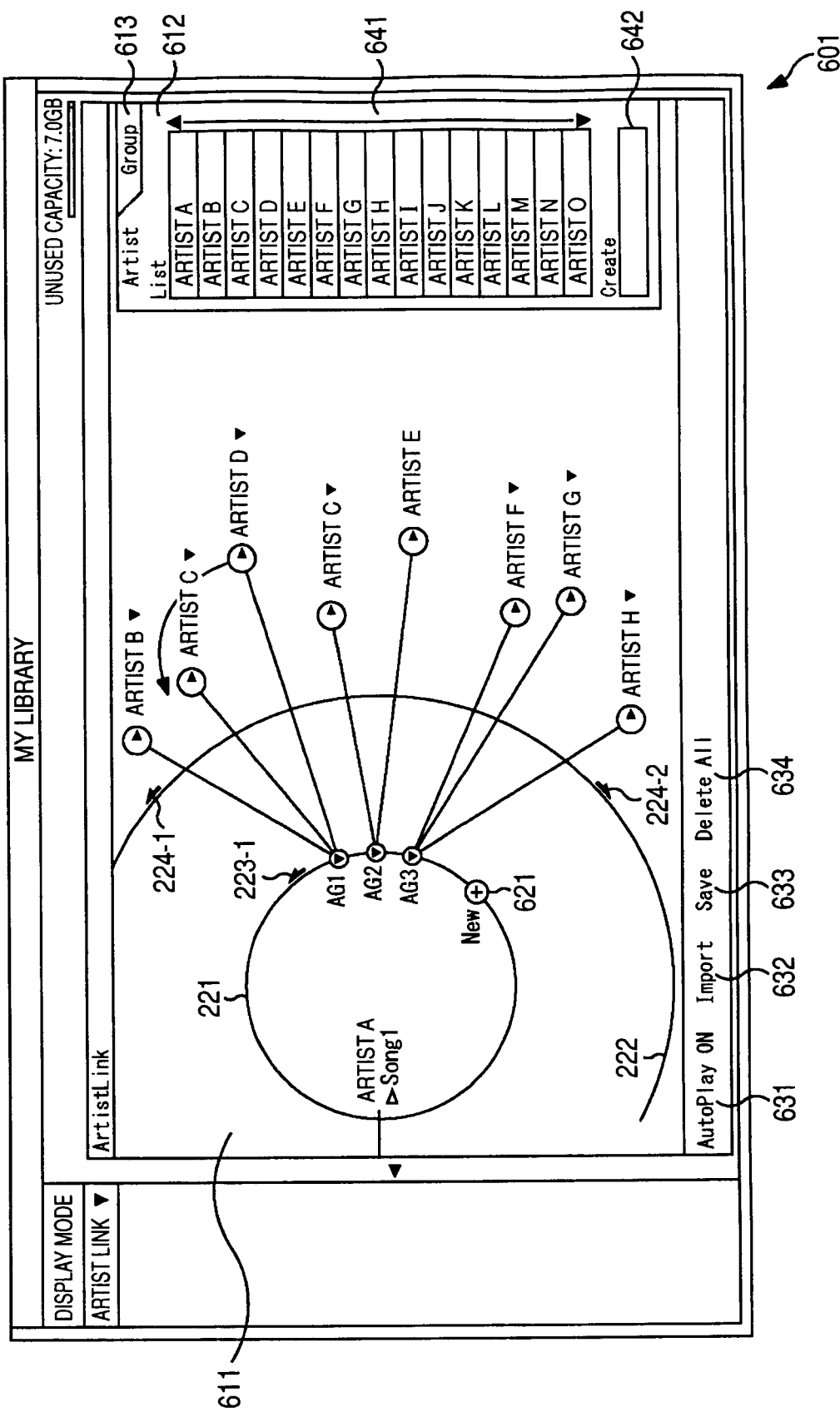
FIG. 33 is a diagram showing still another example of the display of the artist link map edition screen in FIG. 29.

FIG. 33 shows a case in which orders of artists in an artist group are changed on the artist link map edition screen 601.

Figure 34:
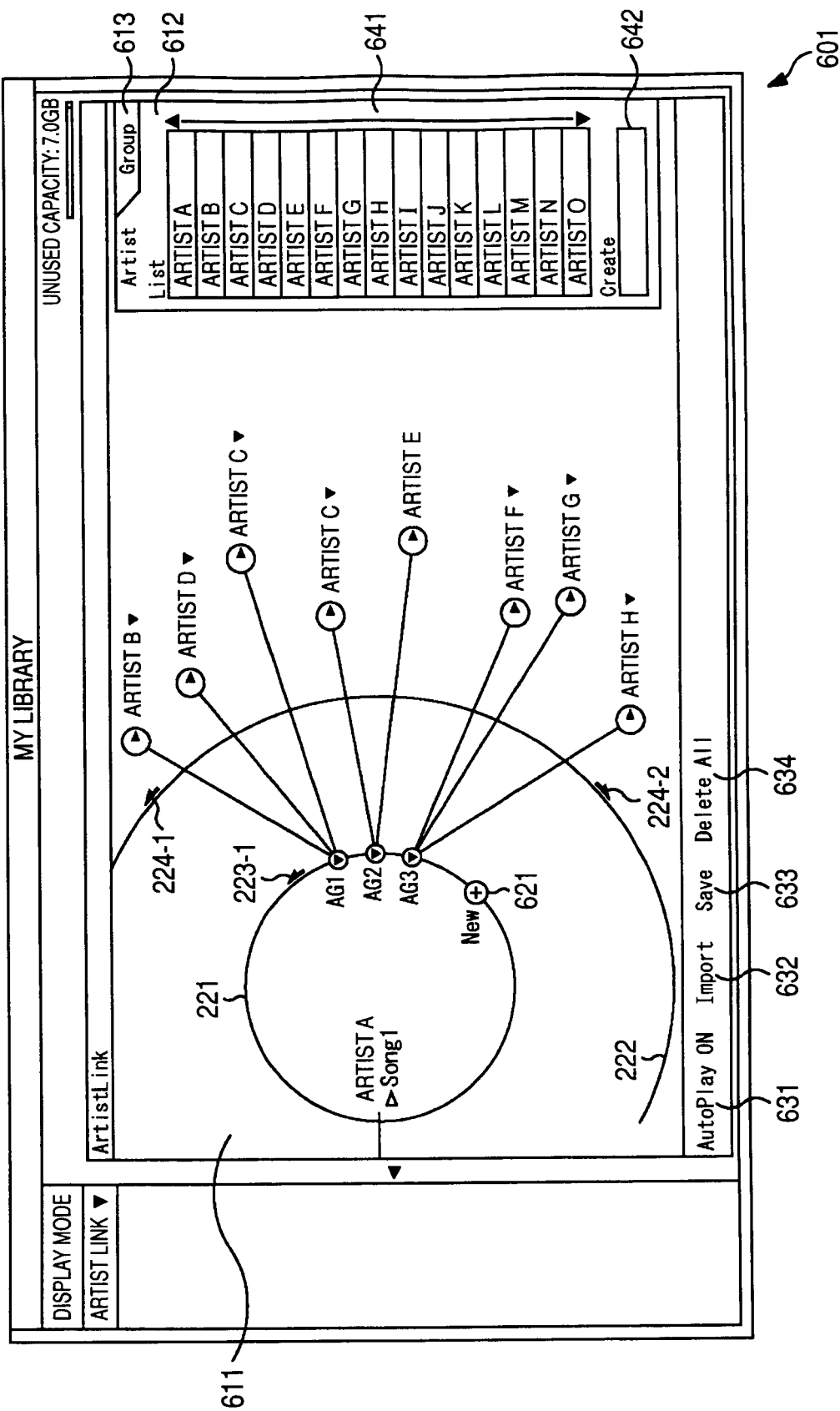
FIG. 34 is a diagram showing still another example of the display of the artist link map edition screen in FIG. 29.

When orders of artists in an artist group are changed, the user operates the mouse or the like constituting the operation input unit 16 to drag and move an icon of an artist (e.g., artist D) on the artist link tree screen 611 and drops the icon in a desired position. For example, when the icon of the artist D is dropped in a position between the icons of the artist B and the artist C included in the same artist group AG1, as shown in FIG. 34, the screen is re-rendered with positions of the icon of the artist C and the icon of the artist D replaced. The artist link correspondence table 83 is updated such that order information of the artist C and order information of the artist D in the artist group AG1 are replaced.

Even if the icon of the artist D is dropped between icons of artist included in different artist groups, the drop is invalid and the icon of the artist D dropped is returned to and displayed in the original position.

Edition display control processing for the artist link map edition screen 601 will be explained with reference to a flowchart in FIG. 35.

In step S601, the artist-link-GUI control unit 52 stays on standby until it is judged that an artist name is dragged.

For example, as described above with reference to FIG. 30, when an artist name (e.g., artist F) displayed on the artist list screen 612 is dragged onto the artist link tree screen 611, in step S601, it is judged that the artist name is dragged. The processing proceeds to step S602. The artist-link-GUI control unit 52 controls the artist-link-tree-display processing unit 501 to render (characters of) the artist name in a drag position.

In step S603, the artist-link-GUI control unit 52 judges whether the drag position is within a predetermined area (in the example in FIG. 30, an area on the outside of the large circle 222). When it is judged that the drag position is within the predetermined area, the processing proceeds to step S604.

In step S604, the artist-link-GUI control unit 52 causes the artist-link-tree-display processing unit 501 to extract an artist group, a position of an icon of which is closest from the drag position, and sets the artist group as a connection candidate.

For example, an artist group, a position of an icon of which is in a shortest distance from a position of the artist name (the drag position), is simply extracted and set as a connection candidate.

Figure 36:
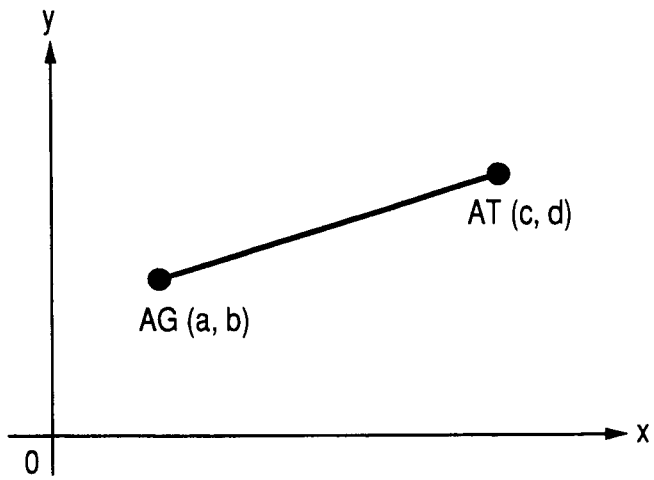
FIG. 36 is a diagram for explaining a neighborhood.

As shown in FIG. 36, when a position of an icon of the artist group is AG(a, b) and a position of the artist name is AT(c, d), a distance between the positions is calculated according to the following equation (1).

$$AGAT = \sqrt{(c-a)^2 + (d-b)^2} \tag{1}$$

In step S605, the artist-link-GUI control unit 52 causes the artist-link-tree-display processing unit 501 to render an icon beside the artist name on the basis of the drag position and render an auxiliary line (a dotted line) from the icon to the icon of the artist group as the connection candidate.

In step S606, the artist-link-GUI control unit 52 judges whether the drag position (the position of the artist name) is decided. For example, the user drops the icon of the artist F in a position where the dotted line from the position of the icon of the artist group AG1 is connected to the icon of the artist F according to operation of the operation input unit 16. According to the drop of the icon of the artist F, it is judged in step S606 that the drag position is decided. The processing proceeds to step S607.

When it is judged in step S606 that the drag position is not decided, the processing returns to step S603. The processing in step S603 and the subsequent steps is repeated.

In step S607, the artist-link-GUI control unit 52 controls the artist-link-processing control unit 53 to add the artist, the icon of which is dropped, to the artist group as the connection candidate in the artist link correspondence table 83. In this case, order information of existing artist and the added artists is changed according to the drop position. In the present case, when the added artist is dropped in a position above the existing artists, order information of the added artist is set to be the highest. When the added artist is dropped in a position below the existing artists, order information of the added artist is set to be the lowest. This update information of the artist link correspondence table 83 is supplied to the artist-link-GUI control unit 52. The processing proceeds to step S612.

On the other hand, for example, when the drag position is in the small circle 221, in step S603, it is judged that the drag position is not within the predetermined area (in the example in FIG. 30, the area outside the large circle 222). The processing proceeds to step S608.

In step S608, the artist-link-GUI control unit 52 judges whether the drag position (the position of the artist name) is decided. For example, the user drops the icon of the artist F in a position in the small circle 221 according to operation of the operation input unit 16. According to the drop of the icon of the artist F, in step S608, it is judged that the drop position is decided. The processing proceeds to step S609.

When it is judged in step S608 that the drag position is not decided, the processing returns to step S603. The processing in step S603 and the subsequent steps is repeated.

In step S609, the artist-link-GUI control unit 52 sets the artist F dropped as a base artist. In step S610, the artist-link-GUI control unit 52 controls the artist-link-processing control unit 53 to search for artist groups in which the artist F as the base artist is included. The artist-link-processing control unit 53 supplies information on the artist groups found to the artist-link-GUI control unit 52.

In step S611, the artist-link-GUI control unit 52 controls the artist-link-processing control unit 53 to search for related artists included in each of the artist groups. The artist-link-processing control unit 53 supplies information on the related artists found to the artist-link-GUI control unit 52.

In step S612, the artist-link-GUI control unit 52 supplies the update information of the artist link correspondence table 83 supplied in step S605 or the information obtained in steps S609 to S611 (information on the base artist, the artist groups, and the related artists, etc.) to the artist-link-display processing unit 51 as update information.

In step S613, the artist-link-display processing unit 51 re-renders the artist link map edition screen 601 on the basis of the update information from the artist-link-GUI control unit 52. Specifically, the artist-list-display processing unit 502 re-renders the artist list screen 612, the artist-group-list-display processing unit 503 re-renders the artist group list screen 613, and the artist-link-tree-display processing unit 501 re-renders the artist link tree screen 611.

Consequently, on the display unit 17, the artist link map edition screen 601 on which the artist F is added to the artist group AG1 or the artist link map edition screen 601 on which the artist link information with the artist F set as the base artist is displayed is displayed.

As described above, on the artist link map edition screen 601, by dragging and dropping an artist name in a predetermined area, a base artist is set and artist link information of the base artist set is obtained and displayed or an artist is added to a predetermined artist group and the artist added is displayed.

Consequently, the user can edit artist link information as the user desires by only performing simple and visually plain operation for only clicking a predetermined character or icon and dragging and dropping the character or the icon.

Figure 37:
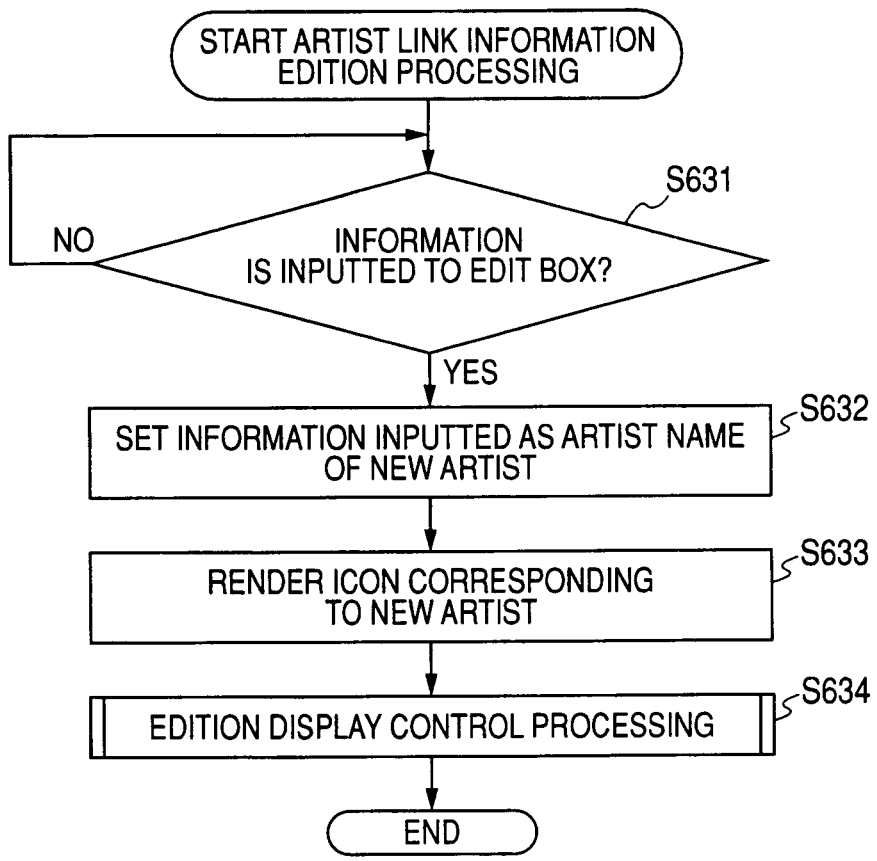
FIG. 37 is a flowchart for explaining artist link information edition processing for the artist link map edition screen in FIG. 29.

Artist link information edition processing on the artist link map edition screen 601 in the case in which a new artist is added will be explained with reference to a flowchart in FIG. 37.

In step S631, the artist-link-GUI control unit 52 stays on standby until information is inputted to the edit box. For example, the user operates the keyboard or the like constituting the operation input unit 16 to enter a new artist name (e.g., artist P) in the edit box 642 in the artist list screen 612. According to the enter of the artist name, the artist-link-GUI control unit 52 judges in step S631 that information is inputted to in the edit box. The processing proceeds to step S632.

In step S632, the artist-link-GUI control unit 52 sets the information inputted as an artist name of the new artist. In step S633, the artist-link-GUI control unit 52 controls the artistlink-display processing unit 51 to render an icon corresponding to the new artist as described above with reference to FIG. 31.

In step S634, the artist-link-GUI control unit 52 executes the edition display control processing described above with reference to FIG. 36. In the case of the new artist, as in the case of the registered artist, when characters of the artist name (artist P) are dragged onto the artist link tree screen 611, a position of an icon of a closest artist group viewed from a drag position is searched for. A dotted line indicating "undecided" for connecting the icon of the artist P is displayed from a position of an icon of the closest artist group found (in the case of an example in FIG. 31, artist group AG3).

When the icon of the artist P is dropped in a position where the dotted line from the position of the icon of the artist group AG3 is connected to the icon of the artist P according to operation of the operation input unit 16 by the user, the artist link correspondence table 83 is updated such that the artist P is included in the artist group AG3. The dotted line to the icon of the artist P from the position of the icon of the artist group AG3 is changed to a solid line indicating "decided" and displayed.

When the artist P is dropped in a position in the small circle 221, the artist P is set as a base artist and artist link information of the artist P is obtained and displayed. However, in this case, since the new artist P is not added to artist groups, artist groups and related artists are not displayed.

As described above, when the new artist is registered, it is possible to immediately add the artist to artist groups.

Figure 38:
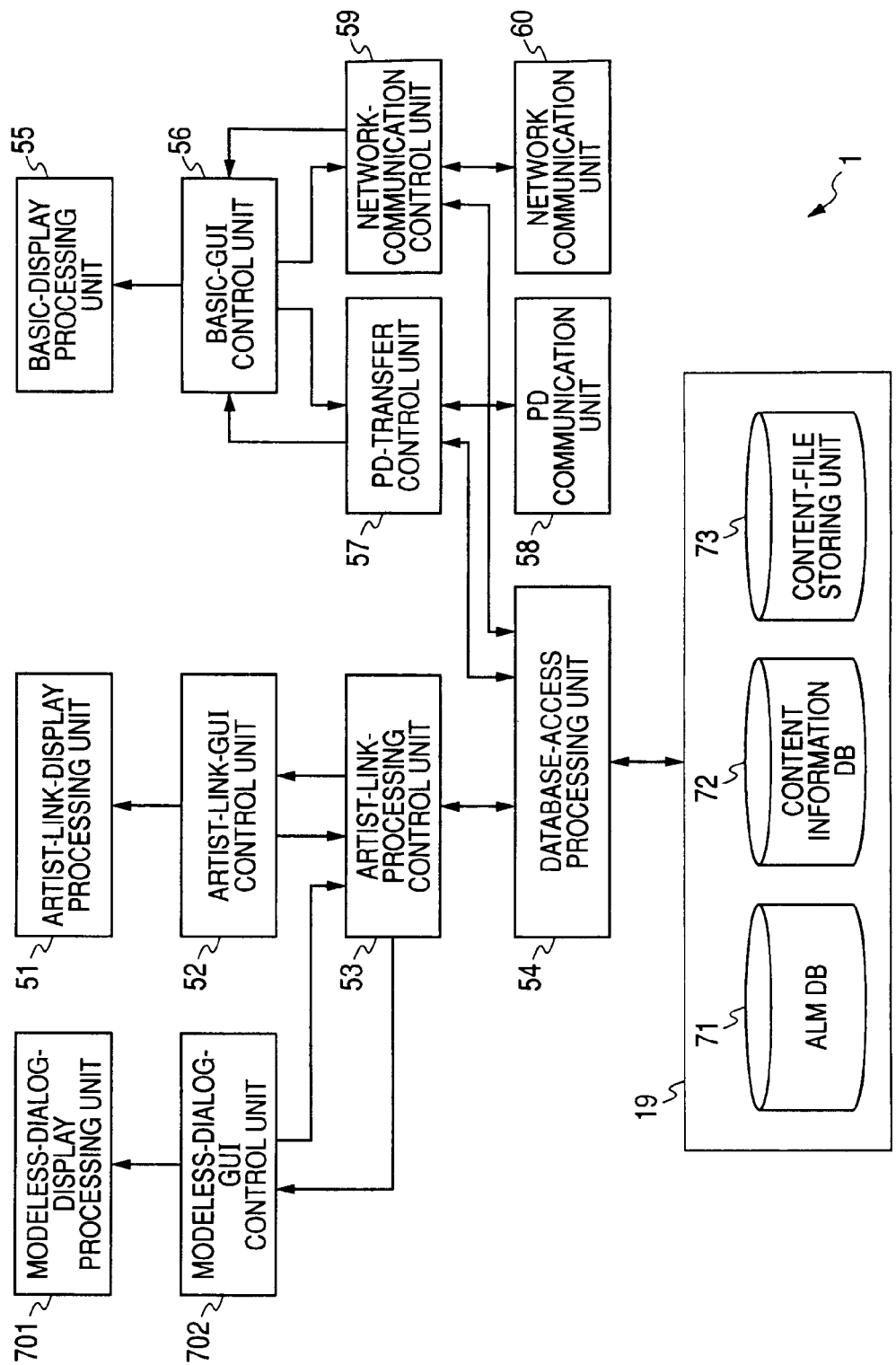
FIG. 38 is a block diagram showing another example of the functional structure of the PC in FIG. 4.

FIG. 38 shows another example of the functional structure of the PC 1. A functional block shown in FIG. 38 is the same as the functional block in FIG. 3 in that the functional block includes the artist-link-display processing unit 51 to the network communication unit 60 and the ALM database 71 to the content-file storing unit 73. However, the functional block shown in FIG. 38 is different in that a modeless-dialog-display processing unit 701 and a modeless-dialog-GUI control unit 702 are added.

Figure 39:
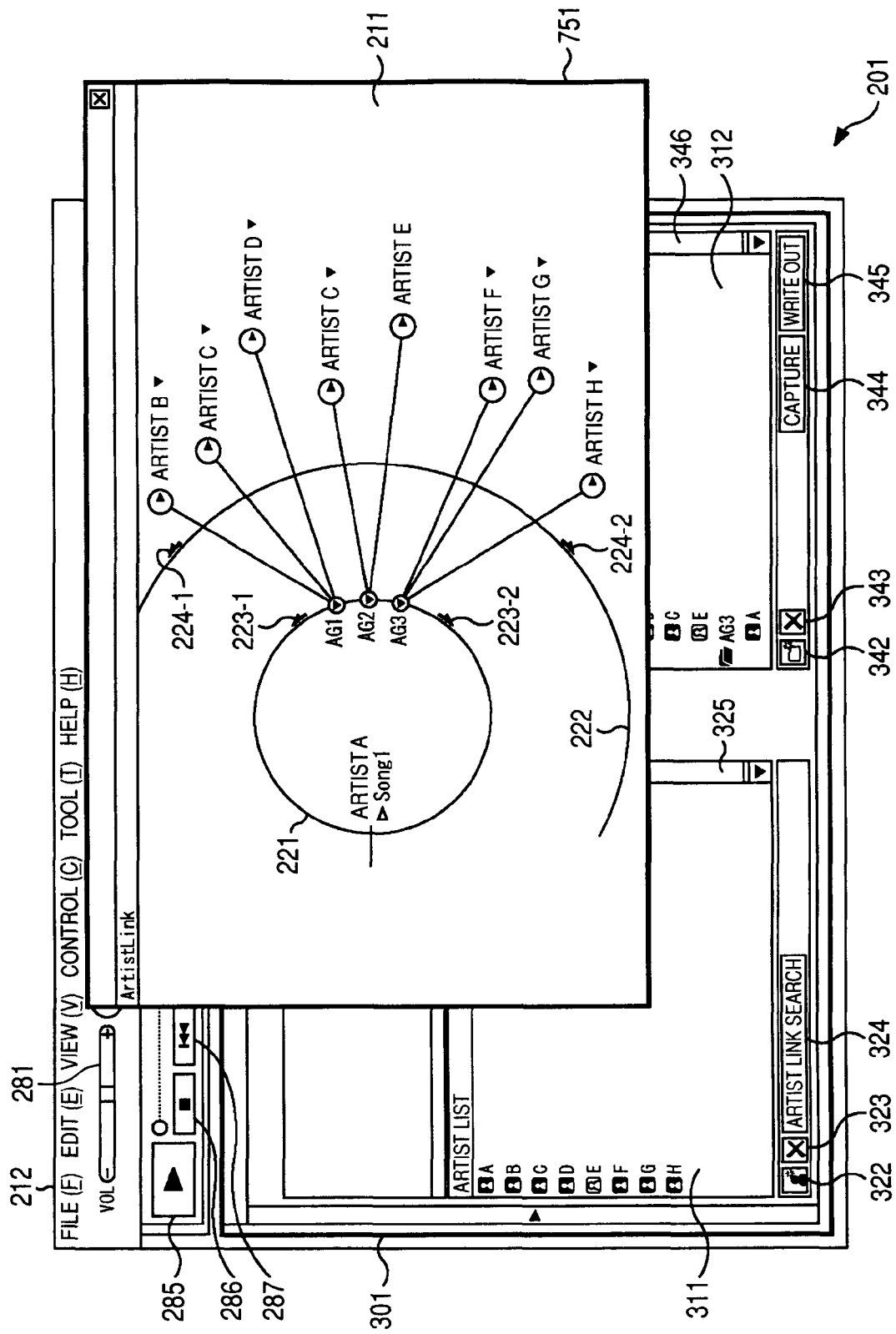
FIG. 39 is a diagram showing another example of the display screen in FIG. 13.

Under control by the modeless-dialog-GUI control unit 702, the modeless-dialog-display processing unit 701 generates, on the basis of artist link information, GUI images such as an artist link map edition screen for editing artist link information and an artist link map preview screen for referring to the artist link information and causes the display unit 17 to display screens including the GUI images generated as a modeless dialog 751 shown in FIG. 39.

In an example in FIG. 39, the display screen 201 including the artist link map edition screen 301 in FIG. 14 and the basic function display screen 212 in FIG. 13 is displayed. Separately from the display screen 201, the artist link map preview screen 211 in FIG. 13 is displayed as the modeless dialog 751.

The modeless-dialog-GUI control unit 702 inputs, via the operation input unit 16, an operation signal of the user concerning an artist link map edition screen or an artist link map preview screen displayed as the modeless dialog 751 and causes the artist-link-processing control unit 53 to execute processing concerning the artist link information. The modeless-dialog-GUI control unit 702 controls the modeless-dialog-display processing unit 701 on the basis of feedback from the artist-link-processing control unit 53 to update the artist link map edition screen or the artist link map preview screen displayed as the modeless dialog 751.

In the functional block in FIG. 38, functions (the artist-link-display processing unit 51 and the artist-link-GUI control unit 52) for displaying artist link information and inputting operation concerning the artist link information are separately provided. Thus, as shown in FIG. 39, the display of the artist link information as the modeless dialog 751 is easily realized by simply adding the modeless-dialog-display processing unit 701 and the modeless-dialog-GUI control unit 702 as clients of the artist-link-processing control unit 53.

As described above, in the invention, artist groups in which artists are included and other related artists included in the artist groups and related to the artists are displayed as artist link information of artists of contents. Thus, the user can easily grasp reasons why the artists related to the artists are related.

For example, concerning the artist A, when an artist group "up-tempo" including artists having similar melodies and an artist group "1999" including artists of contents that were hits in a certain age are created, if the artist A is set as a base artist, the artist groups "up-tempo" and "1999" and related artists included in the respective groups are displayed.

Consequently, when the user listens to content, for example, if the user desires to listen to content of an artist having a melody similar to an artist of content that the user is listening to at the present, the user can immediately select a related artist included in the artist group of "up-tempo" displayed. Similarly, if the user desires to listen to content of an artist that was popular in the past as an artist of content that the user is listening to at the present, the user can immediately select a related artist included in the artist group of "1999" displayed. Therefore, the user can easily search for desired content and listen to the content.

It is possible to apply this not only to artist link information of artists of contents but also to tree display for visualizing reasons for a relation. For example, when it is possible to apply this to contents, and a base content, category groups in which the base content is included, other related contents included in the category groups, and the like are displayed, as in the above case, the user can easily grasp reasons why the contents and the related contents are related by displaying the category groups (reasons).

In this case, for example, it is possible to create a category group "mood" in which contents of similar moods (a base content and related contents) are included, a category group "composer name" in which contents (a base content and related contents) of the same composer are included, a category group "2006 Sports" in which a basic content "Turin Olympics" and a related content "Soccer World Cup" are included, and the like.

As described above, intuitive visual feedback is given to edition operation performed on a list of artist groups or the like or edition operation performed on a screen on which artist link information of a base artist is displayed in the tree format. Thus, the user can easily perform edition of the artist link information and it is possible to reduce burden of edition work on the user.

Moreover, since it is possible to set and edit order information in the artist groups, even when artist link information is transferred to an apparatus or a medium having limited transferable data quantity, it is possible to preferentially transfer artist link information desired by the user.

In the case described above, icons of related artists included the respective artist groups are displayed in order from the top on the artist link map preview screen 211, the artist link tree screen 313, the artist link map preview screen 421, the artist link tree screen 611, and the like, in which artist link information of the base artist is displayed in the tree format, on the basis of orders of order information stored in the artist link correspondence table. However, it is also possible to represent the orders of the order information stored in the artist link correspondence table as distances from icons of the artist groups.

In this case, in the artist groups, when an artist is given higher priority of order information stored in the artist link correspondence table, an icon of the artist is arranged in a position closer from an icon of an artist group corresponding thereto. An icon of an artist with a low order of order information is arranged in a position distant from the icon of the artist group.

Figure 35:
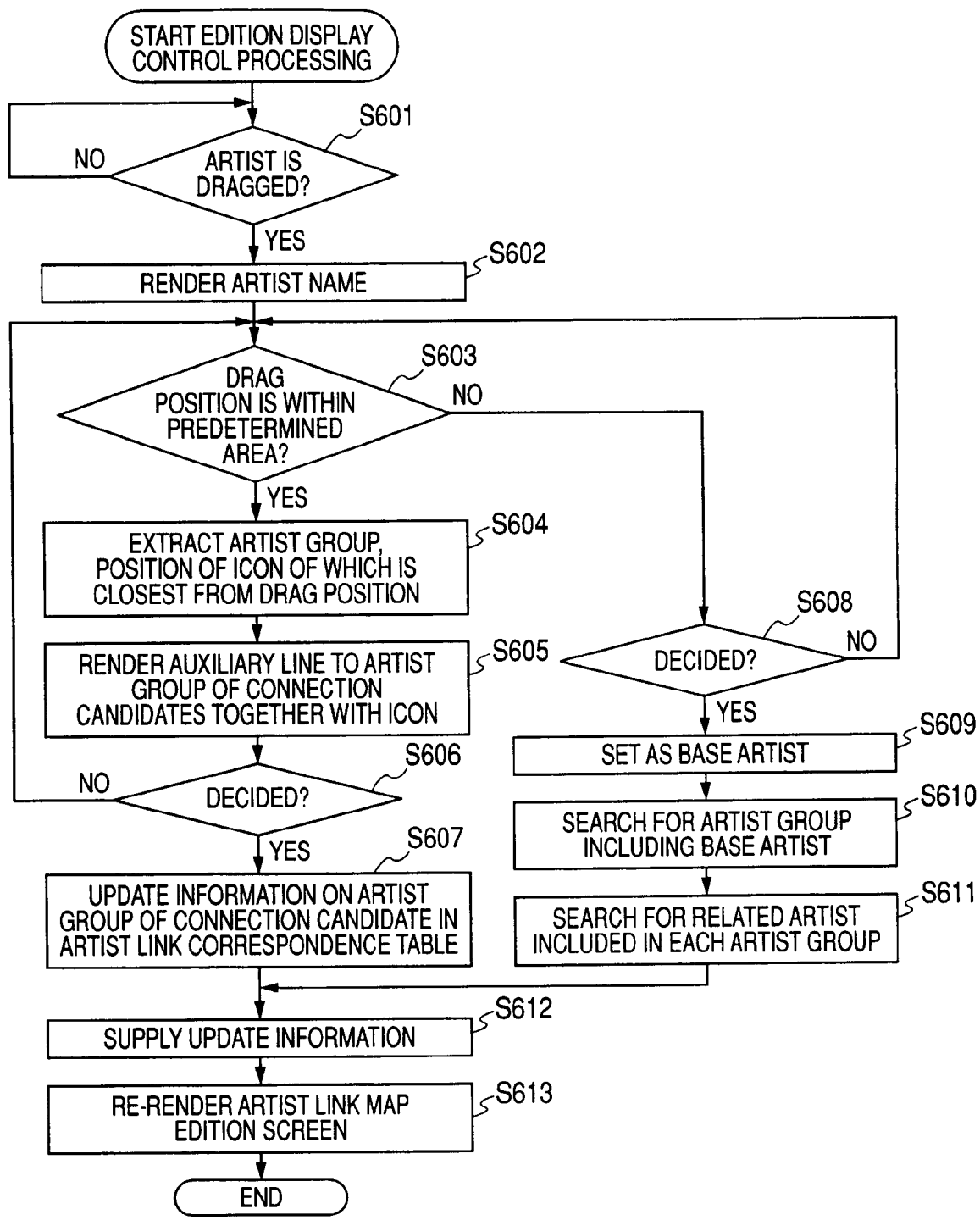
FIG. 35 is a flowchart for explaining edition display control processing for the artist link map edition screen in FIG. 29.

When the artist link tree screen 611 is constituted in this way, in step S607 in FIG. 35, order information of additional artists is set according to a distance from the icon of the artist group of a drop position.

In the respective screens described above, an artist group indicating a relation between a base artist and a related artist is displayed between the base artist and the related artist. However, the display of the artist group does not always have to be between the base artist and the related artist. For example, it is also possible to arrange the related artist on the right of the base artist and display the artist group on the right of the related artist.

In the above explanation, video and music contents are used. However, it is also possible to apply the invention to contents such as applications.

In the explanation, a personal computer such as the PC 1 in FIG. 2 or the PD 7 as a portable recording and reproducing device is used as the information processing apparatus. However, the information processing apparatus is not limited to the PC 1 and the PD 7. The information processing apparatus may be, for example, a cellular phone, other PDS (Personal Digital Assistant) apparatuses, reproducing apparatuses such as an AV (Audio Visual) apparatus, and CE (Consumer Electronics) apparatuses such as a recording and reproducing apparatus and home electronics (home electric appliances).

It is possible to execute the series of processing not only with hardware but also with software.

When the series of processing is executed by software, a computer program forming the software is installed from a network or a recording medium in a computer built in dedicated hardware or, for example, a general-purpose personal computer that is capable of executing various functions by installing various computer programs.

This recording medium is not only formed, separately from the apparatus main body, by package media such as removable media 22 including a magnetic disk (including a flexible disk), an optical disk (including a CD-ROM (Compact Disk-Read Only Memory) and a DVD (Digital Versatile Disk)), a magneto-optical disk (including MD (Mini-Disk) (trademark)), or a semiconductor memory having a computer program recorded therein, which is distributed to provide the user with the computer program, as shown in FIG. 3 but also formed by the ROM 12, the hardware included in the storing unit 19, or the like having the computer program recorded therein, which is built in the apparatus main body in advance and provided to the user.

In this specification, the steps shown in the flowcharts include not only processing performed in time series in accordance with the order described but also processing executed in parallel or individually, although not always executed in time series.

In this specification, the system indicates an entire apparatus including plural apparatuses.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus comprising:
storing means for storing first attribute data representing a plurality of first attributes, which are attributes of audio content of a song associated with a music artist being played, second attribute data representing second attributes, which are attributes of the first attributes, and related attribute data representing related attributes, which are attributes of the second attributes; and
first display control means for controlling a related display for displaying a selected first attribute from the plurality of first attributes and each second attribute associated with the selected first attribute on a circumference of a graphical object, the selected first attribute and each displayed second attribute displayed on opposite sides of the graphical object, wherein
the first display control means controls the related display to display each related attribute associated with each displayed second attribute by linking each displayed related attribute with the displayed second attribute associated with the displayed related attribute, and
the first display control means, while the audio content is being played, updates the related display of each related attribute associated with each second attribute according to user performed edits.

2. The information processing apparatus according to claim 1, wherein the first display control means controls the related display to display the second attributes between the selected first attribute and the related attributes.

3. The information processing apparatus according to claim 1, wherein the first display control means controls the related display to display the related attributes, which are divided for each of the displayed second attributes, according to a user defined priority order associated with the selected first attribute.

4. The information processing apparatus according to claim 3, wherein the first display control means controls the related display to display the related attributes, which are divided for each of the displayed second attributes, such that a distance from display positions of the second attributes to the related attributes are reduced according to a user defined priority order associated with the selected first attribute.

5. The information processing apparatus according to claim 1, further comprising:
second display control means for controlling list display of second attributes corresponding to all second attribute data stored in the storing means, wherein
when the second attribute is pointed in the related display, the second display control means controls the list display of the second attributes to display a display position of the second attribute pointed in a predetermined position in the list display of the second attributes.

6. The information processing apparatus according to claim 1, wherein the selected first attribute is displayed upon playing of the audio content.

7. An information processing method for an information processing apparatus, the method comprising:
storing first attribute data representing a plurality of first attributes, which are attributes of audio content of a song associated with a music artist being played, second attribute data representing second attributes, which are attributes of the first attributes, and related attribute data representing related attributes, which are attributes of the second attributes;
controlling related display for displaying a selected first attribute from the plurality of first attributes and each second attribute associated with the selected first attribute on a circumference of a graphical object, the selected first attribute and each displayed second attribute displayed on opposite sides of the graphical object;

controlling the related display to display each related attribute associated with each displayed second attribute by linking each displayed related attribute with the displayed second attribute associated with the displayed related attribute; and updating, while the audio content is being played, the related display of each related attribute associated with each second attribute according to user performed edits.

8. A non-transitory computer readable storage medium having instructions stored thereon, which when executed by a processor in an information processing apparatus cause the processor to execute a method comprising:

storing first attribute data representing a plurality of first attributes, which are attributes of audio content of a song associated with a music artist being played, second attribute data representing second attributes, which are attributes of the first attributes, and related attribute data representing related attributes, which are attributes of the second attributes;

controlling related display for displaying a selected first attribute from the plurality of first attributes and each second attribute associated with the selected first attribute on a circumference of a graphical object, the selected first attribute and each displayed second attribute displayed on opposite sides of the graphical object;

controlling the related display to display each related attribute associated with each displayed second attribute by linking each displayed related attribute with the displayed second attribute associated with the displayed related attribute; and updating, while the audio content is being played, the related display of each related attribute associated with each second attribute according to user performed edits.

9. An information processing apparatus comprising:

storing means for storing association between first attribute data representing a plurality of first attributes, which are attributes of audio content of a song associated with a music artist being played, second attribute data representing second attributes, which are attributes of the first attributes, and related attribute data representing related attributes, which are attributes of the second attributes;

first display control means for controlling list display of the plurality of first attributes;

second display control means for displaying on a related display a selected first attribute from the plurality of first attributes and each second attribute associated with the selected first attribute on a circumference of a graphical object, the selected first attribute and each displayed second attribute displayed on opposite sides of the graphical object;

the second display control means, while the audio content is being played, updates the related display of each related attribute associated with each second attribute according to user performed edits;

the second display control means displaying each related attribute associated with each displayed second attribute by linking each displayed related attribute with the displayed second attribute associated with the displayed related attribute;

determining means for determining, according to operation by a user, a display position on the related display of the selected first attribute from the list display; and updating means for updating the association in the storing means according to the display position of the first attribute on the related display determined by the determining means.

10. The information processing apparatus according to claim 9, wherein the storing means also stores a priority order concerning the first attributes and each associated second attribute, and the updating means updates the priority order according to a distance between a display position of the selected first attribute on the related display determined by the determining means and display positions of the second attributes on the related display.

11. The information processing apparatus according to claim 9, wherein the selected first attribute is displayed upon playing of the audio content.

12. An information processing method for an information processing apparatus, the method comprising:

storing association between first attribute data representing a plurality of first attributes, which are attributes of audio content of a song associated with a music artist being played, second attribute data representing second attributes, which are attributes of the first attributes, and related attribute data representing related attributes, which are attributes of the second attributes;

controlling list display of the plurality of first attributes;

displaying on a related display a selected first attribute from the plurality of first attributes and each second attribute associated with the selected first attribute on a circumference of a graphical object, the selected first attribute and each displayed second attribute displayed on opposite sides of the graphical object;

the second display control means displaying each related attribute associated with each displayed second attribute by linking each displayed related attribute with the displayed second attribute associated with the displayed related attribute;

determining, according to operation by a user, a display position on the related display of the selected first attribute from the list display;

updating the association in the storing unit according to the display position of the first attribute on the related display determined; and updating, while the audio content is being played, the related display of each related attribute associated with each second attribute according to user performed edits.

13. A non-transitory computer readable medium having computer encoded instructions stored thereon, which when executed by a processor in an information processing apparatus cause the processor to execute a method comprising:

storing association between first attribute data representing a plurality of first attributes, which are attributes of audio content of a song associated with a music artist being played, second attribute data representing second attributes, which are attributes of the first attributes, and related attribute data representing related attributes, which are attributes of the second attributes;

controlling list display of the plurality of first attributes;

displaying on a related display a selected first attribute from the plurality of first attributes and each second attribute associated with the selected first attribute on a circumference of a graphical object, the selected first attribute and each displayed second attribute displayed on opposite sides of the graphical object;

the second display control means displaying each related attribute associated with each displayed second attribute by linking each displayed related attribute with the displayed second attribute associated with the displayed related attribute;

determining, according to operation by a user, a display position on the related display of the selected first attribute from the list display;

updating the association in the storing unit according to the display position of the first attribute on the related display determined; and updating, while the audio content is being played, the related display of each related attribute associated with each second attribute according to user performed edits.

14. An information processing apparatus comprising:

a storing unit to store first attribute data representing a plurality of first attributes, which are attributes of audio content of a song associated with a music artist being played, second attribute data representing second attributes, which are attributes of the first attributes, and related attribute data representing related attributes, which are attributes of the second attributes; and a first display control unit to control related display for displaying a selected first attribute from the plurality of first attributes and each second attribute associated with the selected first attribute on a circumference of a graphical object, the selected first attribute and each displayed second attribute displayed on opposite sides of the graphical object, wherein the first display control unit controls the related display to display each related attribute associated with each displayed second attribute by linking each displayed related attribute with the displayed second attribute associated with the displayed related attribute, and the first display control unit, while the audio content is being played, updates the related display of each related attribute associated with each second attribute according to user performed edits.

15. The information processing apparatus according to claim 14, wherein the selected first attribute is displayed upon playing of the audio content.

16. An information processing apparatus comprising:

a storing unit to store association between first attribute data representing a plurality of first attributes, which are attributes of audio content of a song associated with a music artist being played, second attribute data representing second attributes, which are attributes of the first attributes, and related attribute data representing related attributes, which are attributes of the second attributes;

a first display control unit to control list display of the plurality of first attributes;

a second display control unit to display on a related display a selected first attribute from the plurality of first attributes and each second attribute associated with the selected first attribute on a circumference of a graphical object, the selected first attribute and each displayed second attribute displayed on opposite sides of the graphical object;

the second display control unit displaying each related attribute associated with each displayed second attribute by linking each displayed related attribute with the displayed second attribute associated with the displayed related attribute;

the second display control means, while the audio content is being played, updates the related display of each related attribute associated with each second attribute according to user performed edits;

a determining unit to determine, according to operation by a user, a display position on the related display of the selected first attribute from the list display; and an updating unit to update the association in the storing unit according to the display position of the first attribute on the related display determined by the determining unit.

17. The information processing apparatus according to claim 16, wherein the selected first attribute is displayed upon playing of the audio content.

* * * * *